(12) United States Patent
Zheng et al.

(10) Patent No.: US 11,392,133 B2
(45) Date of Patent: Jul. 19, 2022

(54) METHOD AND SYSTEM FOR OBJECT CENTRIC STEREO IN AUTONOMOUS DRIVING VEHICLES

(71) Applicant: PlusAI, Inc., Cupertino, CA (US)

(72) Inventors: Hao Zheng, Saratoga, CA (US); David Wanqian Liu, Los Altos, CA (US); Timothy Patrick Daly, Jr., San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 208 days.

(21) Appl. No.: 15/615,228

(22) Filed: Jun. 6, 2017

(65) Prior Publication Data

US 2018/0348780 A1 Dec. 6, 2018

(51) Int. Cl.
*G05D 1/02* (2020.01)
*G05D 1/00* (2006.01)
(Continued)

(52) U.S. Cl.
CPC ......... *G05D 1/0236* (2013.01); *G05D 1/0088* (2013.01); *G05D 1/0257* (2013.01);
(Continued)

(58) Field of Classification Search
CPC ........... G06T 7/593; G06T 2207/10012; G06T 2207/30252; G06T 2207/30261;
(Continued)

(56) References Cited

U.S. PATENT DOCUMENTS 5,668,739 A 9/1997 League et al.
8,108,119 B2 1/2012 Southall et al.
(Continued)

FOREIGN PATENT DOCUMENTS

DE 102013206435 A1 * 10/2014 ............... B60R 1/00
DE 102015107392 A1 11/2016
(Continued)

OTHER PUBLICATIONS

International Search Report and Written Opinion dated Jan. 19, 2018 in International Application PCT/IB2017/056029.
(Continued)

*Primary Examiner* — Jelani A Smith
*Assistant Examiner* — Paul A Castro

(57) ABSTRACT

The present teaching relates to a method, system, medium, and implementation of processing image data in an autonomous driving vehicle. Sensor data acquired by one or more types of sensors deployed on the vehicle are continuously received. The sensor data provide different information about surrounding of the vehicle. Based on a first data set acquired by a first sensor of a first type of the one or more types of sensors at a specific time, an object is detected, where the first data set provides a first type of information about the surrounding of the vehicle. Depth information of the object is then estimated via object centric stereo at object level based on the object detected as well as a second data set acquired by a second sensor of the first type of the one or more types of sensors at the specific time. The second data set provides the first type of information about the surrounding of the vehicle with a different perspective as compared with the first data set.

17 Claims, 34 Drawing Sheets

(51) Int. Cl.
*G06T 7/593* (2017.01)
*G06T 7/521* (2017.01)
*G06K 9/62* (2022.01)
*G06V 10/75* (2022.01)
*G06V 20/58* (2022.01)
*G06V 20/64* (2022.01)

(52) U.S. Cl.
CPC ......... *G05D 1/0293* (2013.01); *G06K 9/6289* (2013.01); *G06T 7/521* (2017.01); *G06T 7/593* (2017.01); *G06V 10/75* (2022.01); *G06V 20/58* (2022.01); *G06V 20/64* (2022.01); *G06T 2207/10021* (2013.01); *G06T 2207/20004* (2013.01); *G06T 2207/20076* (2013.01); *G06T 2207/30252* (2013.01)

(58) Field of Classification Search
CPC . G06T 2207/10021; G06T 2207/10048; G06T 2207/30248; G06T 7/20; G06T 7/285; G06T 7/50; G06T 15/00; G06T 2207/10028; G06T 5/50; G06T 7/246; G06T 7/70; G06T 7/74; G06T 7/596; G06T 7/73; G06T 2200/04; G06T 2207/10032; G06T 2207/30256; G06T 2215/12; G06T 7/215; G06T 7/55; G06T 7/60; G06T 2207/30232; G06T 7/248; G06T 7/521; G06T 7/75; G06T 17/00; G06T 2207/20081; G06T 2207/30244; G06T 5/006; G06T 7/001; G06T 19/003; G06T 2200/08; G06T 7/0014; G06T 7/30; G06T 2207/20221; G06T 7/85; G05D 1/00; G05D 1/0088; G05D 1/02; G05D 1/0259; G05D 1/0276; G07C 5/08; H04N 7/18; G06K 9/00201; G06K 9/00805; G06K 9/00791; G06K 9/3241; G06K 9/00671; G06K 9/6267; G06K 2209/40; G06K 9/00771; G06K 9/00208
See application file for complete search history.

(56) References Cited

U.S. PATENT DOCUMENTS

| | | | |
|---|---|---|---|
| 8,139,109 | B2 | 3/2012 | Schmiedel et al. |
| 8,326,469 | B2 | 12/2012 | Phillips et al. |
| 8,634,980 | B1 | 1/2014 | Urmson et al. |
| 8,650,299 | B1 | 2/2014 | Huang et al. |
| 9,120,484 | B1 | 9/2015 | Ferguson |
| 9,221,396 | B1 | 12/2015 | Zhu et al. |
| 9,495,874 | B1 | 11/2016 | Zhu et al. |
| 9,555,740 | B1 | 1/2017 | Zhu et al. |
| 9,576,185 | B1 | 2/2017 | Delp |
| 9,606,539 | B1 | 3/2017 | Kentley et al. |
| 9,612,123 | B1 | 4/2017 | Levinson |
| 9,855,894 | B1 | 1/2018 | Khorasani |
| 10,002,430 | B1 | 6/2018 | Mundhenk |
| 10,162,355 | B2 | 12/2018 | Hayon et al. |
| 10,317,240 | B1 | 6/2019 | Di Pietro |
| 11,042,155 | B2 | 6/2021 | Zheng et al. |
| 2010/0104199 | A1 | 4/2010 | Zhang |
| 2011/0007135 | A1 | 1/2011 | Okada et al. |
| 2011/0106448 | A1 | 5/2011 | Widmann |
| 2011/0302214 | A1 | 12/2011 | Frye |
| 2012/0038748 | A1* | 2/2012 | Lindgren .................. B60R 1/00 348/47 |
| 2012/0083960 | A1 | 4/2012 | Zhu et al. |
| 2012/0140061 | A1 | 6/2012 | Zeng |
| 2013/0063566 | A1* | 3/2013 | Morgan-Mar .......... G06T 7/571 348/46 |
| 2013/0129143 | A1 | 3/2013 | Chen et al. |
| 2013/0090803 | A1 | 4/2013 | Stahlin |
| 2013/0131908 | A1 | 5/2013 | Trepagnier et al. |
| 2014/0085475 | A1 | 3/2014 | Bhanu |
| 2014/0177911 | A1 | 6/2014 | Heisele |
| 2014/0225990 | A1* | 8/2014 | Einecke ............... H04N 13/128 348/47 |
| 2015/0112470 | A1 | 4/2015 | Schmudderich |
| 2015/0112570 | A1 | 4/2015 | Schmudderich |
| 2015/0112571 | A1 | 4/2015 | Schmudderich |
| 2015/0166071 | A1 | 6/2015 | Komar |
| 2015/0199617 | A1 | 7/2015 | Kuwajima |
| 2015/0254986 | A1 | 9/2015 | Fairfield |
| 2015/0268058 | A1 | 9/2015 | Samarasekera |
| 2015/0302250 | A1* | 10/2015 | Miller ..................... G06T 13/80 382/203 |
| 2015/0324658 | A1 | 11/2015 | Zhang |
| 2015/0324686 | A1 | 11/2015 | Julian |
| 2015/0324690 | A1 | 11/2015 | Chilimbi |
| 2016/0137206 | A1 | 5/2016 | Chandraker et al. |
| 2016/0161265 | A1 | 6/2016 | Bagheri |
| 2016/0163029 | A1 | 6/2016 | Gibbon |
| 2016/0180197 | A1 | 6/2016 | Kim |
| 2016/0289043 | A1 | 10/2016 | Fang et al. |
| 2016/0342158 | A1 | 11/2016 | Nordbruch |
| 2017/0008562 | A1* | 1/2017 | Shashua ............ G08G 1/09623 |
| 2017/0010616 | A1 | 1/2017 | Shashua |
| 2017/0023945 | A1 | 1/2017 | Cavalcanti |
| 2017/0064278 | A1 | 3/2017 | Posselius et al. |
| 2017/0069097 | A1 | 3/2017 | Molgaard et al. |
| 2017/0083772 | A1 | 3/2017 | Kim et al. |
| 2017/0115396 | A1 | 4/2017 | Uehara |
| 2017/0123421 | A1 | 5/2017 | Kentley |
| 2017/0123428 | A1 | 5/2017 | Levinson et al. |
| 2017/0124476 | A1 | 5/2017 | Levinson et al. |
| 2017/0124781 | A1 | 5/2017 | Douillard et al. |
| 2017/0147888 | A1 | 5/2017 | Zeng |
| 2017/0185850 | A1 | 6/2017 | Hsu |
| 2017/0185898 | A1 | 6/2017 | Paul |
| 2017/0213462 | A1 | 7/2017 | Prokhorov |
| 2017/0220887 | A1 | 8/2017 | Fathi |
| 2017/0236013 | A1 | 8/2017 | Clayton |
| 2017/0270361 | A1 | 9/2017 | Puttagunta |
| 2017/0277716 | A1 | 9/2017 | Giurgiu |
| 2017/0301111 | A1 | 10/2017 | Zhao |
| 2017/0316333 | A1 | 11/2017 | Levinson |
| 2017/0336792 | A1 | 11/2017 | Gdalyahu et al. |
| 2017/0341237 | A1 | 11/2017 | Jain |
| 2018/0023960 | A1 | 1/2018 | Fridman |
| 2018/0039835 | A1 | 2/2018 | Rajkumar |
| 2018/0067463 | A1 | 3/2018 | Oder |
| 2018/0067488 | A1 | 3/2018 | Pollach |
| 2018/0067489 | A1 | 3/2018 | Oder |
| 2018/0067490 | A1 | 3/2018 | Pollach |
| 2018/0067491 | A1 | 3/2018 | Oder |
| 2018/0067492 | A1 | 3/2018 | Oder |
| 2018/0067966 | A1 | 3/2018 | Oder |
| 2018/0068206 | A1 | 3/2018 | Pollach |
| 2018/0068208 | A1 | 3/2018 | Arazaki |
| 2018/0081057 | A1 | 3/2018 | Myers |
| 2018/0089538 | A1 | 3/2018 | Graham et al. |
| 2018/0106885 | A1 | 4/2018 | Blayvas |
| 2018/0107901 | A1* | 4/2018 | Nakamura ........... G06K 9/4628 |
| 2018/0126984 | A1 | 5/2018 | Liu |
| 2018/0251125 | A1 | 9/2018 | Bilik |
| 2018/0253647 | A1 | 9/2018 | Yu |
| 2018/0307915 | A1 | 10/2018 | Olson |
| 2018/0307944 | A1 | 10/2018 | Li |
| 2018/0314247 | A1 | 11/2018 | Sun |
| 2018/0314253 | A1 | 11/2018 | Mercep |
| 2018/0314921 | A1 | 11/2018 | Mercep |
| 2018/0322365 | A1 | 11/2018 | Yehezkel et al. |
| 2018/0341853 | A1 | 11/2018 | Nakfour |
| 2018/0348781 | A1 | 12/2018 | Zheng et al. |
| 2018/0348785 | A1 | 12/2018 | Zheng |
| 2018/0349782 | A1 | 12/2018 | Zheng |
| 2018/0349784 | A1 | 12/2018 | Zheng |
| 2018/0349785 | A1 | 12/2018 | Zheng |
| 2019/0026568 | A1 | 1/2019 | Karlo |
| 2019/0228571 | A1 | 7/2019 | Atsmon |
| 2020/0057904 | A1 | 2/2020 | Amon et al. |

(56) References Cited

U.S. PATENT DOCUMENTS

2020/0151611 A1  5/2020  McGavran et al.
2020/0202171 A1  6/2020  Hughes
2021/0294326 A1  9/2021  Zheng et al.

FOREIGN PATENT DOCUMENTS

| EP | 2378465 A1 | 10/2011 |
| JP | WO2016157499 A1 | 10/2016 |
| WO | 2016183525 A1 | 11/2016 |
| WO | WO 2017/079460 A2 | 5/2017 |

OTHER PUBLICATIONS

International Search Report and Written Opinion dated Apr. 6, 2018 in International Application PCT/IB2017/058487.
Office Action dated Jun. 27, 2019 in U.S. Appl. No. 15/856,491.
International Preliminary Report on Patentability dated Dec. 19, 2019 in International Application PCT/IB2017/056029.
International Preliminary Report on Patentability dated Dec. 19, 2019 in International Application PCT/IB2017/058487.
Office Action dated Jan. 10, 2020 in U.S. Appl. No. 15/856,491.
Office Action dated Jun. 26, 2020 in U.S. Appl. No. 15/856,491.
International Search Report and Written Opinion dated Jan. 19, 2018 in International Application PCT/IB2017/056024.
International Search Report and Written Opinion dated Jan. 19, 2018 in International Application PCT/IB2017/058486.
A. Bewley et al., "Online self-supervised multi-instance segmentation of dynamic objects," 2014 IEEE International Conference on Robotics and Animation (ICRA), Jun. 7, 2014.
J. Leonard et al., "A perception-driven autonomous urban vehicle," Journal of Field Robotics, Sep. 25, 2018.
Office Action dated Aug. 9, 2018 in U.S. Appl. No. 15/615,198.
Office Action dated Mar. 5, 2019 in U.S. Appl. No. 15/615,198.
Office Action dated Aug. 21, 2019 in U.S. Appl. No. 15/615,198.
Office Action dated Feb. 13, 2020 in U.S. Appl. No. 15/615,198.
International Preliminary Report on Patentability dated Dec. 19, 2019 in International Application PCT/IB2017/056024.
International Preliminary Report on Patentability dated Dec. 19, 2019 in International Application PCT/IB2017/058486.
Office Action dated Sep. 16, 2020 in U.S. Appl. No. 15/615,198.
International Search Report and Written Opinion dated Apr. 13, 2018 in International Application PCT/IB2017/058488.
International Search Report and Written Opinion dated Apr. 13, 2018 19, 2018 in International Application PCT/IB2017/058494.
International Search Report and Written Opinion dated Mar. 13, 2018 in International Application PCT/IB2017/056020.
Ouyang, Shuxin et al., "Cross-Modal Face Matching: Beyond Viewed Sketches," Computer Vision—ACCV 2014, Lecture Notes in Computer Science, vol. 9004, Springer, Cham; Publication [online], Apr. 16, 2015 [retrieved Feb. 26, 2018], Retrieved from the internet: <URL:https://link.springer.com/chapter/10.1007%2F978-3-319-16808-1_15/>; p. 5, paragraph 4-p. 6, paragraph 1, p. 9, paragraph 1.
Office Action dated Feb. 20, 2020 in U.S. Appl. No. 15/856,215.
Office Action dated Feb. 20, 2020 in U.S. Appl. No. 15/856,600.
Lange, Stefan et al., "Online vehicle detection using deep neural networks and lidar based preselected image patches," 2016 IEEE Intelligent Vehicles Symposium {IV), Gothenburg, Sweden, Jun. 19-22, 2016, pp. 954-959.
Liu, Shaoshan et al., "Implementing a Cloud Platform for Autonomous Driving," Version 1 as submitted to/published at Arxiv.org on Apr. 10, 2017, 9 pages, downloaded from: https://arxiv.org/abs/1704.02696.
Ran, Bin et al., "Development of vision based vehicle detection and recognition systems for intelligent vehicles," Transportation Research Record 1679, Paper No. 99-0781, Jan. 1999, pp. 130-138.
International Preliminary Report on Patentability dated Dec. 19, 2019 in International Application PCT/IB2017/058488.
International Preliminary Report on Patentability dated Dec. 19, 2019 in International Application PCT/IB2017/056020.
International Preliminary Report on Patentability dated Dec. 19, 2019 in International Application PCT/IB2017/058494.
Office Action dated Aug. 14, 2020 in U.S. Appl. No. 15/856,600.
Office Action dated Aug. 14, 2020 in U.S. Appl. No. 15/856,215.
Office Action dated Jun. 26, 2019 in U.S. Appl. No. 15/856,332.
Office Action dated Dec. 23, 2019 in U.S. Appl. No. 15/856,332.
Office Action dated May 12, 2020 in U.S. Appl. No. 15/856,332.
Office Action dated Jul. 5, 2019 in U.S. Appl. No. 15/615,284.
Office Action dated Aug. 7, 2019 in U.S. Appl. No. 15/586,600.
Office Action dated Aug. 7, 2019 in U.S. Appl. No. 15/856,215.
Office Action dated Feb. 14, 2020 in U.S. Appl. No. 15/615,284.
Office Action dated Aug. 18, 2020 in U.S. Appl. No. 15/615,284.
Office Action dated Oct. 14, 2020 in U.S. Appl. No. 15/856,332.
Office Action dated Jan. 28, 2021 in Chinese Application 201780091721.X.
European Search Report dated Feb. 9, 2021 in European Application 17912615.6.
Xiong Guangming et al., "Object Distance Estimation Based on Stereo Vision and Color Segmentation with Region Matching," Nov. 29, 2010.
Office Action dated Jan. 6, 2021 in U.S. Appl. No. 15/856,491.
Office Action dated Mar. 18, 2021 in U.S. Appl. No. 15/856,215.
Office Action dated Mar. 24, 2021 in U.S. Appl. No. 15/856,332.
European Search Report dated Mar. 22, 2021 in European Application 17912641.2.
Samyong Kim et al., "Front and Rear Vehicle Detection and Tracking in the Day and Night Times Using Vision and Sonar Sensor Fusion," 2005 IEEE/RSJ International Conference on Intelligent Robots and System, Aug. 2, 2005, pp. 2306-2311.
Office Action dated Feb. 4, 2021 in U.S. Appl. No. 15/615,198.
Notice of Allowance dated Feb. 18, 2021 in U.S. Appl. No. 15/615,284.
Partial Supplementary European Search Report dated Feb. 5, 2021 for European Application No. 17912641.2, 9 pages.
Second Office Action dated Sep. 22, 2021 for Chinese Application No. 201780091721.X, with English translation, 28 pages.
Extended European Search Report dated Jan. 19, 2021 for European Application No. 17912614.9, 7 pages.
Third Office Action dated Mar. 18, 2022 for Chinese Application No. 201780091721.X, with English translation, 26 pages.

* cited by examiner

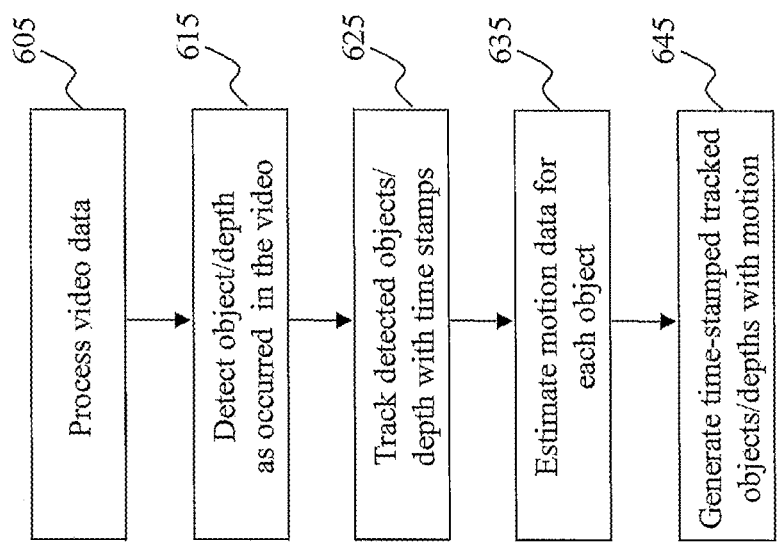

METHOD AND SYSTEM FOR OBJECT CENTRIC STEREO IN AUTONOMOUS DRIVING VEHICLES

BACKGROUND

1. Technical Field

The present teaching generally relates to computer aided perception. More specifically, the present teaching relates to automated adaptive computer aided perception.

2. Technical Background

With recent technological advancement in artificial intelligence (AI), there is a surge in applying AI in different application fields. This includes the field of autonomous driving, in which identifying and tracking objects or obstacles around a vehicle is essential. Traditionally, sensors are installed around a vehicle to continuously collect surrounding data. Such collected data are then analyzed in real-time to detect obstacles which can then be used to control the vehicle in obstacle avoidance. 2D sensors and 3D sensors have been utilized in such applications. For example, cameras can be installed to collect 2D images which can be analyzed to detect objects. 3D sensors such as LiDAR can be used to collect 3D depth data to provide information about distance between the vehicle and the obstacles.

Sensors serve as eyes to an autonomous driving vehicle. However, different sensors have different limitations. For example, 2D cameras are known to be sensitive to lighting conditions caused by, e.g., the time of the day, weather such as raining or snowing, etc. 2D images do not provide depth measurements. Although distance can be estimated based on traditional stereo using multiple cameras, it is computationally expensive and, hence, slow and yet often cannot be used to generate a depth map with adequate density. Although 3D sensors such LiDAR has been used to acquire depth information to generate a point cloud for the surrounding obstacles, such sensing technology also has the limitations of limited range and low data density.

In addition to sensor limitations, there are also other drawbacks of current computer aided perception systems in the field of autonomous driving. For instance, to adapt the dynamics of different situations, a learning mechanism is usually employed. However, the common known bottleneck problem for learning remains as to how efficiently generate meaningful training data for adaptation. Traditionally, training data need to be labeled manually or semi-manually, which makes it very difficult, if not impossible, to adapt on-the-fly to, e.g., make self-corrections in real time. It is not only too slow to produce training data but also too costly due to involvement of manual work.

Furthermore, autonomous driving has so far remained at the stage of demonstrative presentations. Much of the research and implementations do not bear in mind of the scalability of the technologies deployed when a fleet of vehicles (which could be thousands or more) are involved. For example, thousands of cars are on the road every day and frequently gather data that reflect many different dynamics. Such data provide rich source of information that can be used to continuous adaptation. However, because traditional approaches cannot label such data on-the-fly to produce meaningful training data, it is an unsolved problem as to how to adapt while the vehicle is operating. In addition, given the volume of data that can be collected by the fleet, how to adapt based on experiences of thousands of vehicles remains an unsolved problem.

Therefore, there is a need to provide an improved solution for a computer aided perception system in autonomous driving.

SUMMARY

The teachings disclosed herein relate to methods, systems, and programming for online services. More particularly, the present teaching relates to methods, systems, and programming for developing a virtual agent that can have a dialog with a user.

In one example, a method implemented on a computer having at least one processor, a storage, and a communication platform for processing image data in an autonomous driving vehicle is disclosed. Sensor data acquired by one or more types of sensors deployed on the vehicle are continuously received. The sensor data provide different information about surrounding of the vehicle. Based on a first data set acquired by a first sensor of a first type of the one or more types of sensors at a specific time, an object is detected, where the first data set provides a first type of information about the surrounding of the vehicle. Depth information of the object is then estimated via object centric stereo at object level based on the object detected as well as a second data set acquired by a second sensor of the first type of the one or more types of sensors at the specific time. The second data set provides the first type of information about the surrounding of the vehicle with a different perspective as compared with the first data set.

In a different example, a system for processing image data in an autonomous driving vehicle is disclosed. The system comprises one or more data processing units for receiving, continuously, sensor data acquired by one or more types of sensors deployed on the vehicle, wherein the sensor data provide different information about surrounding of the vehicle, an object detector configured for detecting an object from a first data set acquired by a first sensor of a first type of the one or more types of sensors at a specific time, wherein the first data set provides a first type of information about the surrounding of the vehicle, and an object centric stereo unit configured for estimating depth information of the object based on object centric stereo at object level based on the object detected as well as a second data set acquired by a second sensor of the first type of the one or more types of sensors at the specific time, wherein the second data set provides the first type of information about the surrounding of the vehicle with a different perspective as compared with the first data set.

Other concepts relate to software for implementing the present teaching on developing a virtual agent. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, machine readable non-transitory medium is disclosed, wherein the medium has data for processing image data in an autonomous driving vehicle recorded thereon so that the data, when read by the machine, causes the machine to perform various steps, including receiving, continuously, sensor data acquired by one or more types of sensors deployed on the vehicle, wherein the sensor data provide different information about surrounding of the vehicle, detecting an object from a first data set acquired by a first sensor of a first type of the one or more types of sensors at a specific time, wherein the first data set provides a first type of information about the surrounding of the vehicle, and estimating depth information of the object based on object centric stereo at object level based on the object detected as well as a second data set acquired by a second sensor of the first type of the one or more types of sensors at the specific time, wherein the second data set provides the first type of information about the surrounding of the vehicle with a different perspective as compared with the first data set.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6B is a flowchart of an exemplary process of an object detection & tracking unit, according to an embodiment of the present teaching;

DETAILED DESCRIPTION

Figure 1:
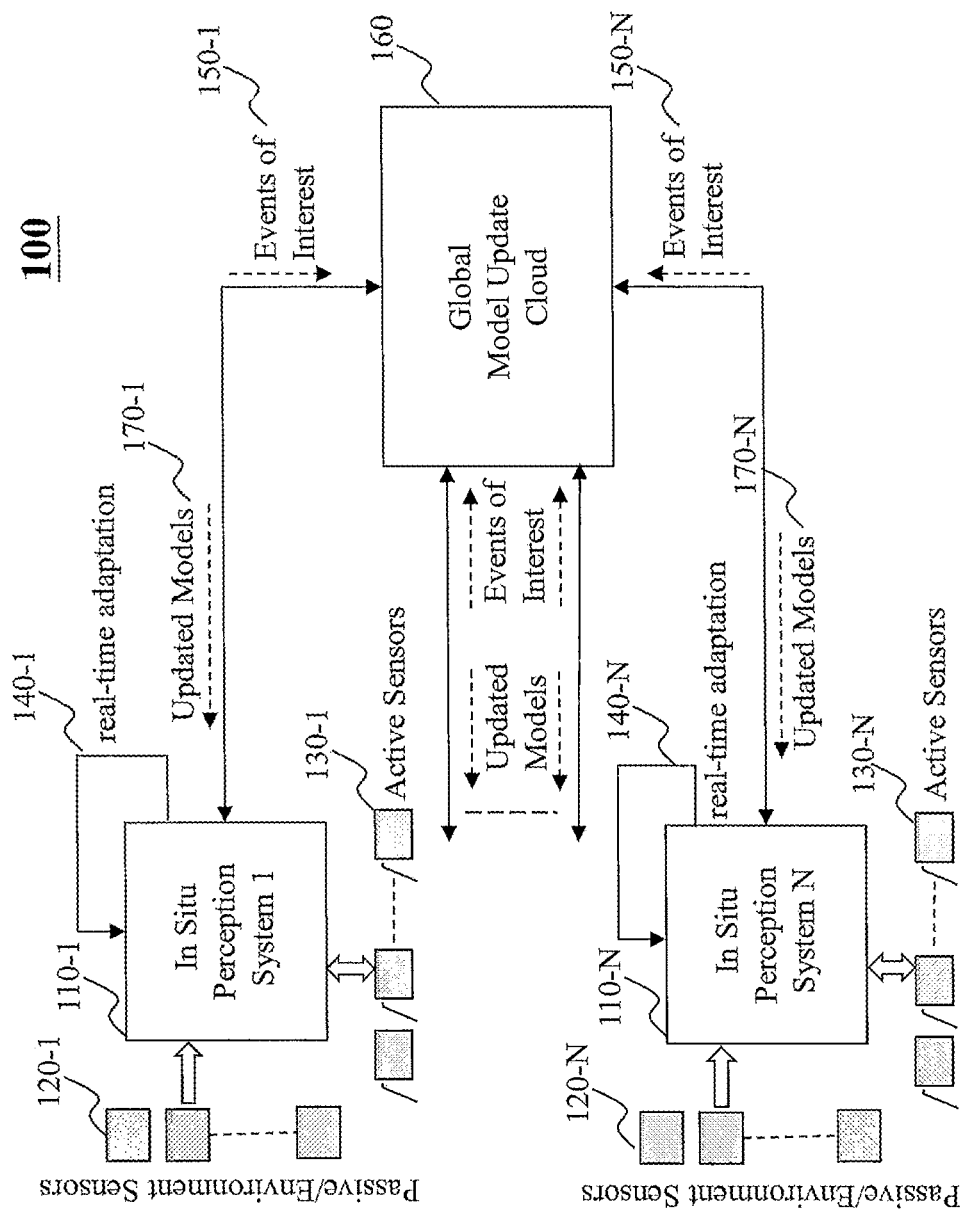
FIG. 1 depicts a framework of computer aided perception system supporting a fleet of autonomous driving vehicles, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to developing, training, and deploying effective computer aided perception system for autonomous driving vehicles. In different embodiments, the present teaching discloses an in situ computer aided perception system, method, and medium for on-the-fly model based object detection and cross validation in different dimensions to enable automatic on-the-fly training data labeling. With the ability of automatic training data labeling, the models for object detection may be locally adapted continuously on-the-fly based on such efficiently labeled training data to improve performance. The disclosed in situ computer aided perception system thus is self-adaptive on-the-fly.

To further enhance the performance at a global level, the present teaching discloses that an in situ computer aided perception system on each autonomous driving vehicle in a large fleet may automatically select appropriate labeled training data and transmit to a model update cloud. In this manner, hundreds of thousands sets of labeled training data (generated while the vehicles are in operation) from diverse types of environment are consolidated at the model update cloud so that global models can be updated based on a wide range of labeled training data from sources. As such fleet data present meaningful data related to a wide variety of perception conditions and situations, the global models can be trained and re-trained on a continuous basis to handle intended tasks in different conditions.

According to the present teaching, to be able to label training data on-the-fly, regions of interest detected from data in some modality (e.g., video images from cameras) may be cross checked using data from a different modality (e.g., range data from, e.g., LiDAR sensor). Detected regions may also be validated cross time when additional information becomes available. For example, an object detected a few seconds earlier may be continuously tracked and motion information may be estimated. When the object becomes closer in distance later in time, more information becomes available and the detection can be continuously validated in time with enhanced certainty. The enhanced certain validation later in time may be used to validate the detection of the object at an earlier time. In this manner, the object detected earlier in time may also be labeled as such and can be used as training data to further adapt the model, both locally and globally, to improve future performance.

In autonomous driving, one of the most essential tasks is to be able to accurately estimate the distance between the vehicle and any of the objects surrounding the vehicle (other vehicles, trees, curb, pedestrians, buildings, etc.). A key to autonomous driving is to know the distance between a vehicle and all surrounding objects in real time so that the vehicle can be controlled to react timely. The present teaching discloses object centric stereo based depth estimation. The object centric stereo, as disclosed herein, estimates depth of object by perform object based stereo (rather than point based stereo). Based on disparity of two cameras, which is generally know once the cameras are installed, object detected in one view acquired by a first camera may be warped to another view acquired by a second camera. Local optimization may be applied to optimize the fit in the second view. The two corresponding objects in different views may then be used to estimate the depth of the object, instead the depth of each point of the object. The object centric stereo is faster yet serves the purpose of estimating the distance of the object of interest.

The present teaching further discloses augmented object centric stereo. The object depth estimated based on the object centric stereo as discussed above may be further enhanced or augmented by applying cross modality validation. In some embodiments, the object depth estimated based on the object centric stereo approach using data (e.g., images) from passive camera sensors may be further enhanced based on range data acquired by a sensor in a different modality, e.g., LiDAR sensors. In this manner, the depth estimate may be performed more reliably with speed and enhanced accuracy.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 depicts a framework 100 of computer aided perception system supporting a fleet of autonomous driving vehicles, according to an embodiment of the present teaching. The framework 100 comprises a fleet of N autonomous driving vehicles, each of which has an in situ perception system, namely 110-1, . . . , 110-N, and a global model update cloud 160 which connects with the fleet via network connections. Each autonomous driving vehicle is deployed with various sensors, including, but not limited to, passive/environment sensors 120 (120-1, . . . , 120-N associated with N in situ perception systems, respectively) and active sensors 130 (130-1, . . . , 130-N associated with N in situ perception systems, respectively).

According to the present teaching, each in situ perception system utilizes certain models to perform computer aided perception (more details about such models will be described below) and is capable of model self-adaption. This is shown in FIG. 1 by the self-feedback loop link 140 (140-1, . . . , 140-N associated with the N in situ perception systems, respectively). That is, the in situ perception system in each autonomous driving vehicle can locally adapt its models based on data acquired locally. As common known, to adapt, training data is required with ground truth labeled. Traditionally, such training data and label of ground truth are generated via manual labeling, which is time consuming, labor intensive, and most of all slow. The present teaching discloses an approach to generating training data and labeling ground truth on-the-fly. Details will be provided with reference to FIGS. 2-12.

Framework 100 also provides global adaptation of models based on training data labeled by the in situ perception systems in many vehicles. Each in situ perception system may select some labeled data as events of interest 150 (150-1, . . . 150-N generated by N in situ perception systems, respectively) and transmit then to the global model update cloud 160. With events of interest from the fleet, the global model update cloud 160 may re-train or adapt the global models based on training data from the fleet that represent a wider range of diversified sources of information and operational conditions. For example, some vehicles may drive in city roads, some in countryside, some in snow, some in day time with sun glares, some in rain, some at nights, etc.

With such continuously provided labeled training data from many different sources, the global model update cloud 160 is to globally adapt the models so that they can be used to handle perception tasks in many different situations. Whenever the global model update cloud 160 generates updated models, it distributes the updated models 170 to all the vehicles in the fleet. Specifically, it distributes updated models 170-1, . . . , 170-N to N in situ perception systems, respectively.

In some embodiments, the in situ perception systems in the vehicles may transmit its selected events of interest in accordance with some schedule and/or frequency to synchronize with the global model update cloud 160. In some embodiments, the updated models from the global model update cloud 160 may also be scheduled so as to achieve synchronization. In other embodiments, the synchronization between the global model update cloud 160 and the fleet may be divided into different stages, i.e., synchronization may each time be applied to a part of the fleet. The division of parts of the fleet may be based on different considerations. In some embodiments, the division may be according to time zones. In other situation, the division may be according to types of vehicles, e.g., semi-trucks, trucks, sedans, sports cars, SUVs, etc. Sometimes, the division may be based on vehicle operating environment, e.g., city, rural, mountain, etc. In yet other considerations, the division can also be based on weather, e.g., snow, rain, sun glare, dark, etc. The division of the fleet in terms of model update may be application dependent.

With framework 100, when each autonomous driving vehicle is in operation, it has the ability to locally adapt its models using locally collected data to conform to the situation, while it may also benefit from the events of interests collected by other vehicles via the globally updated models from the global model update cloud 160. So, there are two closed loops for model adaptation, one is local which is distributed and one is global which is centralized. Each may provide benefits for different purposes. The distributed adaptation by each in situ perception system may be more for the short term adjustment to the behavior of the system based on local data. Although short term, it is more targeted. While the global adaptation may be more towards a global resolution of the modeling based on a wider range of data representing different situations, which may cover a wider range of possibilities but may be less individualized as to specific situation. There may be a balance between local and global adaptation. More details will be provided below on modeling and adaptation thereof.

Figure 2:
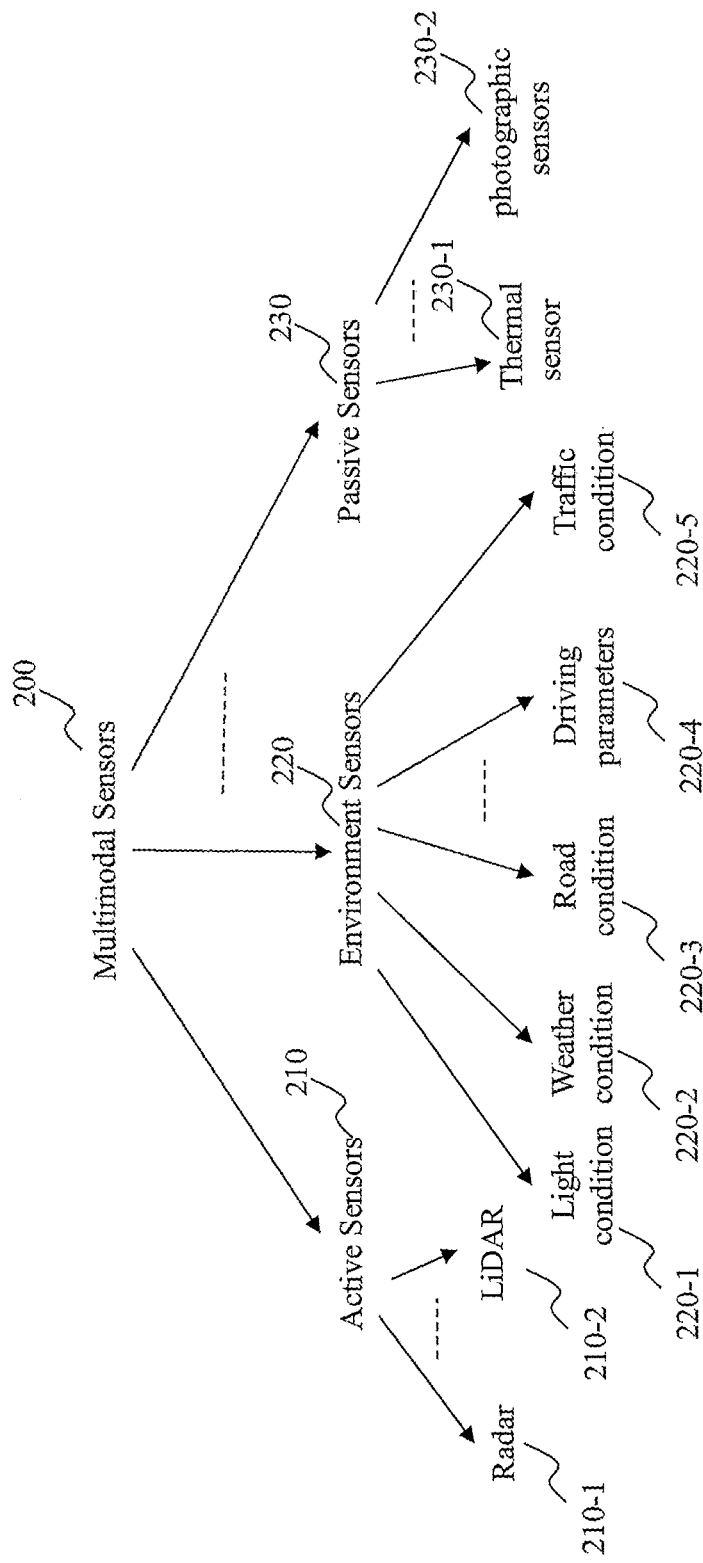
FIG. 2 illustrates exemplary types of multimodal sensors that can be deployed in accordance with an embodiment of the present teaching.

FIG. 2 illustrates exemplary types of multimodal sensors 200 that can be deployed in accordance with an embodiment of the present teaching. As shown in FIG. 1, each vehicle 110 may be equipped with different types of sensors, including active sensors, environment sensors 120, and passive sensors 130. Multimodal sensors 200 in FIG. 2 fall into different sensor categories, including, but not limited to, active sensors 210, environment sensors 220, . . . , and passive sensors 230. Active sensors 210 may include, but not limited to, radar 210-1, . . . LiDAR 210-2. Passive sensors 230 may include, but not limited to, thermal sensors 230-1, . . . and photographic sensors such as (video) camera 230-2. Environment sensors 220 may include a diversified range of sensors, including sensors installed on the vehicle and the ones that may be installed elsewhere but the vehicle may obtain the sensed information via network connections. Environment sensor data that play a role in autonomous driving may be acquired. Examples include sensors data that indicate the light condition (220-1), weather condition (220-2) such as whether it is snowing, road condition (220-3) such as whether the road is wet, driving parameters (220-4) such as speed, . . . , and traffic condition (220-5) such as light, medium, or heavy traffic, etc. Environment can also include (not shown in FIG. 2) time of the day, season, locale, etc.

Figure 3:
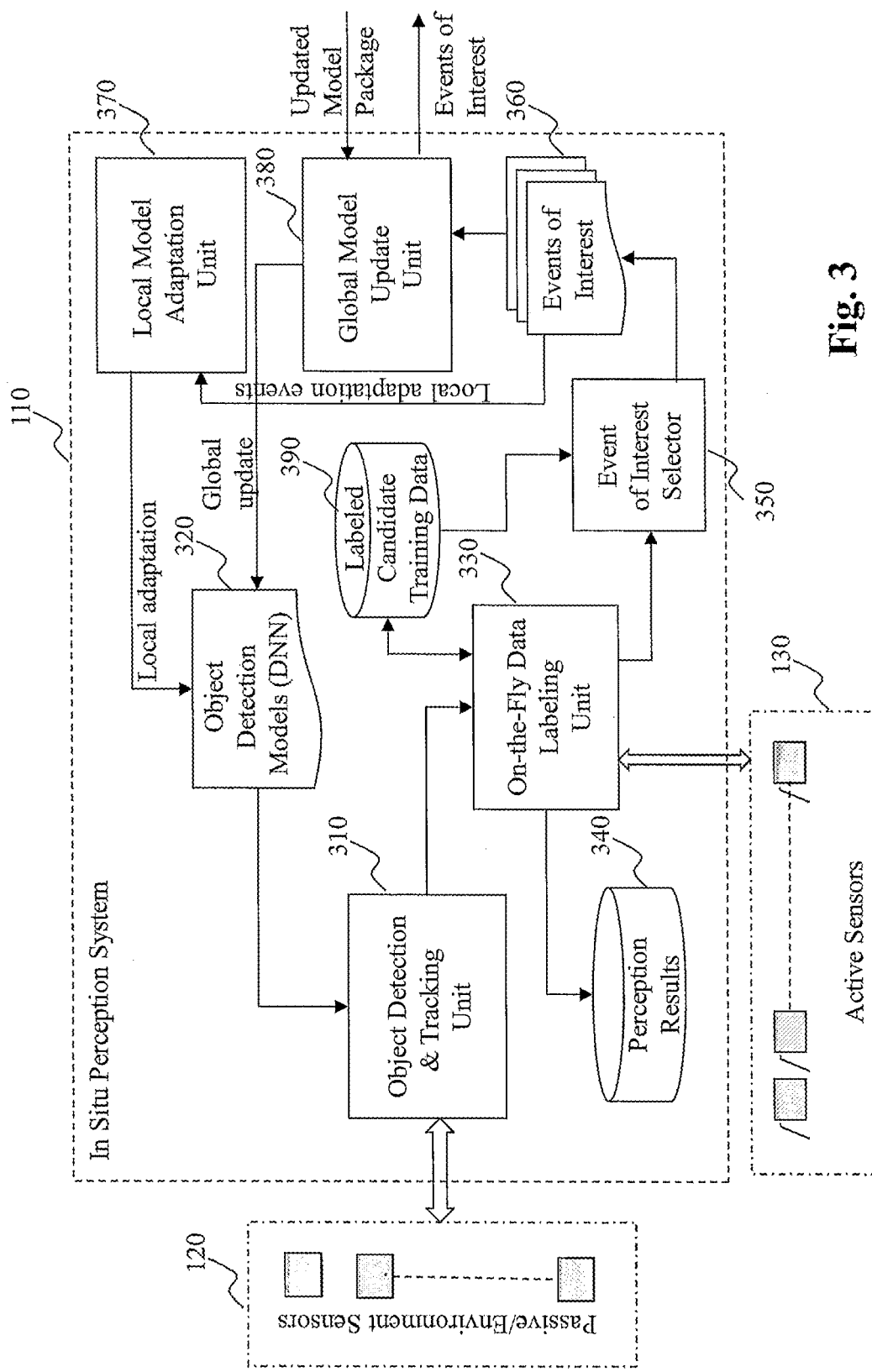
FIG. 3 depicts an exemplary high level system diagram of an in-situ perception system residing in an autonomous driving vehicle, according to an embodiment of the present teaching.

FIG. 3 depicts an exemplary high level system diagram of an in-situ perception system 110 residing in an autonomous driving vehicle, according to an embodiment of the present teaching. As shown in FIG. 1, the in situ perception system 110 is connected with active/environment sensors 120 and active sensors 130. The in situ perception system 110 comprises an object detection & tracking unit 310, an on-the-fly data labeling unit 330, an event of interest selector 350, a local model adaptation unit 370, and a global model update unit 380. The in situ perception system 110 also includes object detection models 320, which are used by the object detection & tracking unit 310 to detect objects from sensor data, and a storage for events of interest 360 which are selected by the event of interest selector 350. The in situ perception system 110 also optionally includes a perception results storage 340 which may store the confirmed detection results.

According to the present teaching, in operation, the in situ perception system 110 receives sensor data from different sensors, detects/tracks objects of interest from the sensor data, labels such detected objects as potential training data, performs local model adaptation based on labeled training data, selects events of interests for global adaptation, transmits such selected events of interest to the global model update cloud 160, and updates the object detection models when it receives the updated models from the global model update cloud 160. Specifically, the object detection/tracking unit 310 receives video images from passive sensor(s) (e.g., video camera(s)) and performs object detection and tracking based on the video images. Object detection includes not only identification of objects but also properties associated therewith such as depth, motion, etc. Details on object detection and tracking will be discussed with reference to FIGS. 6A-9.

The tracked objects are sent to the on-the-fly data labeling unit 330, where the tracked objects are processed for cross validation, either based on data from sensors of different modalities or data from previous times, to enable on-the-fly labeling of candidate training data. Such labeled candidate training data are stored in storage 390 for labeled candidate training data. In some embodiments, cross validation may be carried out in either spatial or temporal domain or both. With regard to temporal domain cross validation, some of the labeled candidate training data stored in storage 390 may be re-labeled later in time, as shown by the bi-directional arrow to the storage 390. Some of such labeled data may correspond to perception results (e.g., if cross validation confirms the detected objects) or be sent to the events of interest selector 350, where events that can be used to adapt models are selected. Detailed disclosure related to on-the-fly data labeling is provided with reference to FIGS. 10-12.

Once the labeled data are received at the events of interest selector 350, the labeled data are processed so that events of interest may be selected for both local adaptation and global model update. The selected events of interest are sent to the storage 360 so that the local model adaptation unit 370 can select the events selected for local model adaptation and use them to perform local model adaptation. Similarly, the global model update unit 380 may select from the storage 360 those events of interest designated for global model update and transmit those events to the global model update cloud 160. The local model adaptation unit 370 adjusts the object detection models 320 based on selected events of interest to generate modified or tweaked models. When the global model update unit 380 receives updated model package from the global model update cloud 160, it updates the object detection models 320. In some embodiments, the globally updated models may be used to replace the local object detection models 320. In some embodiments, the received updated model package may be used to modify the local object detection models 320. In other embodiments, the local object detection models 320 may be partially replaced using the global updated model. Details related to the events of interest selector 350, the local model adaptation unit 370, and the global model update unit 380 are provided with reference to FIGS. 13A-19.

Figure 4A:
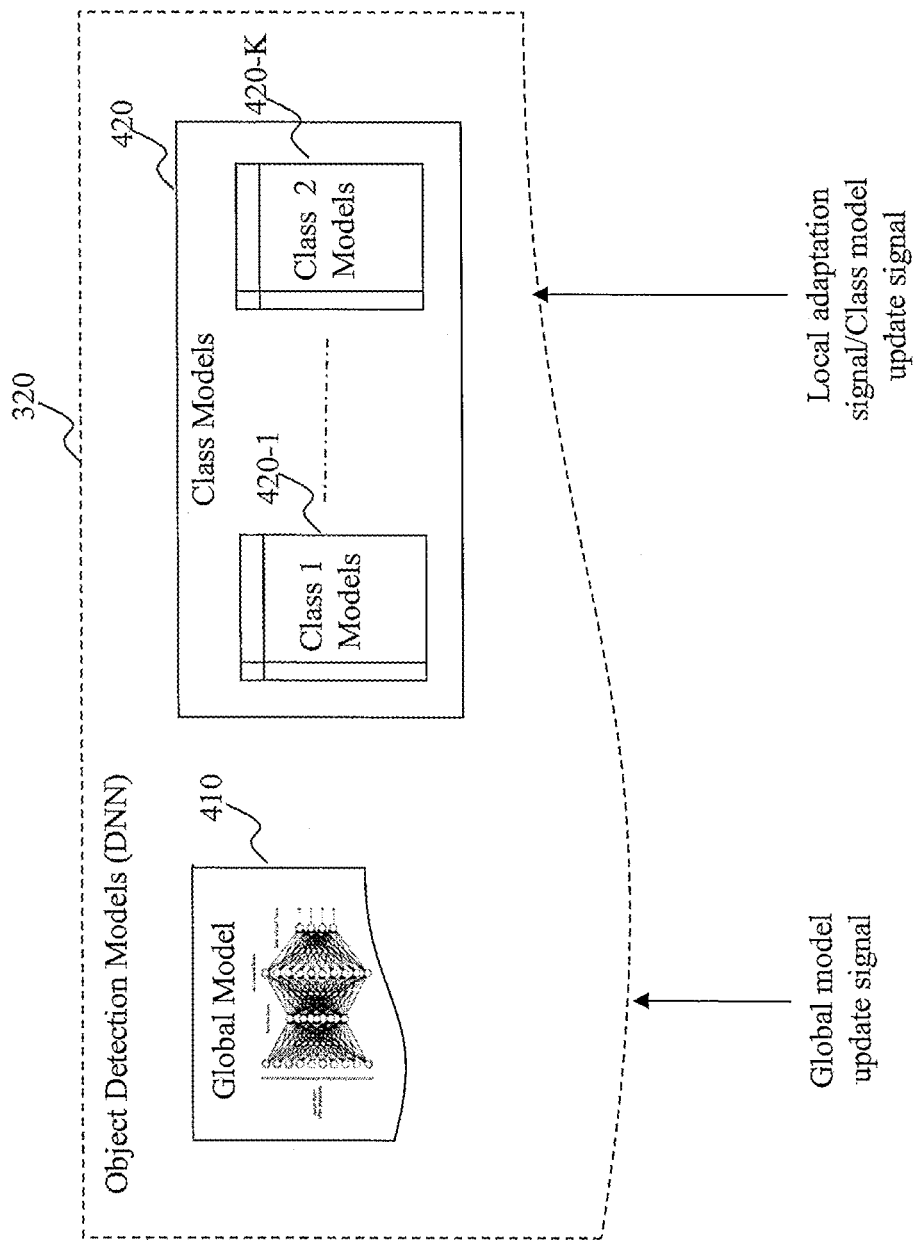
FIG. 4A depicts exemplary object detection models with an exemplary structure, according to an embodiment of the present teaching.

FIG. 4A depicts exemplary object detection models 320 with an exemplary structure, according to an embodiment of the present teaching. As shown in FIG. 4A, the object detection models 320 comprise a global model 410 and optionally class models 420, which further comprise K class models 420-1, . . . , 420-K. The global model 410 may correspond to the one that is synchronized with the global model regularly updated by the global model update cloud 160 and distributed to all vehicles. It is shown that the global model 410 is updated based on a global model update signal, e.g., from the global model update unit 380 based on the received updated model package. The class models 420 may be optional and they may correspond to various object detection models that may be developed for more narrowly defined situations. For different types of vehicles, due to different physical features, sensors may be installed and configured differently and as a result, object detection models may be configured differently. For example, big semi-trucks may be high so that the models used to detect objects for this type of vehicle may differ from that for, e.g., a sports car which has much lower gravity and require sensors to see obstacles that are low to the ground. As another example, class models may also be provided for vehicles that have quite different operating environments. For instance, a vehicle for agriculture use may require different models when compared with a vehicle that is often being used for commuting in cities.

Figure 4B:
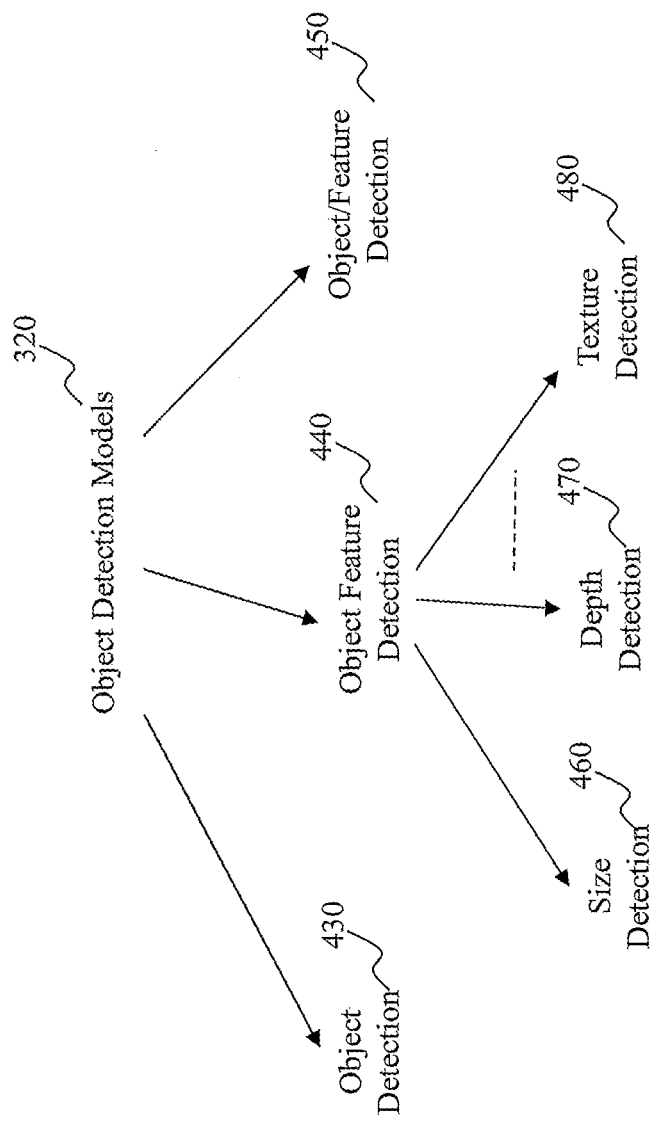
FIG. 4B shows exemplary types of object detection models, according to an embodiment of the present teaching.

FIG. 4B shows exemplary types of object detection models, according to an embodiment of the present teaching. Object detection models may refer to models to be used to detect not only objects themselves but also features thereof. They can be alternative groups of models and can be invoked for different situations. Some models (430) may be for merely object detection, i.e., detecting the locations of objects and possibly their boundaries. Some models (440) may be for merely detecting features associated with objects, including size (460), depth (470), . . . , texture (480) of each object. Some models (450) may be for detecting both object locations as well as features associated therewith. When combined, there may be models for different combinations of object and feature detection. For instance, some models may be used to jointly detect object and depth. Some models may be used to jointly detect object and texture, etc. Different models may require different inputs. For example, if models for jointly detecting objects and depths thereof, they may require video of different views as input in order to estimate depth information.

Figure 4C:
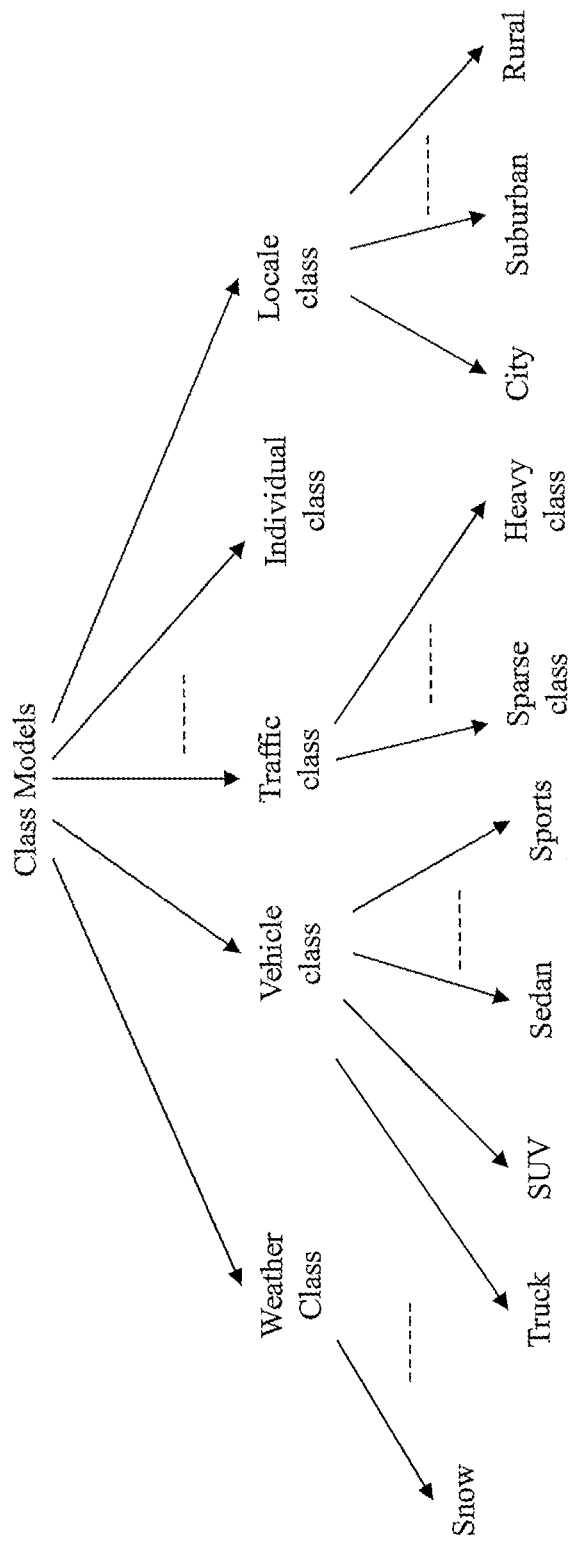
FIG. 4C depicts exemplary types of class models, according to an embodiment of the present teaching.

FIG. 4C depicts exemplary types of class models, according to an embodiment of the present teaching. In this exemplary classification, class models may be in a number of classes, including but not limited to, weather related class models (e.g., models suitable for raining days, snowy days, days with sun glares, etc.), vehicle related class models (e.g., trucks, SUVs, Sedans, sports cars, etc.), traffic dependent class models (e.g., sparse, medium, or heavy traffic situations), locale related class models (e.g., city road, suburban setting, or rural, etc.). The class models may also be applied to personalized models for individuals or groups of individuals, e.g., class models for teen drivers, class models for elderly drivers, class models for people who have long commute every day, etc. In some embodiments, the finest granularity of class models may be personalized class models for individual drivers. Referring back to FIG. 4A, the object detection models are adapted/updated either locally by the in situ perception system 110 based on locally labeled training data or whenever the in situ perception system 110 receives the updated model package from the global model update cloud 160.

Figure 5:
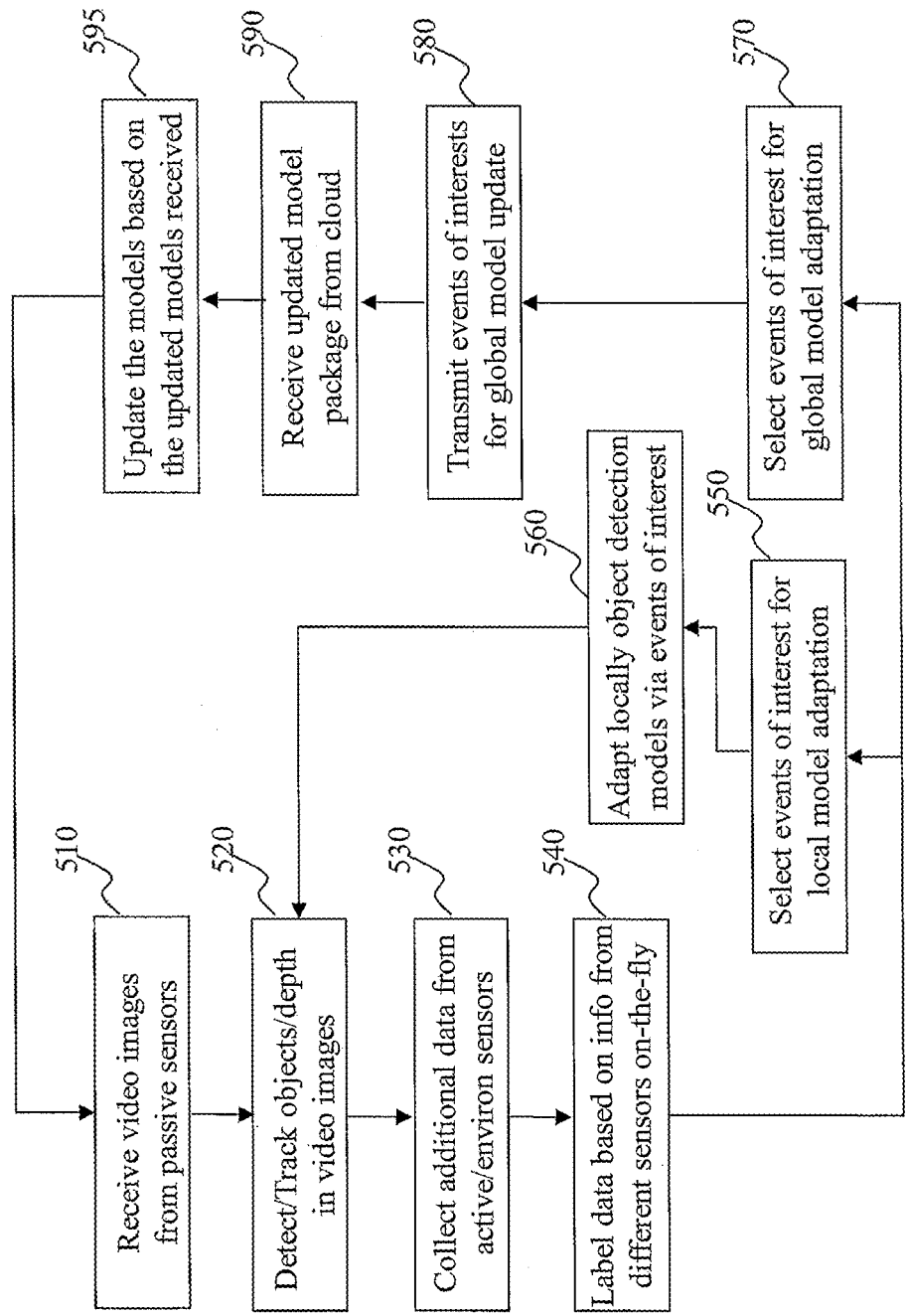
FIG. 5 is a flowchart of an exemplary process for an in-situ perception system, according to an embodiment of the present teaching.

FIG. 5 is a flowchart of an exemplary process for an in-situ perception system 110, according to an embodiment of the present teaching. In this exemplary embodiment, video images are received first from passive sensors at 510. Based on received video images, different objects present in the video images are detected and tracked, at 520, together with various visual properties such as depth and motion associated with each of the objects, etc. To cross validate detected objects based on multimodal sensor information, additional data from other sensors are collected at 530. Other sensors may include range sensor such as LiDAR or environmental sensors that can be used to gather relevant information such as driving speed, weather conditions, etc. which may be relevant to the detection tasks.

Using the additional data from other sensors, the detected objects may be cross validated so that the detected objects may be labeled on-the-fly to create training data. At 540, data are labeled with respect to the detected objects based on information acquired from other sensors. Such validation may be for disambiguating when needed with a probabilistic means (instead of binary decisions). The result of cross validation may provide information indicative of which sensor data may be more trustworthy given the circumstances. With respect to each object, the cross validation result associated therewith may correspond to a feature vector with multiple attributes, which may include, but not limited to, e.g., an overall confidence score as to how likely an object is indeed present in the scene, individual confidence scores associated with each object, each of which may correspond to a different sensor, representing an likelihood of an object present in the scene. Based on such scores, decisions may be made with respect to each detected object, e.g., present or not present.

The cross validation or disambiguation may be carried out not only with respect to the presence of the detected objects but also various properties associated with the object. Examples include object size, object motion, object depth, etc. For example, motion and depth of an object may be derived from different representations of the same scene (different views, visual and range, etc.). Depth may be estimated for each object from video images via stereo. Depth may also be obtained via an active sensor that acquires depth information directly (e.g., LiDAR sensors) from the scene. The same can be said about motion of an object, which can be estimated from different sensor data, e.g., texture images or depth maps. Ideally, properties of an object derived from different types of sensor data should be consistent. In reality, due to environmental variations such as weather condition (snow, sun glare), they often are not. Given that, via cross validation of properties detected from different sensor data may also be applied to disambiguate inconsistent estimates.

As discussed herein, cross validation may be applied cross space and modalities to, e.g., disambiguate inconsistency in object detection and estimation of object properties. Cross validation may also be applied across time. With visual data continuously being acquired over time, object detection and tracking is also continuous. Given the nature of autonomous driving, the appearances of detected objects may change over time because both the objects and the vehicle are likely constantly in motion. For some objects, over time, more and more information may be made available (e.g., when a detected object becomes closer). When this happens, a more definite decision about the presence of an object made later in time may trigger to cross validate a decision about the same object made earlier. For example, if an object appears very small earlier in time and the detection thereof has a lower confidence score. But later the object becomes closer and closer in time and the later detection thereof may have a much higher confidence score. In this case, cross validation cross time may be applied to the earlier decision as to whether the object exists in earlier frames or not. A change in the earlier decision may cause a change to the label for the earlier data, which may thus affect the training data and subsequently the quality of the models trained using such labeled data.

Once the data or objects are labeled at 540, the labeled data are processed so that events of interest may be selected. In some embodiments, events of interest to be used to locally adapt the models may differ from that for updating the global models. In some embodiments, events of interest for both situations may be the same. In FIG. 5, it is shown that events of interest for local adaptation and global update are selected separately. At 550, events of interest for local model adaptation are selected from labeled data. Such selected events of interest are then used, at 560, for local model adaptation. In some embodiments, the local model adaptation may be performed in accordance with some schedule. Local model adaptation may be scheduled based on, e.g., some fixed time intervals, some criterion such as when the events of interest selected have accumulated to a pre-determine volume, or when some events of interest selected suggest an error that needs to be corrected. After the local model adaptation, the process goes back to 510 to continue the operation.

Independently, events of interest for global model update are selected at 560. Once selected, the events of interest for global update are transmitted, at 580, to the global model update cloud 160. When the in situ perception system 110 receives, at 590, the updated model package from the global model update cloud 160, it updates the models stored locally accordingly. The updated model package may include information to update the global model 410 and/or any class models stored in class models 420 (see FIG. 4A). After the models are updated based on the received updated model package, the process goes back to 510 to continue the operation.

So, this process includes at least two closed loops, one is the local model adaptation loop and the other is the global model update loop. The local model adaptation loop may be applied on-the-fly as shown for local model tweak based on locally acquired data. In this mode, the adaptation may be more immediate but focus is mainly on local situations. Although local tweaks can help to improve locally the performance of the models, applying only local model adaptation without more may lead to models that lack a global perspective and hence, may perform inadequately whenever situation changes. On the other hand, global models are updated by the global model updated cloud 160 based on events of interest from a fleet of vehicles (can be as many as hundreds of thousands, covering many different situations (different weather conditions, different driving conditions, different types of vehicles, etc.). As such, the global models built based on a diversified range of training data may cover more situations, enabling each vehicle to handle different situations, yet may not be as effective when applied to a special situation. So, the local model adaptation and global model update may be combined so that local model adaptation may be applied whenever needed to adjust the models but then occasionally (maybe regularly) the models can be updated to incorporate globally adapted models.

Figure 6A:
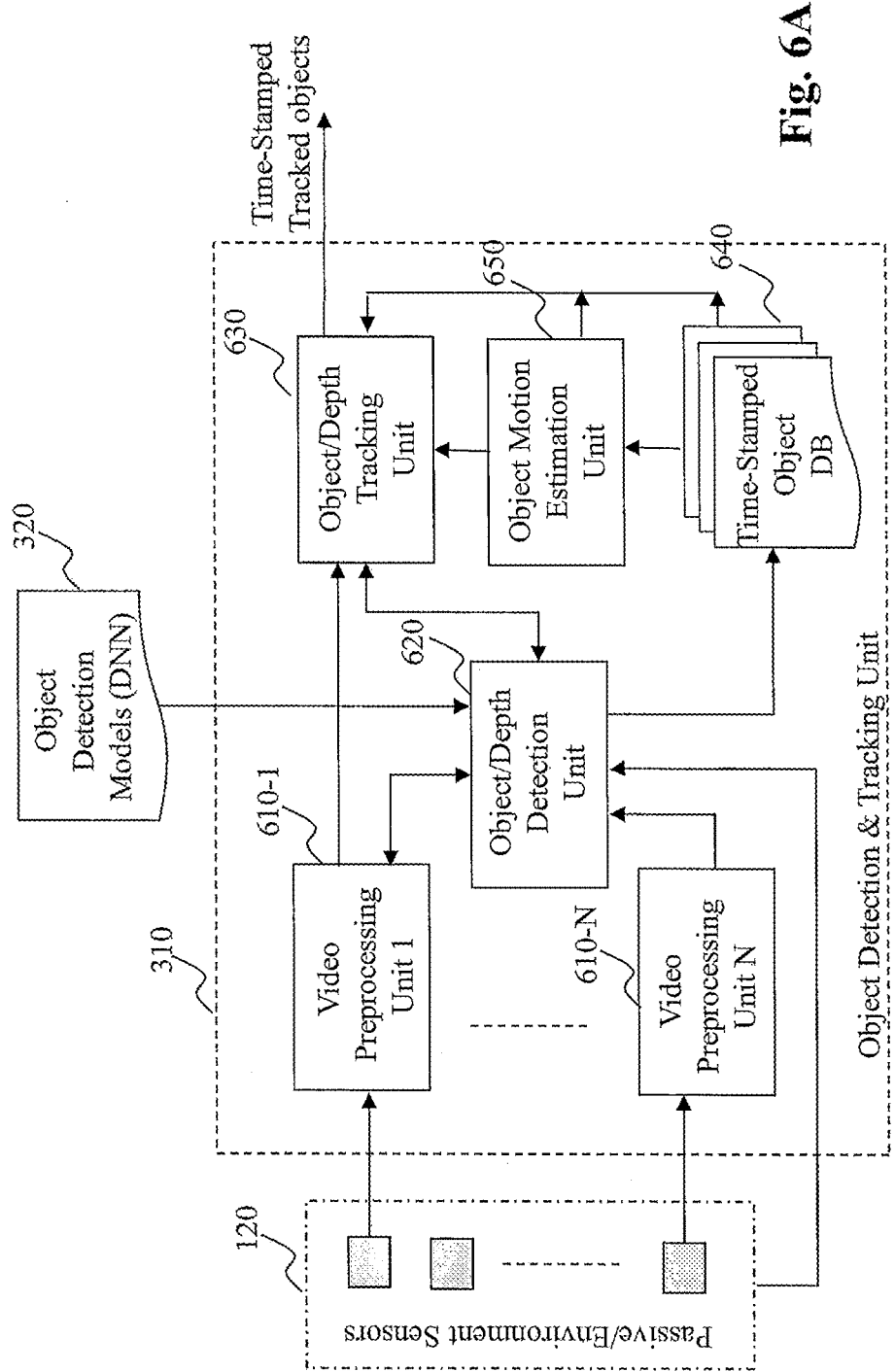
FIG. 6A depicts an exemplary high level system diagram of an object detection & tracking unit, according to an embodiment of the present teaching.

FIG. 6A depicts an exemplary high level system diagram of the object detection & tracking unit 310, according to an embodiment of the present teaching. As disclosed herein, in some embodiments, the object detection and tracking is performed first based on video data. Accordingly, the object detection & tracking unit 310 comprises video preprocessing units 610 (video preprocessing unit 1 610-1, . . . , video preprocessing unit N 610-N), an object/depth detection unit 620, an object/depth tracking unit 630, and an object motion estimation unit 650.

In operation, video preprocessing units 610 receive video data acquired by one or more passive sensors, e.g., video cameras in 120. In some embodiments, additional information may also be acquired such as environmental sensor data. Such environmental data may affect the detection performance or what models to be used for object detection. For example, if there is a particular driving condition, e.g., severe sun glare or snow, appropriate object detection models in 320 may be invoked in order to optimize the performance. In addition, e.g., driving speed may also be acquired, as part of the environmental sensor data, and such information may also affect how various units perform their tasks. For instance, if the vehicle is in high speed, the video preprocessing unit may invoke a different filter to filter the images in order to provide preprocessed images in high quality to the object/depth detection unit 620.

The video image data acquired are preprocessed by one or more video preprocessing units 610. Environment related data are acquired by the environment sensors, as disclosed herein. The object/depth detection unit 620 may detect objects from the preprocessed video images based on the object detection models 320. The object detection/tracking unit 620 may select appropriate models from the object detection models 320 in consideration of the environment sensor data. In addition to the tracking objects, the object-depth detection unit 620 may also estimate the depth of each of such detected objects. For example, as shown, when multiple video image streams are available, object depth may be estimated by the object/depth detection unit 620 based on, e.g., object centric stereo. In some embodiments, other visual features may also be computed for each of the detected objects, e.g., texture which may be useful for object recognition or similar high level understanding of the imaged scene. Details of the object/depth detection unit 620 are discussed with reference to FIGS. 7A-9.

Objects detected by the object detection/tracking unit 620 may be time stamped and stored in time-stamped object database 640 and may be used by the object motion estimation unit 650 to compute the motion data associated with each of such objects. The detected objects may be tracked in video images and suck tracking may also be achieved in conjunction with the estimated motion information from the object motion estimation unit 650. The tracked objects may also be time-stamped and the output of the object detection/tracking unit 310 corresponds to such time-stamped tracked objects.

FIG. 6B is a flowchart of an exemplary process of the object detection & tracking unit 310, according to an embodiment of the present teaching. Video data are processed at 605 and objects and their corresponding depths are detected and estimated at 615. Such detected objects are tracked at 625 and other features such as motion associated with the objects are estimated at 635. Based on the detection and tracking results, time-stamped objects are generated, at 645, with various features associated with each of the objects.

Figure 7A:
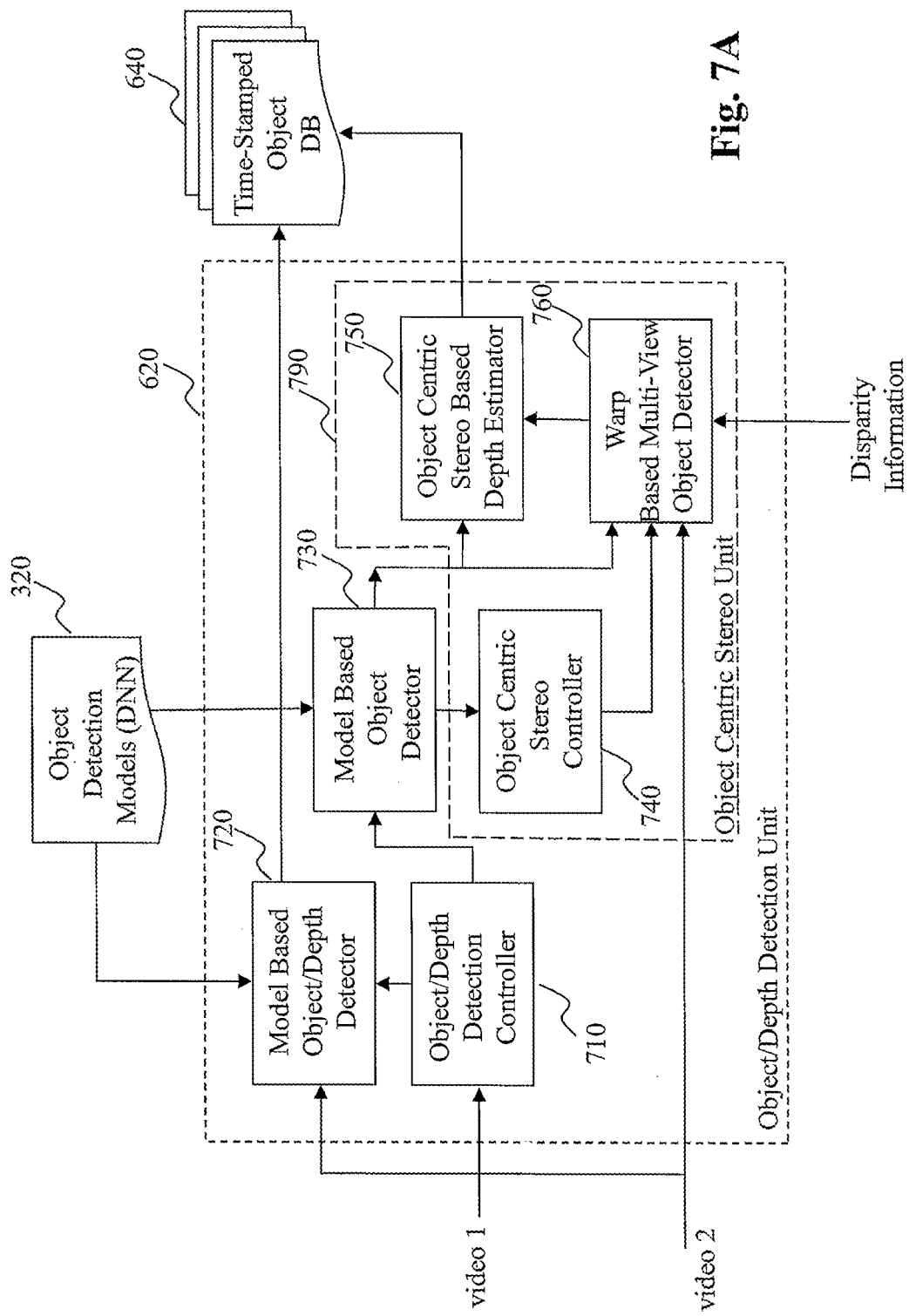
FIG. 7A depicts an exemplary high level system diagram of an object/depth detection unit based on object centric stereo, according to an embodiment of the present teaching.

FIG. 7A depicts an exemplary high level system diagram of the object/depth detection unit 620 based on object centric stereo, according to an embodiment of the present teaching. In this exemplary embodiment, the object/depth detection unit 620 operates in two different modes. In one mode, detection of objects and the depths thereof are carried out based on object models that can be used to detect both jointly. In this mode, input of multiple views may be provided as input. In a different mode, objects and their depths are estimated separately. In an exemplary embodiment of this mode, objects may be detected based on the object detection models 320 and the depths are estimated subsequently using object centric stereo approach. There may be other embodiments for the object/depth detection unit 620 which may be constructed differently to use a single mode of operation or incorporate additional modes of operation within the spirit of the teaching as disclosed herein.

According to the present teaching, the object/depth detection unit 620 comprises an object/depth detection controller 710, a model-based object/depth detector 720, a model based object detector 730, and an object centric stereo unit 790. The object centric stereo unit 790 further comprises an object centric stereo controller 740, a warp based multi-view object detector 760, and an object centric stereo based depth estimator 750. The object/depth detection controller 710 may be responsible for controlling which mode of operation is to be applied. If the mode of operation is to jointly detecting objects and depths thereof, the object/depth detection controller 710 invokes the model based object/depth detector 720, which takes inputs of two videos and activates appropriate models in 320 to detect both object and their depths based on multi-view data. The output of the model based object/depth detector 720 may correspond to multiple objects with corresponding depth information. Each detected object may be represented by its location (centroid or center point), boundary, or even size. The depth information for each of such detected object may correspond to a depth measure for each object (e.g., average depth, closed distance) or a depth map with respect to the region of the object.

If the mode of operation is to detect objects and depth separately, the object/depth detection controller 710 may activate the model based object detector 730 to initiate the object centric stereo. In this approach, the model based object detector 730 performs model based object detection based on images from a first passive sensor (or video 1). Similarly, each detected object may be represented by its location (centroid or center point), boundary, or even size. To estimate the depth of each detected object, the object centric stereo controller 740 may then activate the object centric stereo controller 740 for estimating the depths of the detected objects based on the detected objects from the model based object detector 730.

To estimate the depth of each detected object, the object centric stereo controller 740 activates the warp based multi-view object detector 760, which efficiently detects each of the object detected in the first video in a second view. In some embodiments, this is by warping the object detected in the first view to images of a second view (video 2) based on, e.g., disparity information. The object detection in the second view may be further refined by, e.g., local optimization to improve the accuracy of the location of the object in the second video. The detected instance of the same object in the second view may also be represented by its location (centroid or center point), boundary, or even size. Due to disparity, the locations of the object as appearing in different views differ. So may be the boundary and size. Such differences may be used to estimate the depth of the object at the object level (hence, object centric stereo).

Figure 8A:
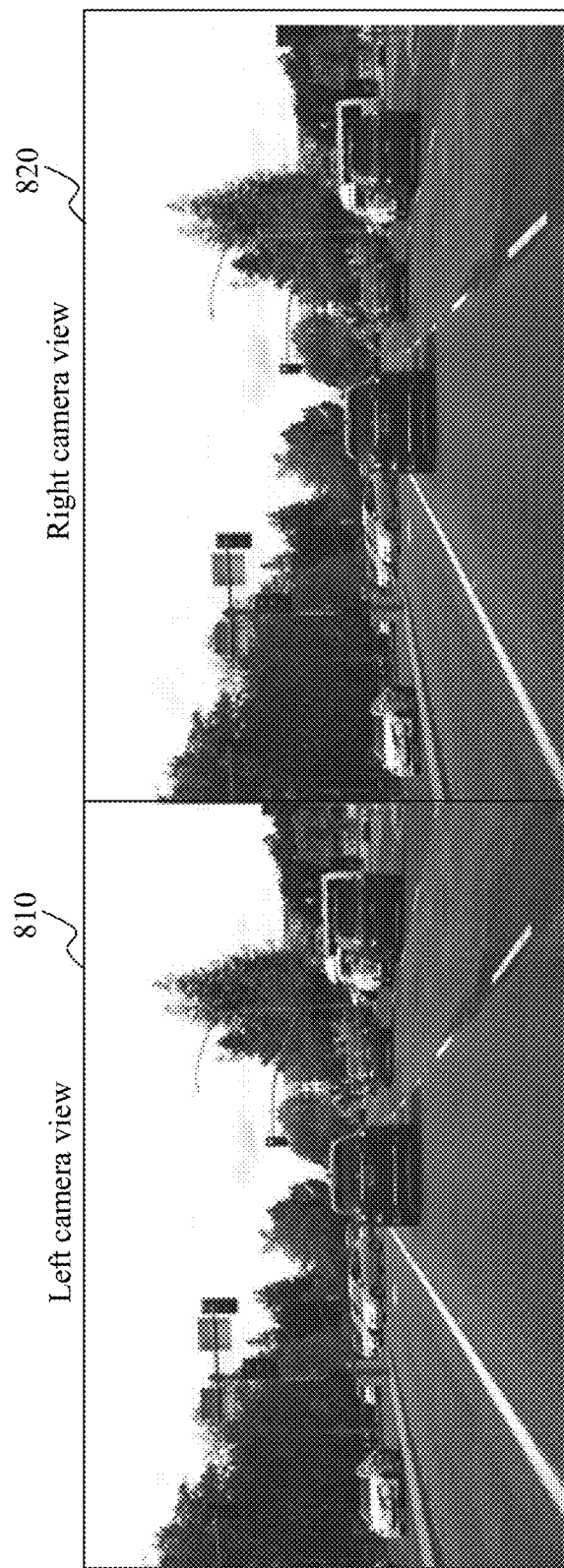
FIG. 8A illustrates two camera views from two cameras on a road scene.
Figure 8B:
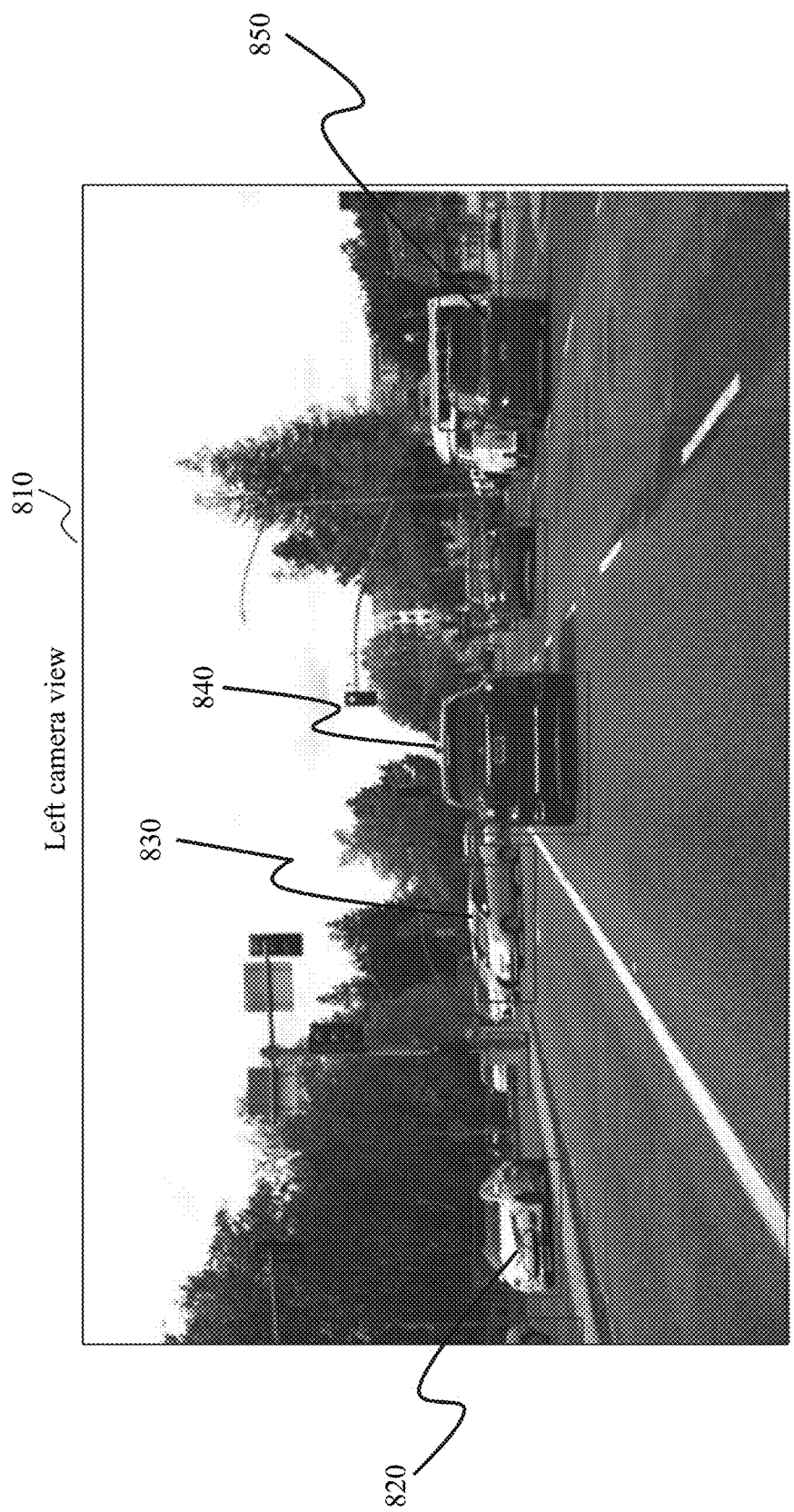
FIG. 8B illustrates object detection results generated based on a 2D image, according to an embodiment of the present teaching.

FIG. 8A illustrates two image views of the same road scene acquired by two different cameras. Label 810 represents the left image view from a first camera and label 820 represents the right image view from a second camera. FIG. 8B illustrates object detection results generated based on the left image view with each box representing a region of interest which is considered to be ab object. For example, as shown, there is an object 840 (a car) in front of the vehicle and detected from the same lane. To the left to the vehicle, there are multiple objects detected, including object 830, object 820, etc. To the right of the vehicle, there are also multiple objects detected, including object 850, etc. As can be seen, some detected objects are close and some are farther away. Some objects are partially occluded in this image but such object may become better detected in time when the spatial relationships among different objects changes over time.

Figure 8C:
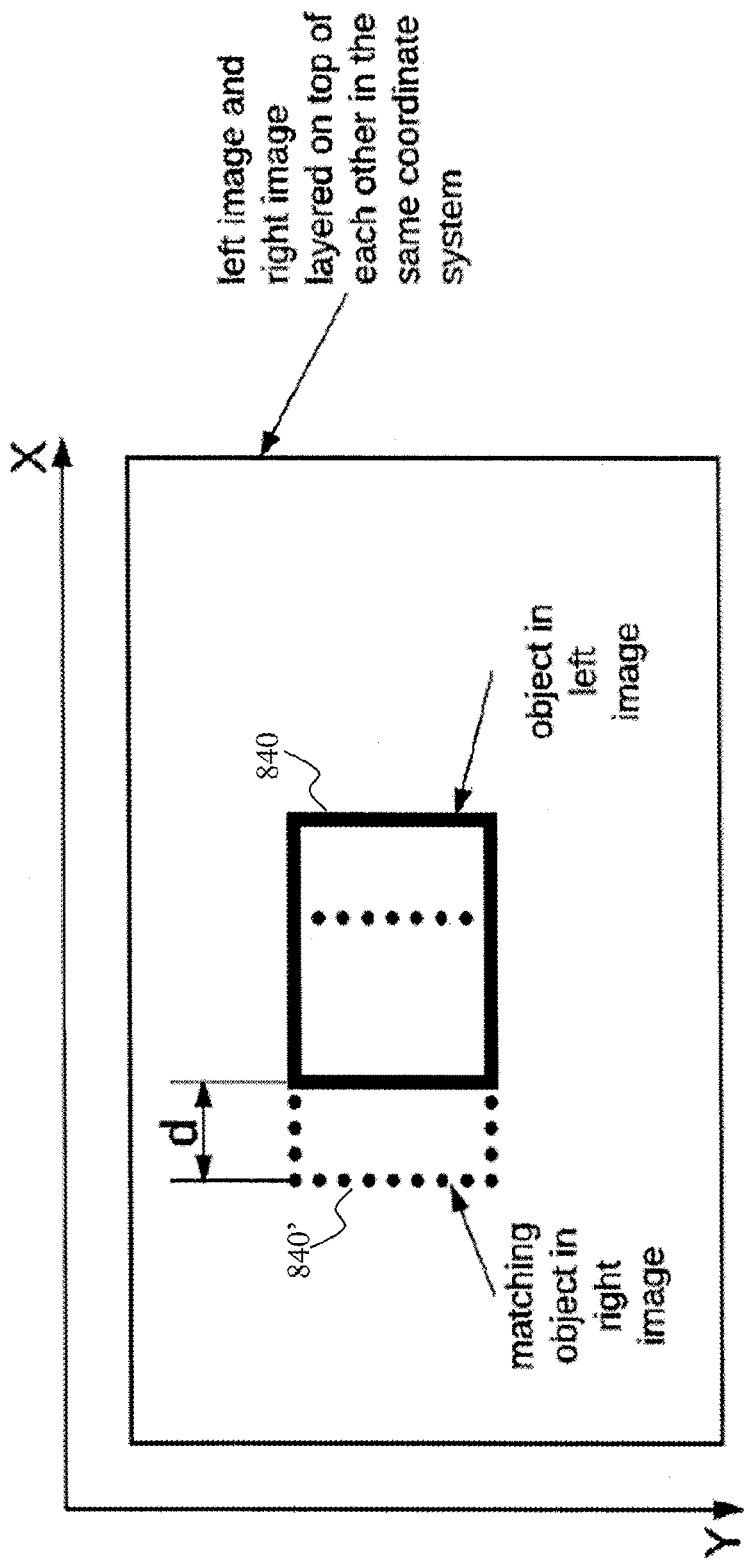
FIG. 8C illustrates the concept of object centric stereo, according to an embodiment of the present teaching.

FIG. 8C illustrates the concept of object centric stereo, according to an embodiment of the present teaching. Label 840 represents an object detected in the left view. Label 840' represents the corresponding object as appeared in the right view, which is displaces by "d" determined by the disparity information. According to object centric stereo, object 840' in the right view (video 2) is not detected (save computation). It is estimated by warping object 840, which is detected in the left view (video 1), to the right view (video 2) according to disparity information. This yields an estimated object 840' in the right view (video 2). The more precise detection of object 840' may be achieved by local optimization such as, e.g., a match filtering within a small neighborhood in the right image.

Referring back to FIG. 7A, with the locations of an object in different views are determined, the object centric stereo based depth estimator 750 is invoked to estimate the depth of the object based on the detected objects in both views. In some embodiments, the depth of an object may be estimated based on a few feature points based on stereo. For example, centroids of the different instances of the same object appearing in different views may be used to estimate the depth at the centroid point of the object. Similarly, the center points of the object in different views may be used for the same. In some embodiments, points in the object may be sparsely sampled and depth information on such points may be estimated. The estimation in this case may yield a sparse depth map to represent the depth of the object.

The depths at different locations of the object may differ. To represent the depth of an object, different depth measures may be used to characterize the depth of the object. In some embodiments, a single measure may be estimated. For example, a depth measure at a point that is closest to the vehicle may be determined. In some situations, the closest distance may be the most important information for the purpose of obstacle avoidance. In some embodiments, more than one measures may be estimated, e.g., the smallest depth (closest distance), an average depth plus depth variance (e.g., may be useful to determine whether the object is relatively flat), etc. may be used to characterize the depth feature of the object. In some embodiment, a sparse depth map for the object may be generated. The level of sparseness may be determined dynamically based on, various considerations. For example, when the weather is bad and the visibility is slow, depth information becomes more important in obstacle avoidance. In this case, a denser map may help the situation. In some embodiments, as the video data continued to be acquired, depth measures also continue to be computed, from frame to frames, alternative depth features may be provided. For instance, for frame 1, closest distance point may be provided. For frame 2, average distance and the closest distance point may be provided. For frame 3, a sparse depth map and the closest distance point may be provided. For frame 4, a denser depth and the closest distance point may be provided. Then the computation for frame 5 can be cycled back. In this way, even though the system does not have to be compute the full information for each frame, the full range of information can be provided in a relatively short period of time.

As the object/depth detection is performed continuously in the incoming video data, the detected objects/depths may be time stamped. This facilitates the cross validation in time. Relevant objects in autonomous driving usually constantly changing (due to the motion of the vehicle, the object, or both) and their relative spatial relationship also constantly changes. To allow obstacle avoidance, it is crucial to monitor the changing spatial relationships between the vehicle and each of the relevant objects. This requires that not only each object be tracked in time but also different instances of the same object be time stamped in order to figure out the changing spatial relationship between the object and the vehicle (getting closer or getting farther away). As such, each of the objects and its corresponding features (depth related) in each of the frames in the continuous data stream are time stamped to facilitate further analysis. Such time stamped objects/depths, whether generated by the model based object/depth detector 720 or the object centric stereo based depth estimator 750, are archived in the time-stamped object database 640.

Figure 7B:
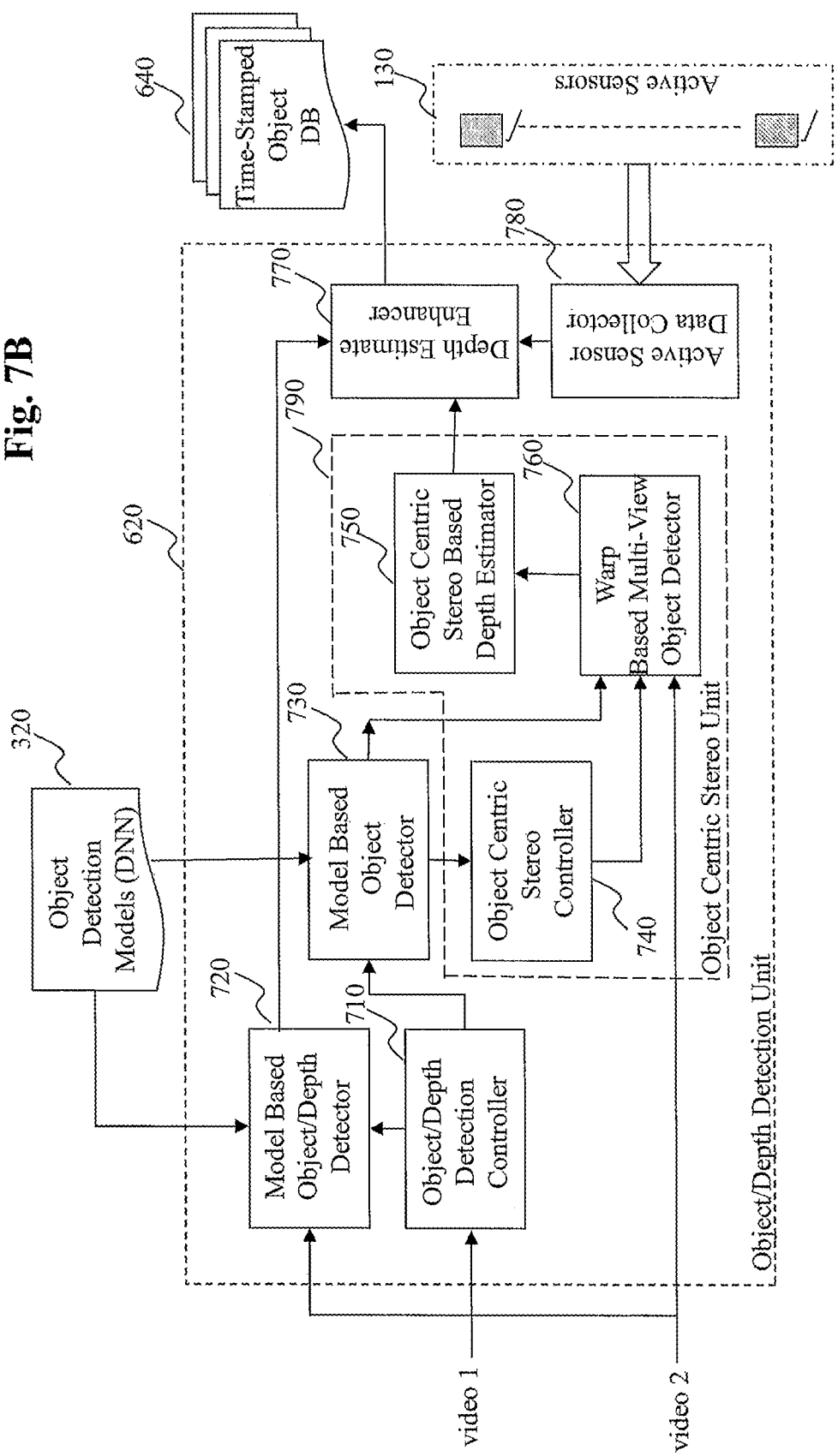
FIG. 7B depicts a different exemplary high level system diagram of an object/depth detection unit based on object centric stereo augmented by cross validation using active sensors, according to an embodiment of the present teaching.

FIG. 7B depicts a different exemplary high level system diagram of an object/depth detection unit 620 based on object centric stereo augmented by cross validation using active sensors, according to an embodiment of the present teaching. In this embodiment, the difference is that the estimated depth information, either from the model based object detector 730 or from the object centric stereo based depth estimator 750, is further enhanced by a depth estimate enhancer 770 based on additional sensor information acquired by an active sensor data collector 780. That is, the depth information, estimated either via object detection models 320 or via object centric stereo, can be further refined by utilizing additional sensor information. In this illustrated embodiment, the additional sensor information corresponds to data from active sensors 130, e.g., radar or LiDAR. In this embodiment, the object/depth detection unit 620 has the ability to enhance its ability to more assure its estimated depth information by combining data in different modalities.

Figure 9:
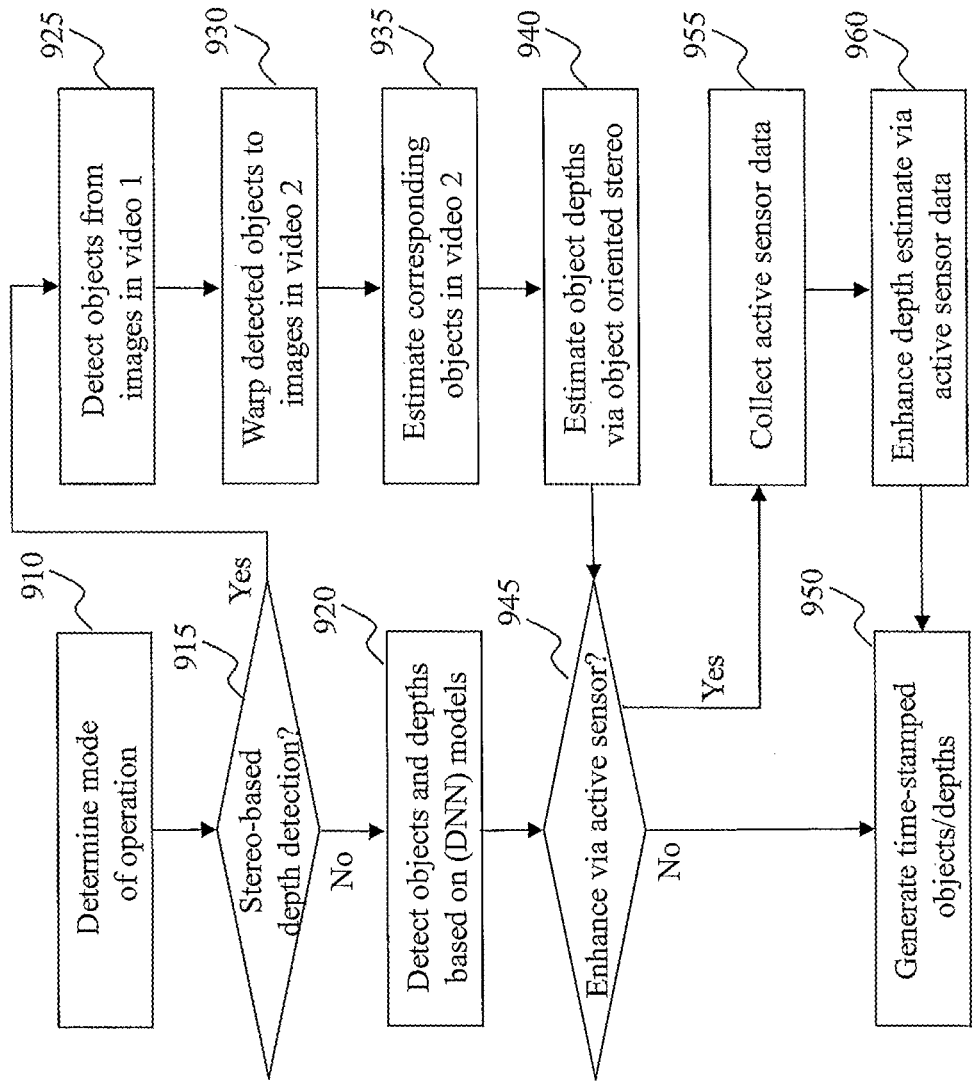
FIG. 9 is a flowchart of an exemplary process for an object/depth detection unit, according to an embodiment of the present teaching.

FIG. 9 is a flowchart of an exemplary process for the object/depth detection unit 620, according to an embodiment of the present teaching. Upon receiving input data, the object/depth detection controller 710 determines, at 910, the mode of operation. If the mode of operation is to detect objects and their depths jointly, determined at 915, appropriate models are retrieved and objects/depths are detected at 920. If the mode of operation is to detect objects and depths using object centric stereo, objects are first detected, at 925, from first video view (video 1) acquired by a first sensor. Such detected objects are warped, at 930 based on disparity information, to images in second video view (video 2) to estimate, at 935, the locations of the corresponding objects in the second video view. Based on the objects detected in video 1 and the estimated corresponding objects in video 2, the object depths are estimated, at 940, via object centric stereo.

The estimated object depths, either from 920 or from 940, may optionally be refined via data from sensors of different modalities. It is determined, at 945, whether the estimated depths of object is to be enhanced via active sensor data. If no, the time-stamped objects/depths are generated (and saved) at 950. If the detected objects/depths estimated based on sensors of one modality (passive sensor cameras) are to be enhanced via information from sensors of a different modality (e.g., active sensors), data from sensors of the different modality is collected at 955 and used to enhance, at 960, the estimated objects/depths. The enhanced objects/depths are then used to generate, at 950, time-stamped objects/depths.

Figure 10:
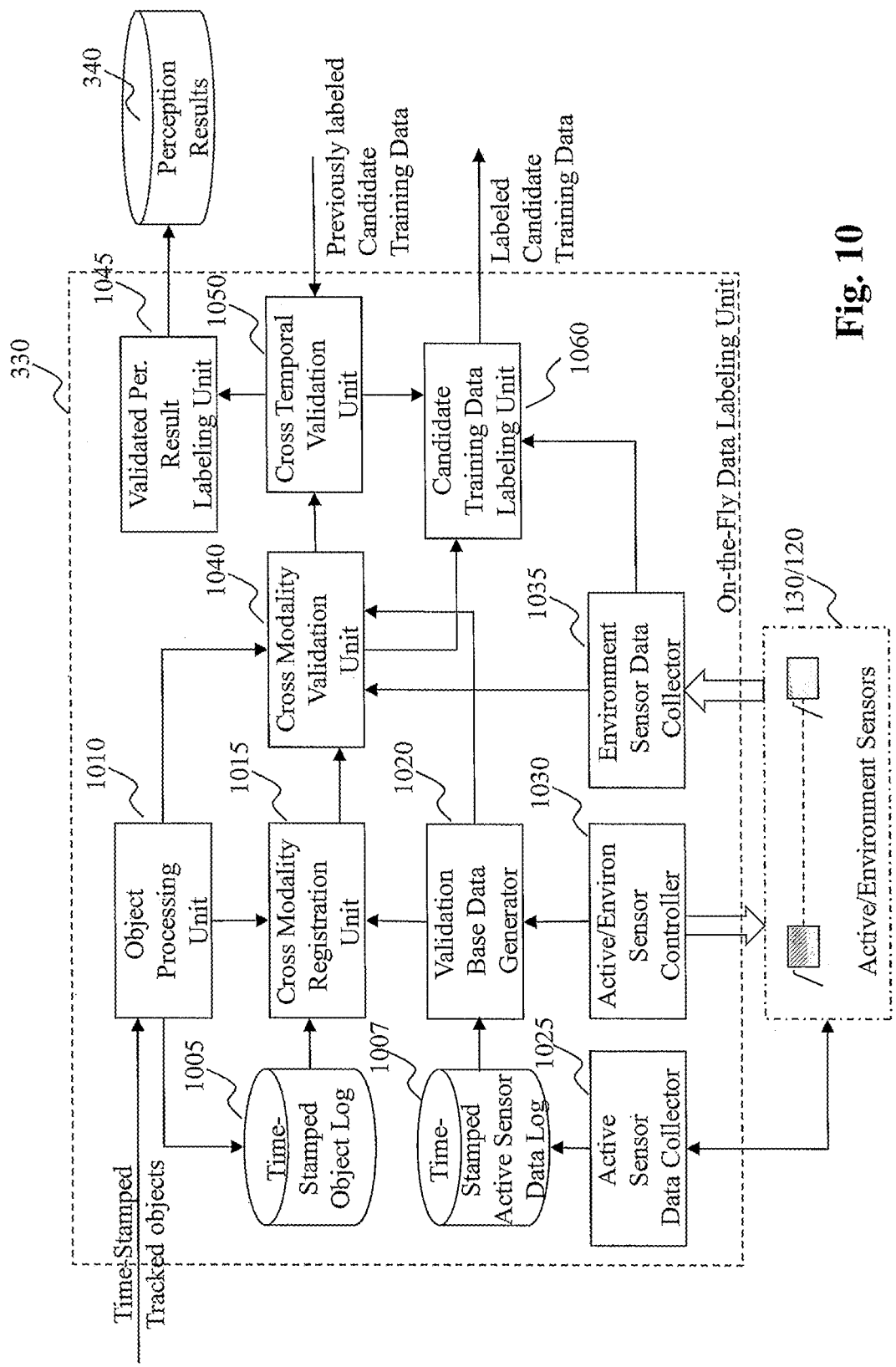
FIG. 10 depicts an exemplary high level system diagram of an on-the-fly data labeling unit, according to an embodiment of the present teaching.

FIG. 10 depicts an exemplary high level system diagram of the on-the-fly data labeling unit 330, according to an embodiment of the present teaching. In this exemplary embodiment, the on-the-fly labeling unit 330 may perform spatial domain cross validation on detected objects and/or temporal domain cross validation of the detected objects. Spatial domain cross validation may refer to leveraging data of multiple modalities for validating the detected objects. Examples include validating objects detected from data acquired by passive sensors (e.g., video cameras) based on data acquired by active sensors (e.g., LiDAR sensors). Such validation may be applied to objects detected in the spatial domain at a specific moment based on data of a different modality acquired at the same moment. For example, if an object and its estimated depth are detected from video data at moment A, active sensor data which provide depth information acquired at moment A by a, e.g., a LiDAR sensor, may be used to do cross modality validation. The validation may be based on one or more criteria. Examples include depth information and/or size information may be assessed across modality for consistency. For instance, if the estimated object is estimated to have an estimated size and depth, if the data from a LiDAR sensor approximately confirm the size and depth of the object, the object may be considered as validated via cross validation in the spatial domain.

Temporal domain cross validation of detected objects may be applied to self-correct false positive and/or false negative detections. In autonomous driving, the spatial relationships among objects (including the vehicle) temporally change from moment to moment. Some objects may start with small or occluded and thus the earlier detection in time may not be correct due to distance or occlusion. That is, the earlier detection may correspond to false negative but the system has no way to know that at that moment. However, in time, when these objects become closer to the vehicle, their visual view becomes more visible and larger. In this situation, processing the visual data of a later time may lead to detection of the objects with, e.g., high certainty. In this situation, the earlier false negative detection may be corrected via temporal domain cross validation. That is, a later more certain detection of an object may be used to modify the corresponding detection of the object at an earlier time if the earlier detection result is inconsistent with a, e.g., lower confidence score.

As shown in FIG. 10, the exemplary system diagram of the on-the-fly data labeling unit 330 comprises a object processing unit 1010, a spatial domain registration unit 1015, a validation base data generator 1020, a cross modality validation unit 1040, a temporal cross validation unit 1050, a validate perception result labeling unit 1045, and a candidate training data labeling unit 1060. The on-the-fly data labeling unit 330 also comprises an active/environmental sensor controller 1030, an active sensor data collector 1025, and an environment sensor data collector 1035. In operation, upon receiving time-stamped tracked objects from the object/depth detection unit 310, the object processing unit 1010 may process the tracked objects and update a time-stamped object log 1005. The time-stamped object log 1005 may be used to store the objects that are to be cross validated. For each of the objects stored in the time-stamped object log 1005, the cross modality registration unit 1015 may register each object with sensor data from a different modality for validation purposes. In this exemplary embodiment, data of a different modality may be from an active sensor.

To make data in different modalities available, the active/environment sensors controller 1030 may be designed to control active sensors 130 and/or environment sensors 120 to collect data. The collection may be continuous, intermittent, or at certain time instances. Data acquired by the active sensors 130 are collected and time stamped by the active sensor data collector 1025 before they are stored in a time-stamped active sensor log 1007. The time-stamped active sensor data in the time stamped active sensor data log 1007 are accessed by the validation based data generator 1020 in order to generate appropriate output of the sensor data for the purpose of cross modality validation. In some embodiments, active sensor data may be from one or more LiDAR sensors. In some embodiments, the time-stamped LiDAR sensor data may be used, by the validation base data generator 1020, to generate a point cloud to be used for validation. In other embodiments, the active sensor data may be from range sensors and can be used to generate a depth map for the entire image plane as the basis for validation.

To perform cross modality validation of a time-stamped object, the cross modality registration unit 1015 registers the object to be validated, in the spatial domain, with a corresponding region in the validation base data, which is acquired at the moment of the time stamp of the object and output from the validation base data generator 1020. The registration of the object with a region in the validation base data provides a pair of information packages (one corresponds to the detected object and its detected features and the other corresponds to the region registered with the object and the similar features computed from the region). Such registered pair of information packages is provided to the cross modality validation unit 1040 for cross modality validation of the detected object and its features.

With respect to the validation, various approaches may be adopted. In some embodiments, when the validation base data correspond to depth information, the estimated depth of the object may be compared with the depth information in the corresponding region of the validation base data. When there is a high degree of affinity between the estimated object depth information and data in the validation base data, the object may likely be considered to be correctly detected. The affinity may be represented by, e.g., a similarity measure computed based on the estimated object depth (which can be a single measure or a distribution, sparse or dense) and the validation base data. If the degree of affinity is not high, the detected object may be considered as false positive. To facilitate the comparison, features to be used for the assessment remain consistent across different modalities. For example, if the estimated object depth corresponds to a sparse depth map, the validation base data may also be generated as a sparse depth map.

Whether the degree of affinity between estimated object depth and the validation base data is considered adequate for validation purposes may be determined based on some criterion developed with respect to the type of affinity measurement. In some embodiments, the criterion may be a threshold value. With such a criterion, any affinity measure that is lower than the threshold, the underlying object being validated may be considered inadequate and hence, be labeled as a false positive detection. As discussed herein, such a false positive detection result may be corrected in a future time when future cross temporal validation shows that the current false negative object actually corresponds to a later merged object.

Figure 11A:
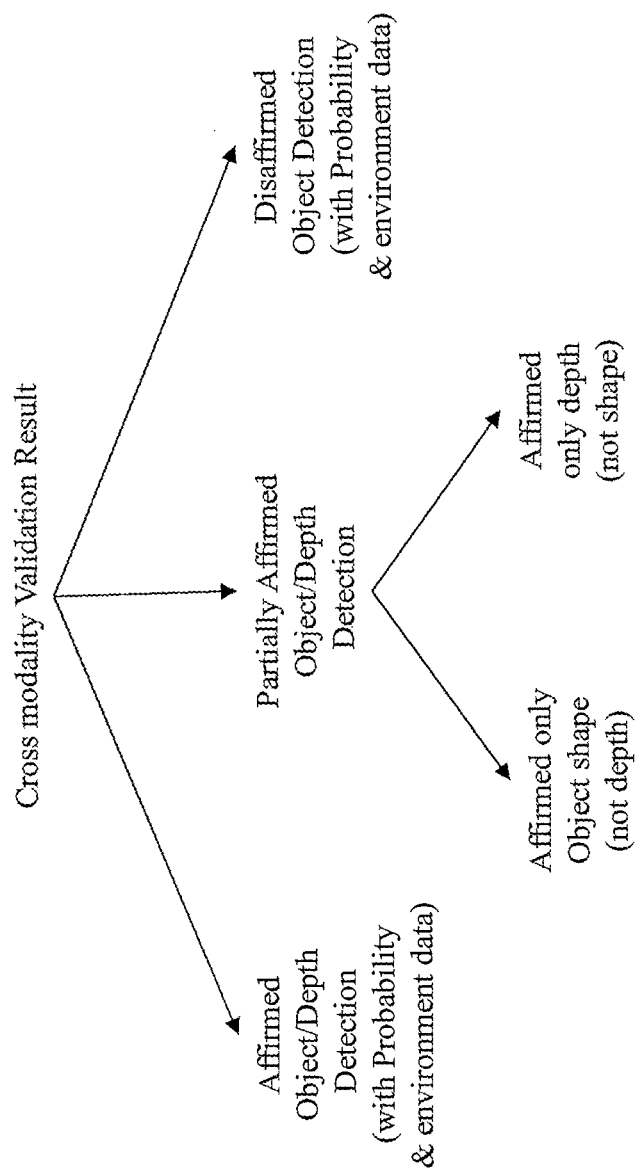
FIG. 11A illustrated exemplary cross modality validation results, according to an embodiment of the present teaching.

FIG. 11A illustrated exemplary cross modality validation results, according to an embodiment of the present teaching. The outcome of the cross modality validation may be classified into three categories, including the object detection via passive sensor data is affirmed by the sensor data from active sensors. This may mean that the affinities regarding both the object shape and depth are above a certain confidence level. Another outcome is that the object detection result based on passive sensor data is disaffirmed by the active sensor data, i.e., neither the affinity with regard shape not that with regard depth is above some threshold level. The third possibility may correspond to partial affirmation, either only object shapes detected using passive/active sensor data are in agreement but not the depth or only estimated/sensed object depths are in agreement but not the shape. Cross modality validation may be used to not only enhancing object detection (e.g., in the case of affirmation) but also resolving spatial ambiguities (e.g., when depth estimation based on passive sensor data is not reliable).

With the outcome of the cross modality validation, the cross modality validation unit 1040 passes on the cross validated objects (and corresponding features) with the outcome to the candidate training data labeling unit 1060, where the cross modality validation result may be used to facilitate automatic labeling of each object to generate candidate training data. In some embodiments, if an object is cross modality validated as a valid detection, it may be labeled as a detected object with, e.g., an associated confidence score without going through cross temporal validation. The confidence score may correspond to (but not limited to) the affinity measure or some other measure computed based on the affinity measure, indicative of a degree of certainty in the label. In some embodiment, if an object is considered a false positive during cross modality validation, it may be labeled as such with, e.g., also a confidence score reflecting the degree of certainty in the conclusion derived from the modality based cross validation. In an alternative embodiment, instead of labeling as a false positive, the object may be simply labeled with a lower confidence score.

In some embodiments, in addition to the cross modality validation, the on-the-fly validation unit 330 may also carry out, in additional to the validation in the spatial domain, cross temporal validation based on previously detected or labeled regions/objects that may or may not correspond to currently detected objects. In this mode of operation, the cross modality validation unit 1040 may also send the cross modality validation results to the cross temporal validation unit 1050. In some embodiments, based on the cross modality validation results, the cross temporal validation unit 1050 may access previously labeled candidate training data from database 390 for cross temporal validation. Such previously labeled candidate training data may correspond to a stream of previously labeled regions/objects, some of which may or may not have a corresponding object in the current frame that is being validated.

Cross temporal validation may be configured to not only cross validate object detection using temporal data but also serve to resolve certain temporal ambiguities. In the former situation, if a currently detected region does not have a high enough confidence score (due to various reasons, e.g., occlusion, weather, etc.), earlier detected corresponding objects in time with high confidence scores may assist to enhance the current detection result. In some situations, the opposite situation may occur and cross temporal validation may be used to back track in time to resolve the ambiguity. For example, a currently detected object may correspond to one or more detected regions in earlier times with low confidence scores. This could be due to that the underlying object is now bigger and more visible or the sun glare that caused the poor detection at earlier times is cleared up. In this case, the cross temporal validation may use current detection results to validate or affirm such previous detections. In this situation, the system may back track in time to modify the labels (possibly also the confidence scores) of the previous detection results so that ambiguities are resolved. With this back track mechanism, use training data may be identified via future detection result so that such training may be labeled appropriately and used to adapt the models. Previous detected regions with low confidence scores due to, e.g., the existing models, can now be labeled as objects and used as training data for adapt the models so that the models may be re-trained to be able to detect similar situations as corresponding to meaningful object with a higher confidence score. If an object currently detected has a low confidence score but the earlier labeled corresponding objects in time may have higher confidence scores, the cross temporal validation may also recognize that and rely on that information to influence the labeling of the currently detected object.

Figure 11B:
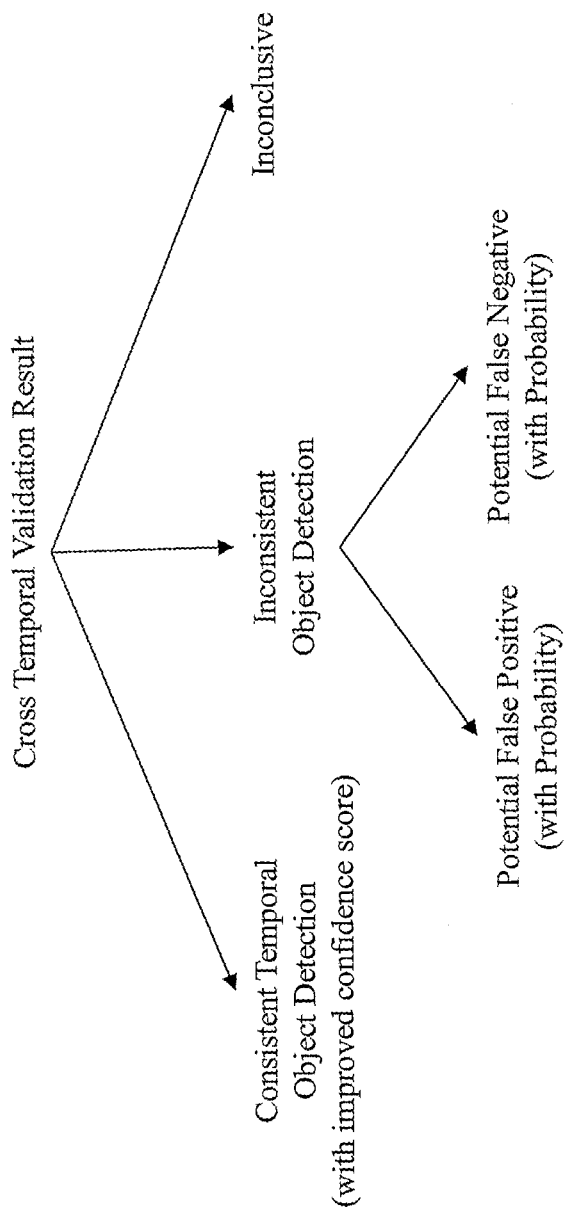
FIG. 11B illustrates some exemplary outcome from the cross temporal validation unit, according to an embodiment of the present teaching.

Cross modality validation may yield several possible situations. FIG. 11B illustrates some exemplary outcome from the cross temporal validation unit 1050. The cross temporal validation results may reveal a consistent outcome, i.e., the present detection is consistent with the previous detection, an inconsistent outcome, i.e., the present detection is inconsistent with the previous detection, or inconclusive. First, an object that is currently detected with adequate confidence score may be further affirmed by the cross temporal validation. This means that this object is detected both now and at earlier times.

Second, the cross temporal validation may reveal that the outcome of current detection is inconsistent with earlier detection results. That is, e.g., an object detected at the present time is not detected in earlier times or vice versa. Specifically, the former scenario is that an object is detected presently but there is no corresponding object detected in earlier times. This could be caused by different reasons. No earlier detected corresponding object may be due to that the same object was not previously detected or was not previously detected with a high enough confidence (but now the object is detected with enough confidence). This may occur when the object is previously small, occluded, or not detected reliably due to weather conditions (raining, snowing, or sun glare, etc.) but now due to motion, the object appears larger in view, closer in distance, more visible, or at a better location by which it can be more reliably detected (e.g., occlusion is gone). This may also be indicative of a current false positive situation, i.e., there is no object in the scene and the currently detection is incorrect.

Another scenario is the opposite. That is, there are one or more earlier detected objects but there is no corresponding object detected presently, which can be either that there does not have a corresponding object in the present detection result or the current corresponding object is detected with a low confidence score. This scenario may occur when the object is previously close and hence large or detected reliably due to conditions (no occlusion, no raining, no snowing, no sun glare, etc.) but now the object is farther away due to motion and hence is smaller and less visible (possibly even disappeared, e.g., a car in front turned a corner so that it is no longer visible), occluded, or due to other external conditions so that the object is presently cannot be detected reliably. This scenario may also indicate a present false negative situation.

Whenever the cross modality validation and cross temporal validation are inconsistent, the resolution to the situation may depend on specific situations and application requirements. The resolution may also depend on the degree of inconsistency. The degree of inconsistency may be characterized in different ways. In some situation, the degree of discrepancy may be characterized by the difference in confidence scores. For example, the previously affirmed detection maybe with a confidence score just above the threshold and the current disaffirmed detection with a confidence score just below the confidence score.

In some situations, the discrepancy may be degree of discrepancy may be determined based on a series of previous detection results. For instance, in previous labeled candidate training data, there may be a sequence of corresponding object detection results, but the sequence exhibits oscillation behavior (sometimes, an object detection is affirmed and sometimes not) with frequent inconsistent conclusions. Given that, even if the present detection result is inconsistent with the result from the instant before, it is consistent with the oscillating nature of the sequence. In this situation, the temporal ambiguity may not be resolved until a later time and thus the current cross temporal validation result may be marked as inconclusive.

If a recently detected object is affirmed via cross modality validation but cross temporal validation reveals that its corresponding object detected earlier was disaffirmed due to low confidence score, a resolution may be to resolve the temporal ambiguity by modifying the label of the previously disaffirmed object as a detected object. This is a correction to the previous false negative detection. In some situations, the cross temporal validation may reveal that the previous labeled candidate training data include labeled detected object(s) that are not currently detected. It may indicate that the current detection includes some false negative results. Depending on the situation, the current false negative may be corrected based on the previously labeled data. Similarly, via cross temporal validation, the system may also be able to self-correct false positive results. As discussed herein, via cross modality validation, the on-the-fly data labeling unit 330 may be able to resolve spatial ambiguity and as a result to enhance or degrade accordingly the detection confidence by using data from sensors of a different modality. Via cross temporal validation, the on-the-fly data labeling unit 330 may be able to resolve temporal ambiguity and self-correct either false positive or false negative detection result in both current and previous detection results.

The cross temporal validation unit 1050 may determine, when faced with different inconsistency situations, a resolution to each situation. Such resolution may be to modify some labels already made previously, alter the detection result for the present time, or simply decides to wait for future data. Once a determination is made, the cross temporal validation unit 1050 may generate instructions and send to the candidate training data labeling unit 1060 to label the training data in accordance with the resolution determined.

The candidate training data labeling unit 1060 receives validation results and label candidate training data accordingly. When only cross modality validation is applied, the candidate training data labeling unit 1060 labels data according to the output from the cross modality validation unit 1040. The labeling may not be limited to confirmed objects. It may also be applied to regions that are detected but are not deemed as objects. This includes the regions that are not considered as objects due to low confidence score, failed cross modality validation or cross temporal validation. Such regions, although without being considered as objects yet, may later be cross temporal validated when future processing is able to resolve the ambiguous situations with regard to such regions. The data are labeled in connection with features of the object and optionally any environment sensor data. Such environment sensor data may be used to perform special adaptation with respect to different environment situations (e.g., snow day or sun glare, etc.).

When both cross modality and cross temporal validations are applied, the candidate training data labeling unit 1060 takes input from both the cross modality validation unit 1040 and the cross temporal validation unit 1050 and automatically label the data according to the resolution determined by the cross temporal validation unit 1050. In this embodiment, the labeling may apply to both present data and previously labeled data. For the previously labeled data, the candidate training data labeling unit 1060 may modify previously made labels according to instructions constructed based on the resolutions to resolve the temporal ambiguities between previous and current detection results. The labeled training data are then sent to the storage 390 for the labeled candidate training data. Such labeled training data may include some data that are previously stored in the storage 390 but now they are modified so that the modified labeled data are used to update the labeled candidate training data in 390. The disclosed process herein enables the on-the-fly data labeling unit 330 to automatically, without human intervention, label regions in images on-the-fly to produce meaningful training data. This solves a bottleneck problem in the industry.

In some embodiments, objects that are cross validated, either via cross modality validation or via both cross modality and cross temporal validation, may be also sent to the validated perception result labeling unit 1045 so that they can be labeled as perception result and then subsequently stored in the perception results database 340.

Figure 12:
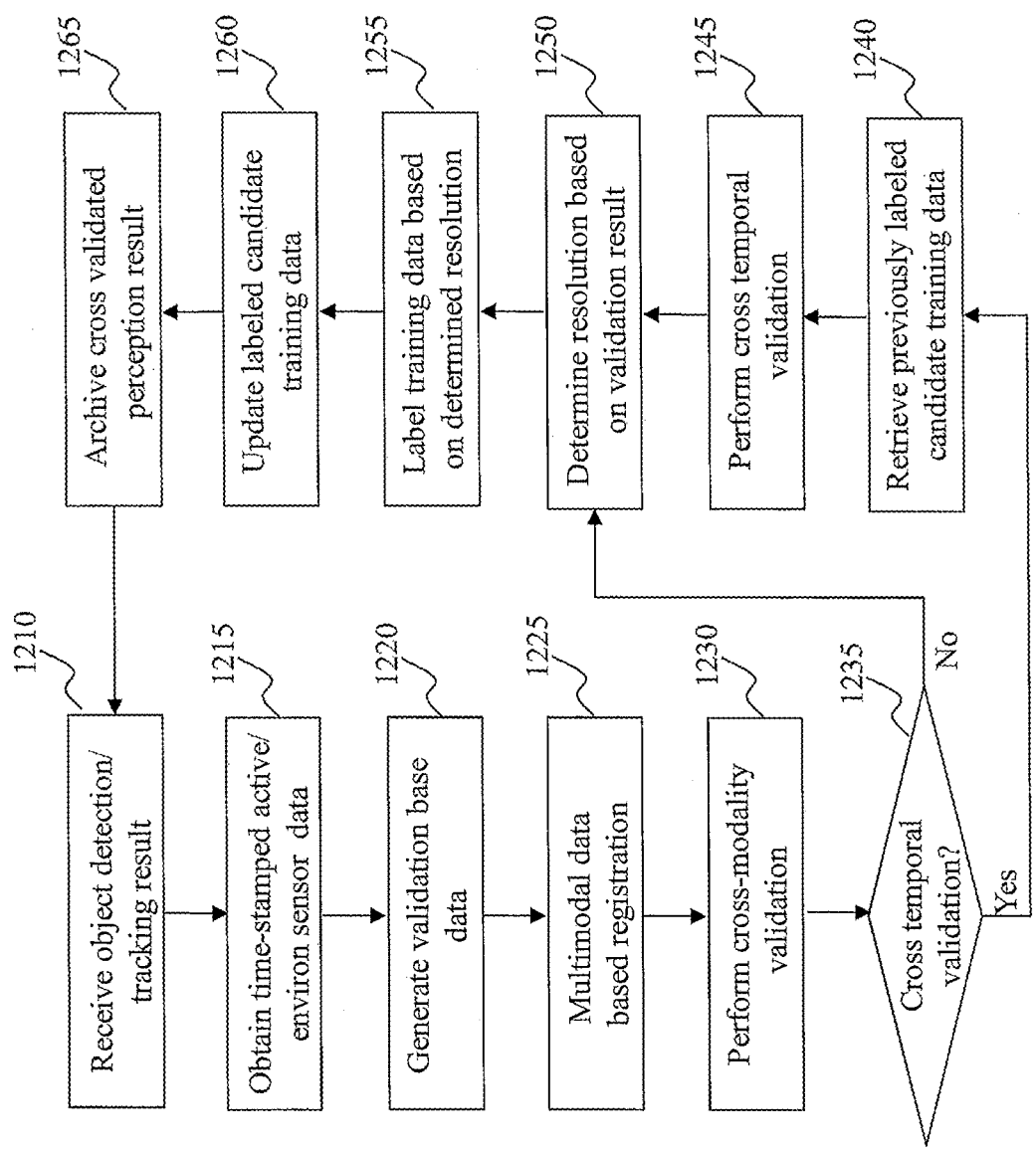
FIG. 12 is a flowchart of an exemplary process of an on-the-fly data labeling unit, according to an embodiment of the present teaching.

FIG. 12 is a flowchart of an exemplary process of the on-the-fly data labeling unit 330, according to an embodiment of the present teaching. Present object detection results are first received at 1210. To perform cross modality validation, time-stamped active and optionally environment sensor data are acquired at 1215. Based on such time-stamped data, validation base data are generated at 1220. In case that the active sensor LiDAR is used, a point cloud is generated accordingly. To validate the detection results, each region detected in the passive sensor data is registered, 1225, with a corresponding region in the validation base data and the cross modality validation is performed, at 1230, with respect to each pair of such registered regions.

Subsequently to the cross modality validation, it is determined, at 1235, whether cross temporal validation is also to be carried out. If only cross modality validation is applied without cross temporal validation, the processing proceeds to 1250, where resolution to any spatial ambiguity is to be determined based on the validation result. If cross temporal validation is also to be carried out, the processing proceeds to 1240 where the previously labeled training data are retrieved for temporal validation. Temporal data are used to compare with the current detection result to perform cross temporal validation at 1245. Then resolutions to both spatial and temporal ambiguities are determined at 1250. Such resolutions, either in spatial domain only (if only cross modality validation is applied) or in both spatial and temporal domain, are then used to automatically label, at 1255, training data on-the-fly. Such labeled data (including both newly labeled or modifications to previous labels) are then archived, at 1260, in the labeled candidate training data storage 390. Some of the detection results may then be labeled as perception result at 1265 and stored in the perception result storage 340.

Figure 13A:
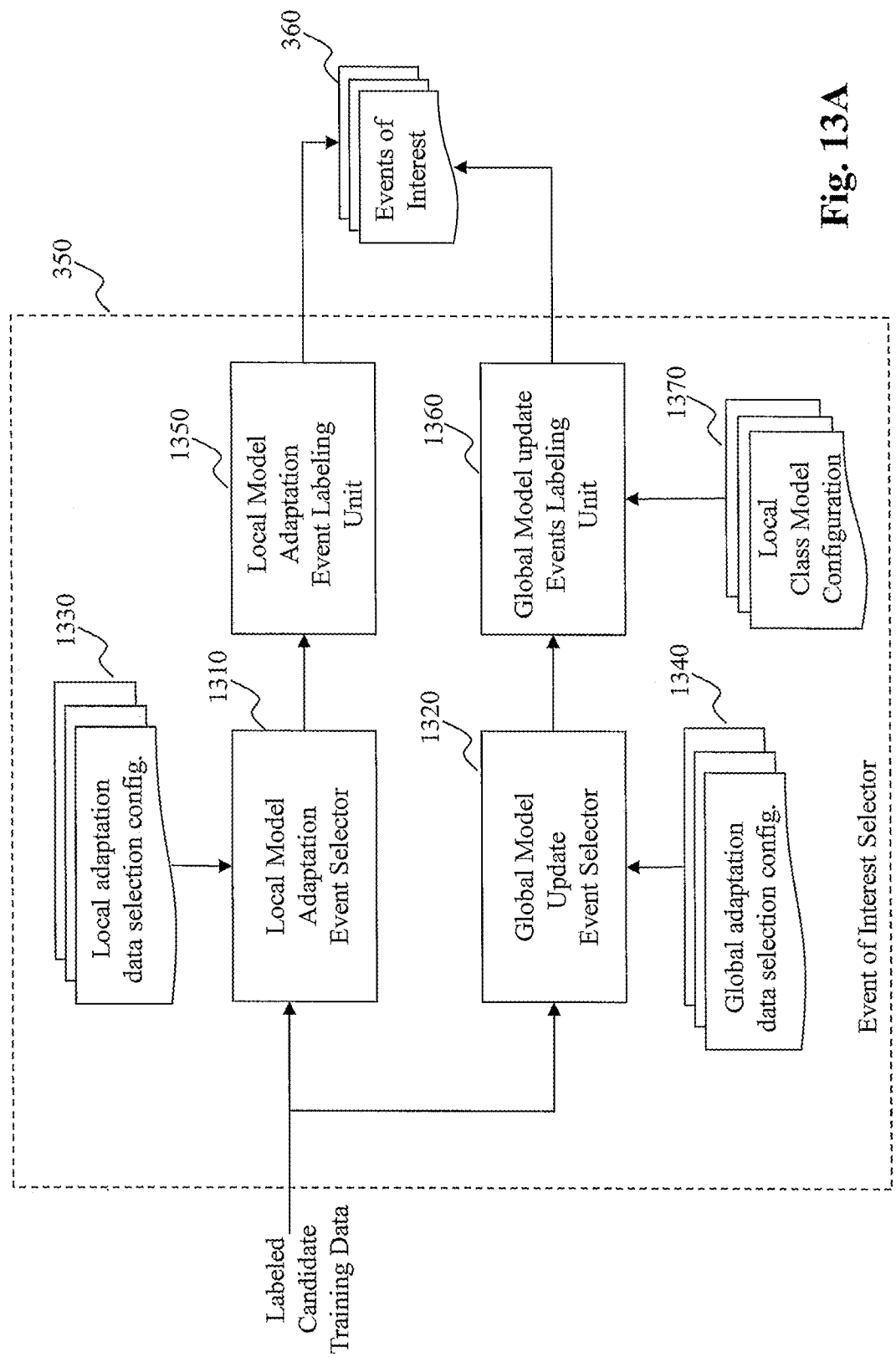
FIG. 13A depicts an exemplary high level system diagram for an event of interest selector, according to an embodiment of the present teaching.

FIG. 13A depicts an exemplary high level system diagram for the event of interest selector 350, according to an embodiment of the present teaching. In this embodiment, the event of interest selector 350 comprises a local model adaptation event selector 1310, a local model adaptation event labeling unit 1350, a global model update event selector 1320, and a global model update event labeling unit 1360. As discussed herein, local model adaptation may be performed in real time to locally tweak the in situ models, while global model update may be performed in batch. Given that, the events of interest for local model adaptation and global model update may be selected based on different time scales and selection criteria. In both situations, labeled data representing a conflicting situation (which can be used to learn from mistakes) or labeled data representing a reinforcement situation (which can be used to strengthen the models) may be used for model adaptation. Events selected for local model adaptation may differ from that selected for global model update.

With respect to local model adaptation, the events of interest may be selected in accordance with a local adaptation data selection configuration. For example, such a configuration may dictate that any data selected for local adaptation may have some degree of certainty as to its outcome. This may include, but not limited to, the situation in which detection result (e.g., estimated depth) from passive sensor data is quite different, with a certain degree of certainty, from what the active sensor data present, suggesting that the models need to be adjusted. Data that may still exhibit an unresolved ambiguity may not be used for local adaptation due to the uncertainty. Because local adaptation is carried out in situ in real time, the selection of events of interest selected may be carried out accordingly in real time so that events selected for adaptation are approximate to the present time.

With respect to events of interest selected for global model update, the selection may be carried out according to a configuration 1340 that is appropriate for global model update. The global model update data selection configuration 1340 may dictate a different selection schedule and frequency than that for the local model adaptation data selection configuration 1330. For example, the global model update data selection configuration 1340 may require events of interest be selected at a certain frequency when the vehicle is not in motion. This is justifiable because if a certain temporal sequence of objects still present temporal ambiguities and needs to be resolved in a future time, e.g., via cross temporal validation, it may be appropriate to wait until the temporal ambiguities are resolved, which correspond to a time when the current driving session ends.

The local model adaptation event selector 1310 takes labeled candidate training data from 390 as input and selects events of interest for local model adaptation in accordance with the configuration 1330 designed appropriately for local model adaptation. Such selected events for local adaptation are sent to the local model adaptation event labeling unit 1350. Depending on each event, it may be labeled differently so that the selected event may be utilized different to locally adapt the model. For example, events that indicate incorrect detection results may be labeled as such so that they can be used to adjust the models for better future performance. Events that indicate correct detection results may also need to be labeled as such so that they can be used to reinforce the models instead of correction.

Similarly, the global model update event selector 1320 takes the labeled candidate training data from 390 as input and selects events of interest in accordance with the configuration 1340. The selected events may be sent to the global model update events labeling unit 1360 to label the selected events. With respect to labeling for the events related to global model update, the events may need to be labeled as to the nature of the event (e.g., for inconsistent detection events for correction purpose or consistent detection events for reinforcement purpose), as discussed above. In some embodiments, the events selected for global model update may be labeled also in accordance with model classifications. As illustrated in FIG. 4A-4C, in addition to the global model which can use all relevant labeled training data for model adaptation, there may be different class models that may be adapted more effectively using training data that are appropriate for those classes. An event may be used as training data for multiple classes of models. For example, an event related to an object that was not detected based on passive sensor data due to, e.g., snowy weather condition, but was detected via either cross modality validation or cross temporal validation may be labeled to be used for both re-training the global models 410 and for re-training the class models related to snowy weather. In FIG. 13A, the global model update event labeling unit 1360 labels the selected events based on the local class model configuration 1370. The labeled events, whether from the local model adaptation event labeling unit 1350 or from the global model update event labeling unit 1360, are stored in the storage 360 for events of interest. Such stored events will be accessed for either local adaptation or global model update in accordance with their corresponding labels.

Figure 13B:
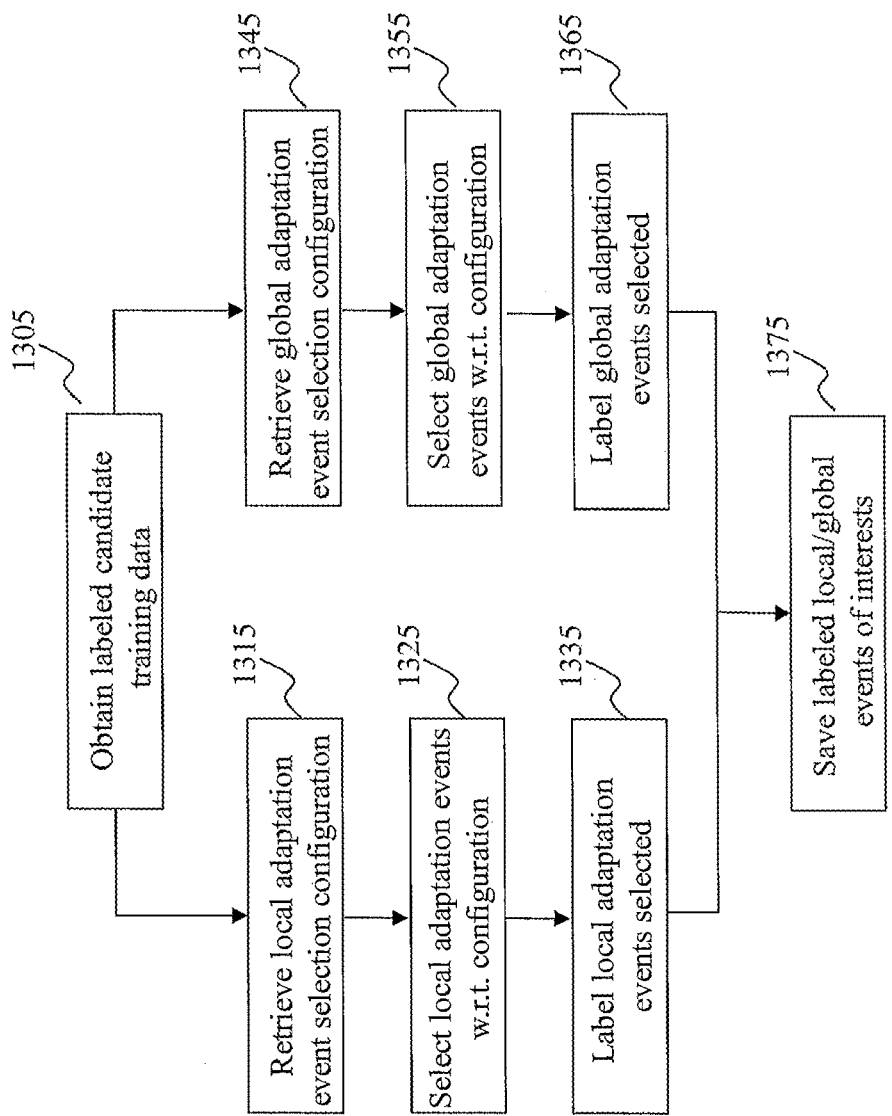
FIG. 13B is a flowchart of an exemplary process for an event of interest selector, according to an embodiment of the present teaching.

FIG. 13B is a flowchart of an exemplary process for the event of interest selector 350, according to an embodiment of the present teaching. Labeled candidate training data are first obtained at 1305 from the storage 390. The retrieved labeled candidate training data are then used by both the local model adaptation event selector 1310 and the global model update event selector 1320 to select events of interest for local model adaptation and global model update, respectively. For local model adaptation, configuration stored in 1330 related to selection criteria for local model adaptation is retrieved at 1315 and used to select, at 1325, events of interest as training data for local model adaptation. Such selected local adaptation events are then labeled, at 1335, to allow the local model adaptation unit 370 to appropriately utilize the selected events to adapt the models locally. Such labeled events of interest for local model adaptation are then saved in the storage 360 for events of interest.

Similarly, for global model update, the configuration 1340 set up for controlling selection of events of interest for global model update is retrieved at 1345 and used to select, at 1355, events of interest to be used by the global model update cloud 160. Such selected events may then be labeled, at 1365, in accordance with the class model configuration 1370. The appropriately labeled events of interest are then stored in the storage 360 so that they can be further used by the global model update cloud 160 for re-training the models.

Figure 14:
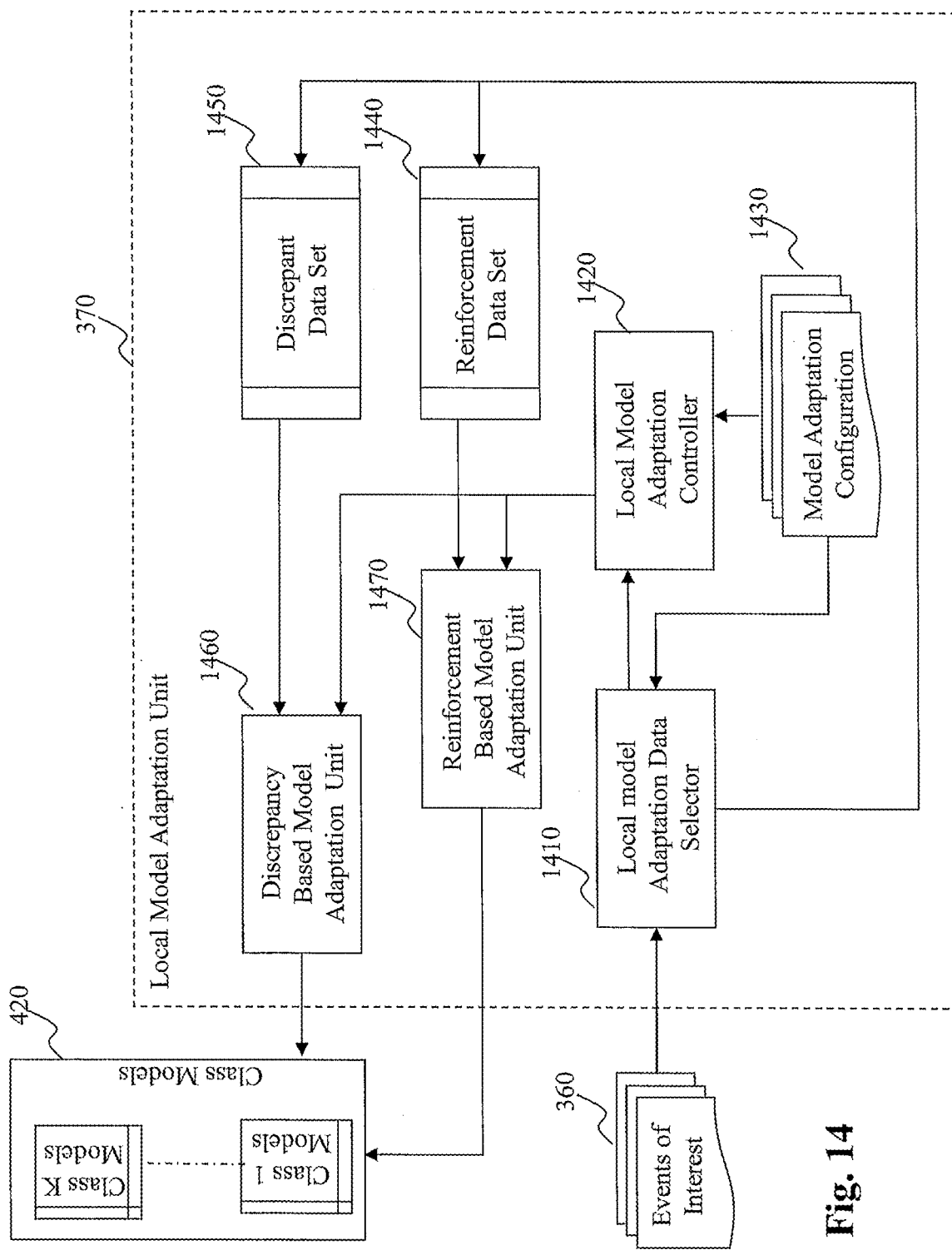
FIG. 14 depicts an exemplary high level system diagram of a local model adaptation unit, according to an embodiment of the present teaching.

As discussed herein, once events of interest are selected, they are archived in the storage 360 and may then be accessed by the local model adaptation unit 370 and/or the global model update unit 380 for model adaptation. FIG. 14 depicts an exemplary high level system diagram of the local model adaptation unit 370, according to an embodiment of the present teaching. In this embodiment, the local model adaptation unit 370 comprises a local model adaptation data selector 1410, a local model adaptation controller 1420, a discrepancy based model adaptation unit 1460, and a reinforcement based model adaptation unit 1470. In operation, the local model adaptation data selector 1410 retrieves, from the storage 360, events of interest that may be labeled for local model adaptation.

Based on the retrieved events of interest, the local model adaptation data selector 1410 may select those suitable for the local adaptation, which may be all or some of the events marked for local model adaptation. The local model adaptation data selector 1410 may also separate the selected events into different categories in order for use them in different adaptation modes. Such processing may be based on how the local model adaptation model 370 is configured. In this illustrated embodiment, a model adaptation configuration 1430 may specify each local model adaptation unit 370 is to carry out the adaptation. In some embodiments, the model adaptation configuration 1430 may specify that local model adaptation is to be carried out based on events corresponding to discrepancies (between object detection result and the final decision as to object detection). In some embodiments, the model adaptation configuration 1430 may specify that local model adaptation is to be carried out based on events corresponding to both discrepancies and reinforcement.

Based on the mode of local model adaptation specified by the model adaptation configuration 1430, the local model adaptation data selector 1410 selects events of interest accordingly. That is, when only discrepancy based local model adaptation is to be carried out, events related to discrepancies are to be selected. If both discrepancy and reinforcement events are to be used for local model adaptation, both types of events are to be selected. The selected events of interest, including discrepant events and reinforcement events, are respectively stored in a discrepant data set 1450 and reinforcement data set 1440.

The local model adaptation controller 1420 controls the operation of local model adaptation in accordance with the adaptation mode specified by the model adaptation configuration 1430. Depending on the configuration, it invokes either the discrepancy based model adaptation unit 1460 or the reinforcement based model adaptation unit 1470 or both. Once invoked, the discrepancy based model adaptation unit 1460 accesses discrepant data set stored in 1450 for model adaptation using training data representing discrepancies. Similarly, once invoked, the reinforcement based model adaptation unit 1470 accesses reinforcement data set from 1440 for model adaptation using reinforcement training data.

Figure 15:
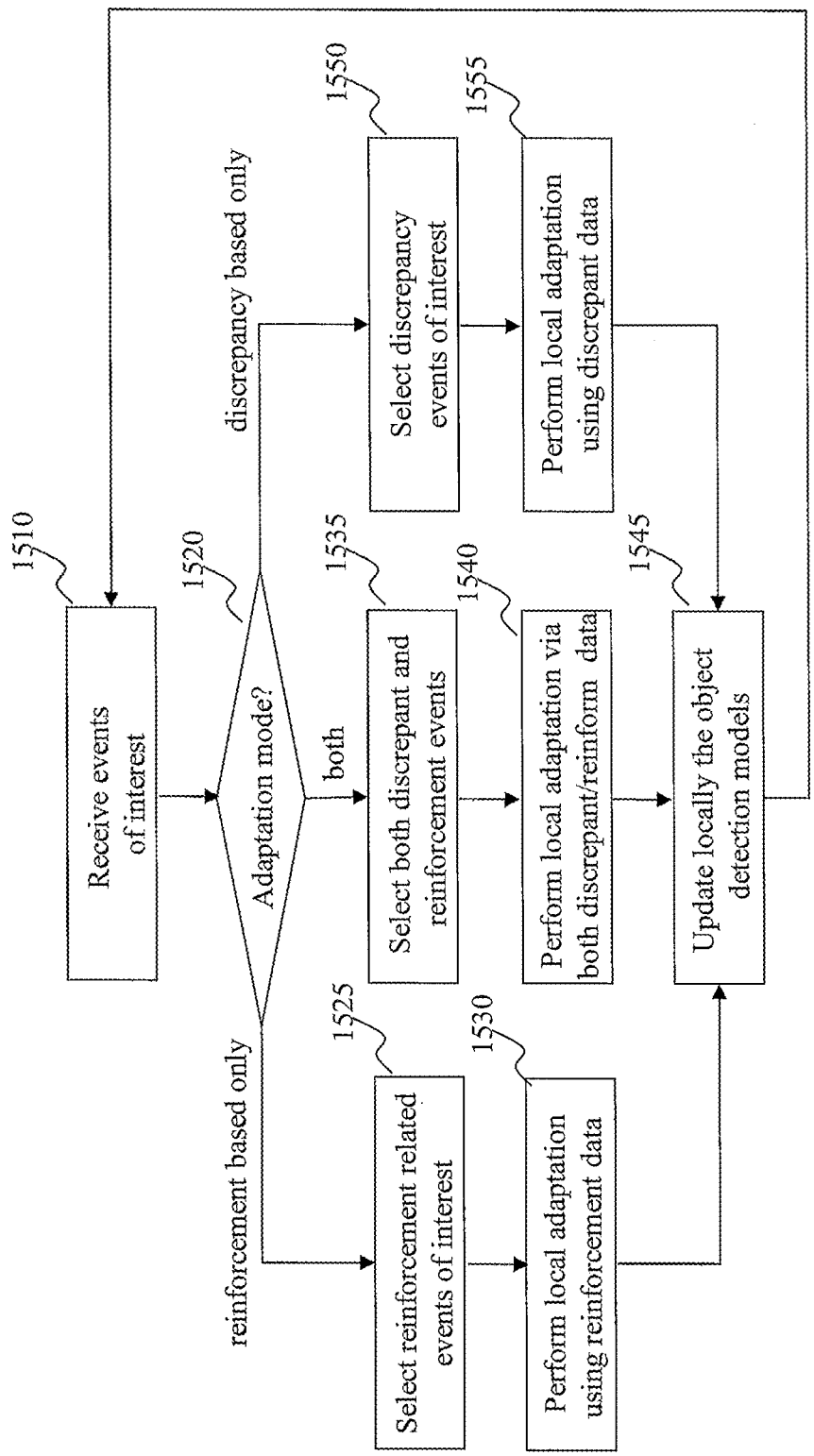
FIG. 15 is a flowchart of an exemplary process for a local model adaptation unit, according to an embodiment of the present teaching.

FIG. 15 is a flowchart of an exemplary process for the local model adaptation unit 370, according to an embodiment of the present teaching. Events of interest stored in the storage 360 are retrieved at 1510. To proceed with local model adaptation, the adaptation mode specified by the model adaptation configuration 1430 is used to determine, at 1520, how to proceed. If the configuration specifies that the mode is to use reinforcement training data only, events related to reinforcement data are selected at 1525 and used to perform, at 1530 by the reinforcement based model adaptation unit 1470, local modal adaptation based on the selected reinforcement data. If the configuration specifies that the mode is to use discrepant training data only, events related to discrepant events are selected at 1550 and used to perform, at 1555 by the discrepancy based model adaptation unit 1460, local modal adaptation based on the selected discrepant training data. If the configuration specifies that the mode is to use both discrepant and reinforcement training data, events related to reinforcement data are selected at 1535 and archived in the discrepant data set storage 1450 and the reinforcement data set storage 1440, respectively. Both the discrepancy based model adaptation unit 1460 and the reinforcement based model adaptation unit 1470 are activated to perform, at 1540, local model adaptation. Once the models are adapted, the adapted models are locally updated at 1545.

Figure 16:
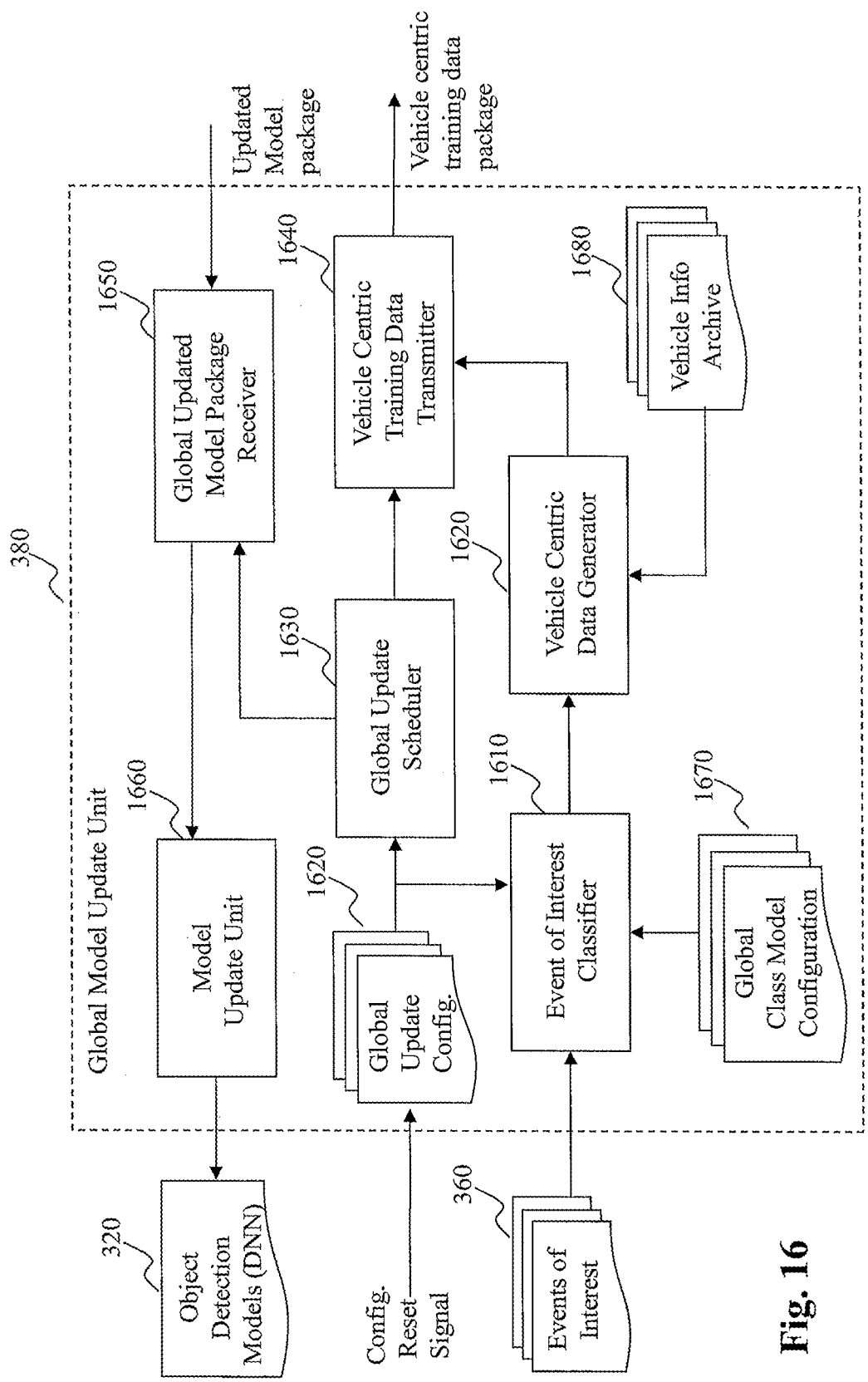
FIG. 16 depicts an exemplary high level system diagram of the global model update unit, according to an embodiment of the present teaching.

FIG. 16 depicts an exemplary high level system diagram of the global model update unit 380, according to an embodiment of the present teaching. In this embodiment, the responsibility of the global model update unit 380 is to transmit events of interest that are selected for global model update to the global model update cloud 160, subsequently receive the updated model package from the global model update cloud 160, and then accordingly update the local stored models based on the received updated model package. The global model update may be carried out according to a schedule determined based on a global model update configuration 1620.

The global model update unit 380 comprises an event of interest classifier 1610, a vehicle centric data generator 1620, a global update scheduler 1630, a vehicle centric training data transmitter 1640, a global updated model package receiver 1650, and a model update unit 1660. In operation, the global update scheduler 1630 is activated in accordance with the setting specified by the global update configuration 1620. For example, the global update configuration 1620 may control that the global model update activity occurs every night when the vehicle is in a parking state (i.e., not in motion). Such a configuration may be dynamically re-set by a user operating the vehicle or by a central controlled mechanism (not shown).

Once the specified global model update condition is satisfied, the global update scheduler 1630 invokes the event of interest classifier 1610 to obtain events of interest and organize such events according to class model configuration specified by a global class model configuration 1670. The event of interest selector 1610 classifies events of interest so that events suitable for re-training certain class models are labeled as such so that they can be utilized appropriately. For example, if an event of interest arose in a situation that object detection failed (false negative) due to sun glare, it may be used for global model update for the class of model for object detection in the situation where sun glare exists. An event may also be classified into different classes. For instance, the above example event may be used for both updating the global model 410 as well as for updating the model related to sun glare.

The classified events are then sent to the vehicle centric data generator 1620 so that the selected and classified events of interest may be packaged as the training data from the vehicle before sending to the global model update cloud 160. In generating the vehicle centric training data, the vehicle centric data generator 1620 accesses information stored in the vehicle information archive 1680, which may include various specific information about the vehicle such as VIN, maker, vehicle model, etc. In some embodiments, the vehicle specific information may also include the information about the manner the vehicle is mostly operated. Examples of such information may include whether the vehicle is mostly operated in city road or rural road, etc. Such information may be packaged with the selected training data so that the global model update cloud 160 may rely on to determine how to utilize the received training data.

The packaged training data, once generated, are then sent to the vehicle centric training data transmitter 1640, which then sends, when the global update scheduler 1630 triggers it, the vehicle centric training data package to the global model update cloud 160. When the global model update cloud 160 re-trains the models and sends back the updated model package, the global updated model package receiver 1650 obtains the updated model package and parses it to generate appropriate instruction for the model update unit 1660 to carry out the actual update of the local models. When the model update unit 1660 receives instruction from the global updated model package receiver 1650, it proceeds to update the in situ models 320 stored on the vehicle.

Figure 17:
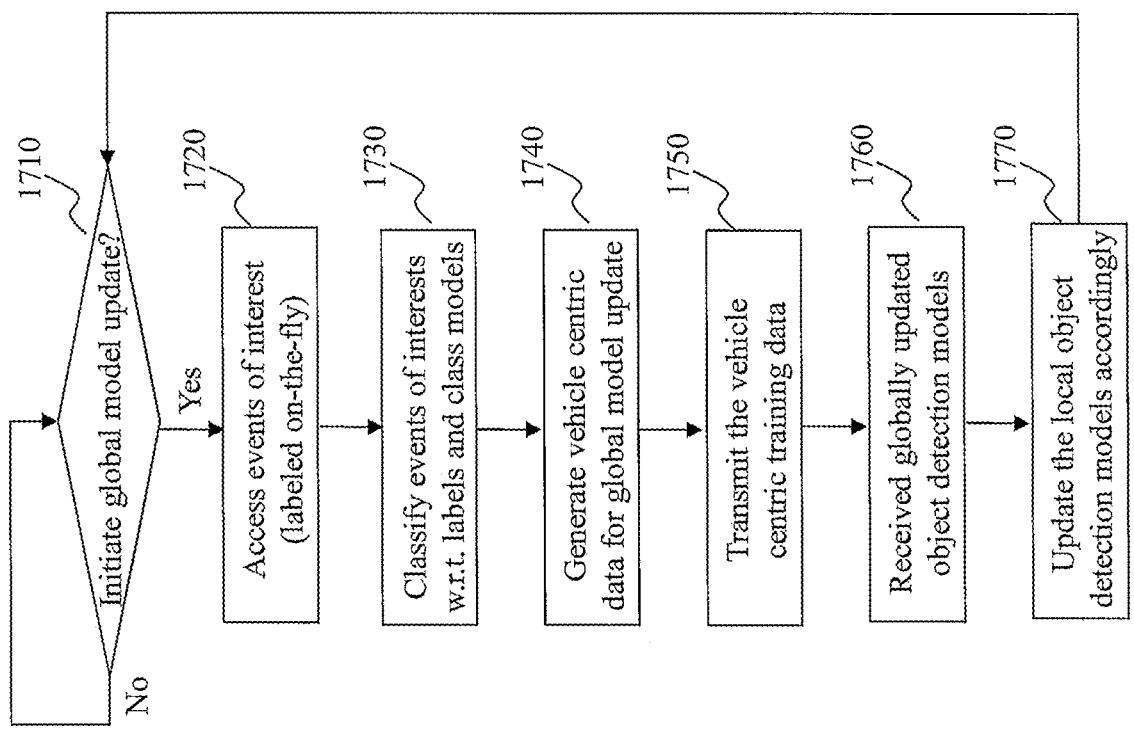
FIG. 17 is a flowchart of an exemplary process for a global model update unit, according to an embodiment of the present teaching.

FIG. 17 is a flowchart of an exemplary process for the global model update unit 380, according to an embodiment of the present teaching. Global model update is scheduled based on some configured conditions. At 1710, it is determined whether it is time to initiate global model update process. If the pre-set conditions are not satisfied, the process loops back to continue the check until the conditions are satisfied. Once the conditions are satisfied, the global model update process is initiated. First, events of interest that are labeled on-the-fly are accessed at 1720. Some of such events of interest are selected and then classified, at 1730, based on their labels and optionally on information specified in the global class model configuration 1670. Based on the classification, vehicle centric training data package is generated, at 1740, based on the vehicle specific information stored in the vehicle information archive 1680. The packaged training data are then sent, at 1750, to the global model update cloud 160.

When the global model update cloud 160 completes the re-training of the models, it derives the updated models and sends an updated model package to the vehicle. When the global updated model package receiver 1650 in the in situ perception system 110 receives the updated model package, it triggers the model update unit 1660 to update, at 1770, the models 320 stored in the in situ perception system 110.

Figure 18:
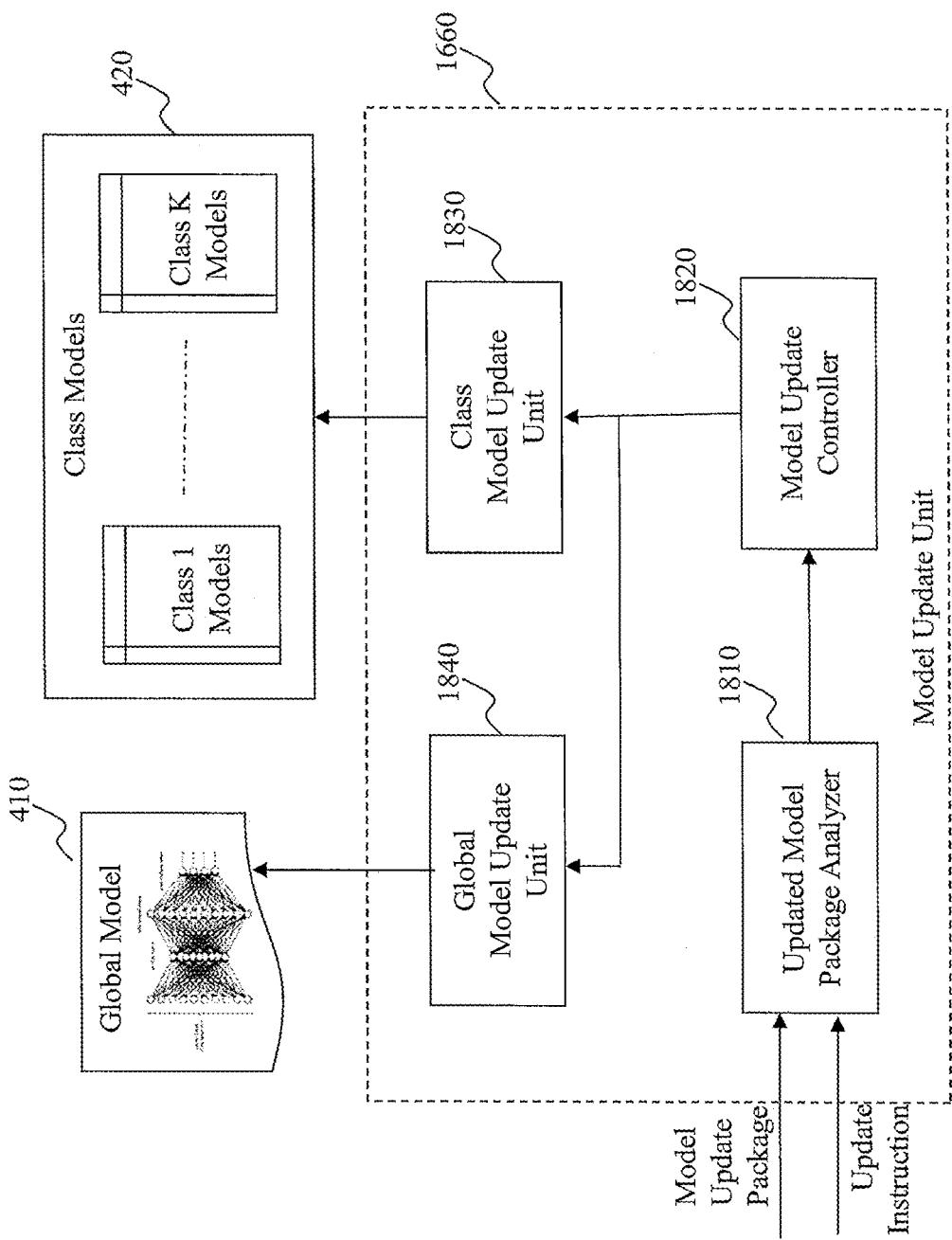
FIG. 18 depicts an exemplary high level system diagram of a model update unit, according to an embodiment of the present teaching.

FIG. 18 depicts an exemplary high level system diagram of the model update unit 1660, according to an embodiment of the present teaching. In this embodiment, the model update unit 1660 comprises an updated model package analyzer 1810, a model update controller 1820, a global model update unit 1840, and a class model update unit 1830. As discussed herein, models 320 may comprise both global model 410 as well as various class models 420, which may further include multiple models under each class. When the global updated model package receiver 1650 sends the received updated model package and update instruction to the model update unit 1660, the updated model package analyzer 1810 analyzes the received updated model package and the instruction and derive control signals accordingly. Such control signals are sent to the model update controller 1820, which then controls the model update process based on the control signals.

In this illustrated embodiment, the update to the global model 410 and the update to the class models 420 may be carried out by separate modules or processes. The model update controller 1820 separately controls each by providing appropriate information related to appropriate information related to the updated models. The global model update unit 1840 receives information related to the updated global models from the model update controller 1820 and carries out the updated of the global model 410 accordingly. The class model update unit 1830 receives information related to updated class models from the model update controller 1820 and updates various class models based on the received information.

Although termed as object detection models, they may include different types of models. Some may be directed to traditional object detection, i.e., identify boundaries of objects. Other models may also be included in the object detection models as disclosed herein. For example, there may be models for feature detection and such features may include size, texture, depth, etc. Other models within the meaning of object detection models as disclosed herein may also be directed to, e.g., integration of sensor data of different modalities. Each model may also have different aspects that may be adapted or updated, including but not limited to, model parameters, configuration of the models such as the number of layers in a deep learning neural network, or number of neurons in each layer and their corresponding operating parameters, etc.

Figure 19:
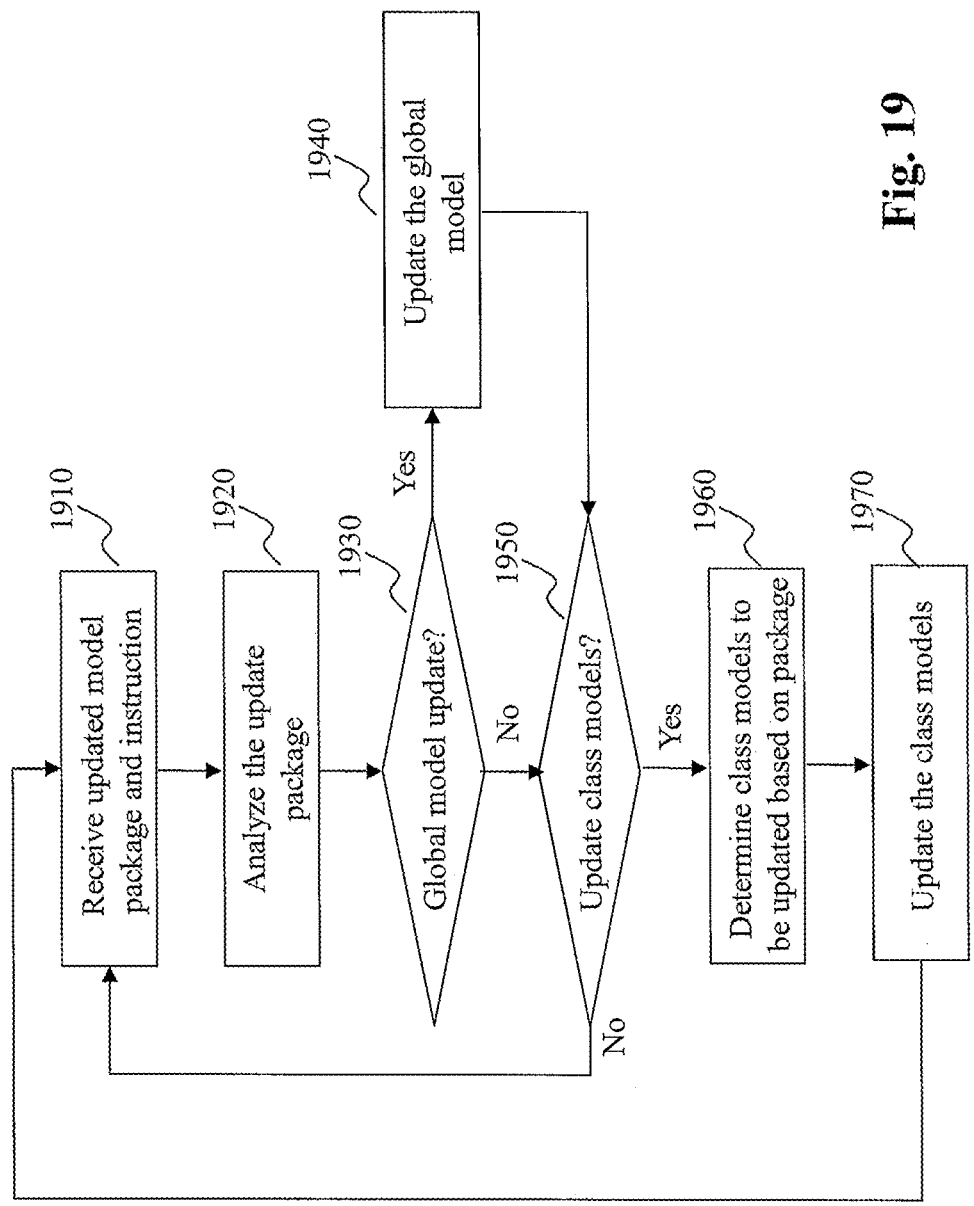
FIG. 19 is a flowchart of an exemplary process for a model update unit, according to an embodiment of the present teaching.

FIG. 19 is a flowchart of an exemplary process for the model update unit 1660, according to an embodiment of the present teaching. Updated model package and model update instruction are first received at 1910. The received information is analyzed at 1920. Based on the received information, it is determined, at 1930, whether the global models 410 are to be updated. If the global models are to be updated, the model update controller 1820 activates the global model update unit 1840 to update, at 1940, the global models 410. If the global models are not to be updated according to the received updated model package, it is further checked, at 1950, whether the class models 420 are to be updated. Alternatively, after the global models are updated at 1940, it is also further checked to see whether the class models 420 are to be updated. If the class models are not to be updated this round, the process proceeds to step 1910 to wait for the next cycle of global model update. Otherwise, the model update controller 1820 activates the class model update unit 1830 to update, at 1970, the class models in accordance with the received updated model package. Once the class models are updated, the process proceeds to step 1910 until the next round of global model update.

The global model update may be carried out at the global model update cloud 160 regularly and the updated models may be distributed to the vehicles in the fleet. In some embodiments, the fleet may also be segmented into different groups and each group may have certain characteristics that warrant individualized models. For example, the groups may be divided in accordance with vehicle types, such as big semi-truck group, sports car group, sedan group, etc. Each type of vehicles may share common characteristics. For example, semi-trucks may have much higher gravity and cannot start and stop rapidly. Sports vehicles may be the opposite. Due to those differences, the models used for them may also differ. Global models for each group of vehicles may be trained/adapted using training data from such vehicles so that they are appropriate for adapting the models to achieve better performance given the common characteristics of the group. The communications between the in situ perception systems in each group of the fleet with the global model update cloud 160 may also be specifically directed via, e.g., the vehicle information embedded in the events of interest that are sent to the global model update cloud 160.

Figure 20:
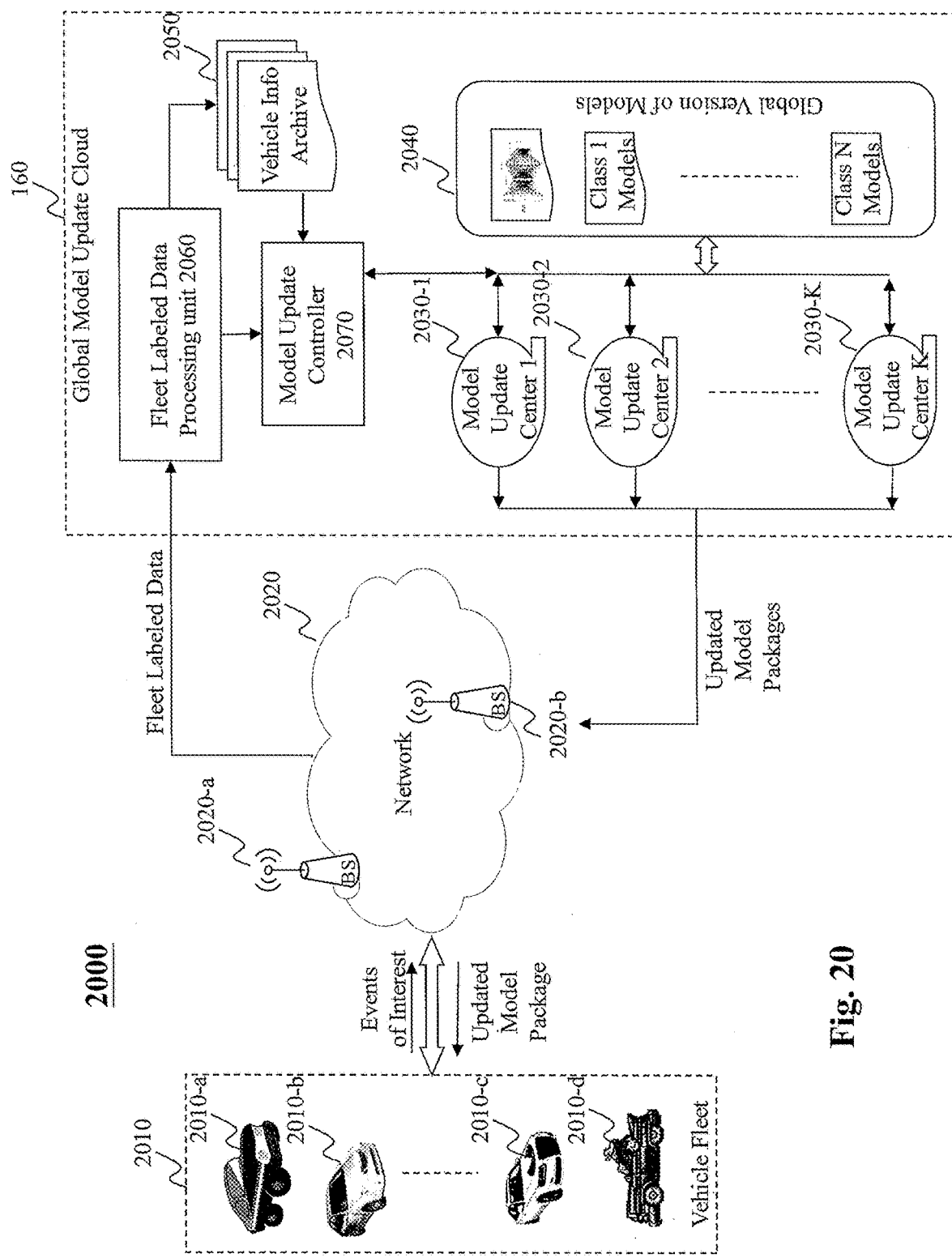
FIG. 20 depicts an exemplary framework of a fleet of autonomous driving vehicles 2010 connected with a global model update cloud via network connections, according to an embodiment of the present teaching.

FIG. 20 depicts an exemplary framework of a fleet of autonomous driving vehicles 2010 connected with the global model update cloud 160 via network 2020, according to an embodiment of the present teaching. As shown, the vehicles in the fleet 2010 send events of interest to the global model update cloud 160 via network 2020 and upon the models being updated, the global model update cloud 160 analyzes the received events of interest and identifies vehicles that send their events of interest (an indication that they desire to receive updated models). Based on the received training data, the global model update cloud 160 schedules the model update process. Once models are updated, the global model update cloud 160 sends various updated model packages to the vehicles in the fleet via the network 2020.

In this illustrated embodiment, the global model update cloud 160 comprises a fleet labeled data processing unit 2060, a model update controller 2070, a plurality of model update centers 2030, which may be distributed in the cloud and include model update center 1 2030-1, model update center 2 2030-2, . . . , model update center K 2030-K. In operation, the fleet labeled data processing unit 2060, upon receiving the events of interest from various vehicles in the fleet, processes such received training data and identifies information about the vehicles that send the training data. The identified vehicles are recorded in a vehicle information archive 2050.

Based on the received labeled training data from the fleet, the model update controller 2070 schedules to initiate the model update process. The schedule may include to determine which models to be updated (which may depend on the labeled data received), which model update center(s) will update which model(s), and to send appropriate labeled training data sets to selected model update centers to initiate the updated respectively. Vehicle information associated with each set of labeled training data may also be sent to the selected model update center in order for the selected model update center to generate appropriate output updated model packages for the vehicles involved. Upon completing the model update, the selected model update center(s) send the updated models packages to the vehicles that are designated to receive updated models.

In the global model update cloud 160, each of the model update centers may be designated with responsibilities in accordance with different criteria. In some embodiments, the model update centers may be designated for, e.g., global model update of a particular group of models, whether it is the global models 410 or any class of models in the class models 420. The model update centers may also be coordinated to perform distributed model update. In this case, whenever global model update is to be carried out, each model update center may be assigned to perform a specific portion of it. In some embodiments, one or more of the model update centers may be designated to perform the coordination. In some embodiments, there may be a centralized control in the global model update cloud 160 for coordinating the distributed global model update (not shown). In some embodiments, there may be only one model update center in the cloud that carries out the global model update completely.

Figure 22:
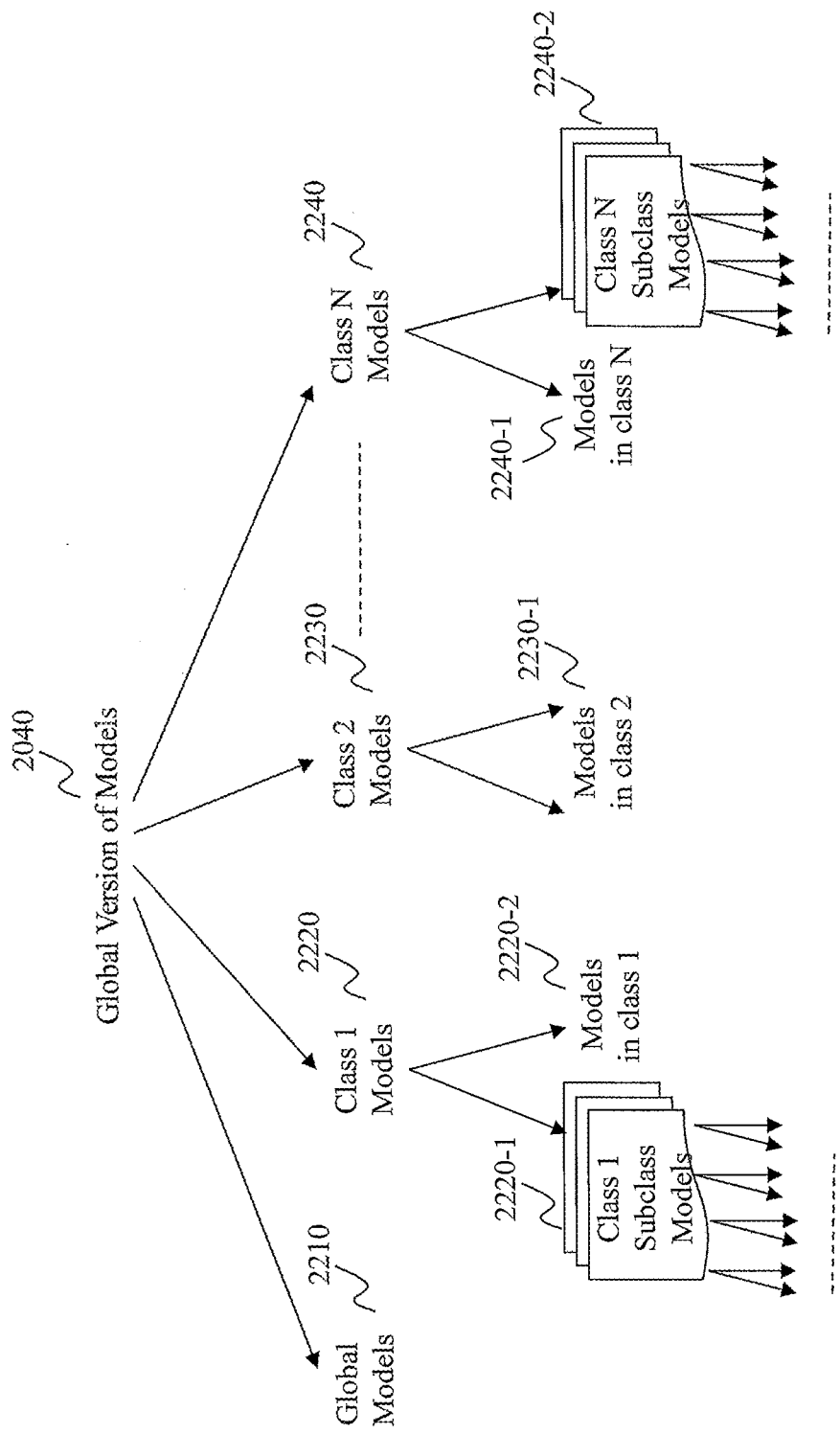
FIG. 22 illustrates exemplary types of models that can be deployed to an autonomous driving vehicle, according to an embodiment of the present teaching.
Figure 23:
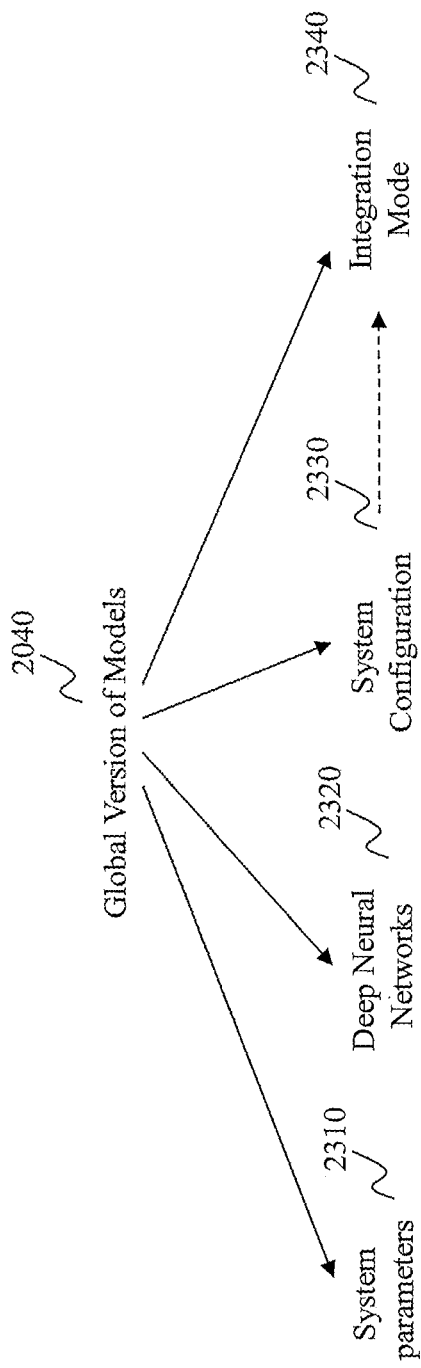
FIG. 23 illustrates an exemplary structure of models that can be updated globally, according to an embodiment of the present teaching.

The global model update cloud 160 may store a global version 2040 of object detection models, which may or may not have a similar construct as the models in the in situ perception systems residing in the vehicles. For example, a semi-truck may have the global models plus only class models designated for semi-truck vehicles. But the global version of the models has all class models. FIGS. 22-23 illustrate exemplary organizations of the global models. As discussed herein, FIG. 22 shows that global version of models 2040 include global models 2210 and/or one or more classes of models, class 1 models 2220, class 2 models 2230, . . . , class N models 2240. Each of the classes may also have models belonging to that class and/or one or more subclasses of models. As illustrated, class 1 models 2220 may include a number of models 2220-2 belonging to class 1 and further include class 1 subclass models 2220-1; class 2 models 2230 include its models 2230-1 belonging to the class; . . . , class N models 2240 include a number of models 2240-1 in class N and further additional class N subclass models 2240-2. Each of the subclasses may also continue to have additional subclasses of models.

As discussed herein, each model, including global, class, or subclass model, may correspond to a different type of model. A model can be a deep learning neural network or other types of model such as parametric models or heuristic based models. Each model may be configured for processing data to achieve some kind of decision, e.g., detecting an object or features of objects such as depth, texture, etc. A model may be configured to perform a single task (e.g., object detection based on an image) or a combination of tasks based on data from multiple sources, e.g., detecting object and depth based on multi-view data. Due to the difference in models, update of models may involve different types of the adaptation. For instance, to update a parametric model, it may involve re-training the model to derive updated parameters of the model. Such parameters may involve different aspects of the model, some functional and some may be structural. For deep learning neural network models, there may be structural parameters of the models such as the number of layers and the number of nodes in each layer. There may also be functional parameters such as the function performed by the nodes and the weights on connections that link different nodes. Updating a deep neural network model may involve any of aspects related to the model.

There may be models for different purposes that require different data and ways to carry out the update. For example, some models may be configured to integrate different types of information in order to achieve better performance, e.g., models for integrating passive sensor data with active sensor data for depth detection or models for integrating results of detection based on multi-view data to reach an integrated determination about the detection. This is shown in FIG. 23.

Referring back to FIG. 20, the vehicle information archive 2050 stores information related to the fleet and each specific vehicle that sends the labeled events of interest to seek updated models. Such information is fed to different selected model update centers 2030 so that updated model packages directed to each of such vehicle may be appropriately generated.

Figure 21:
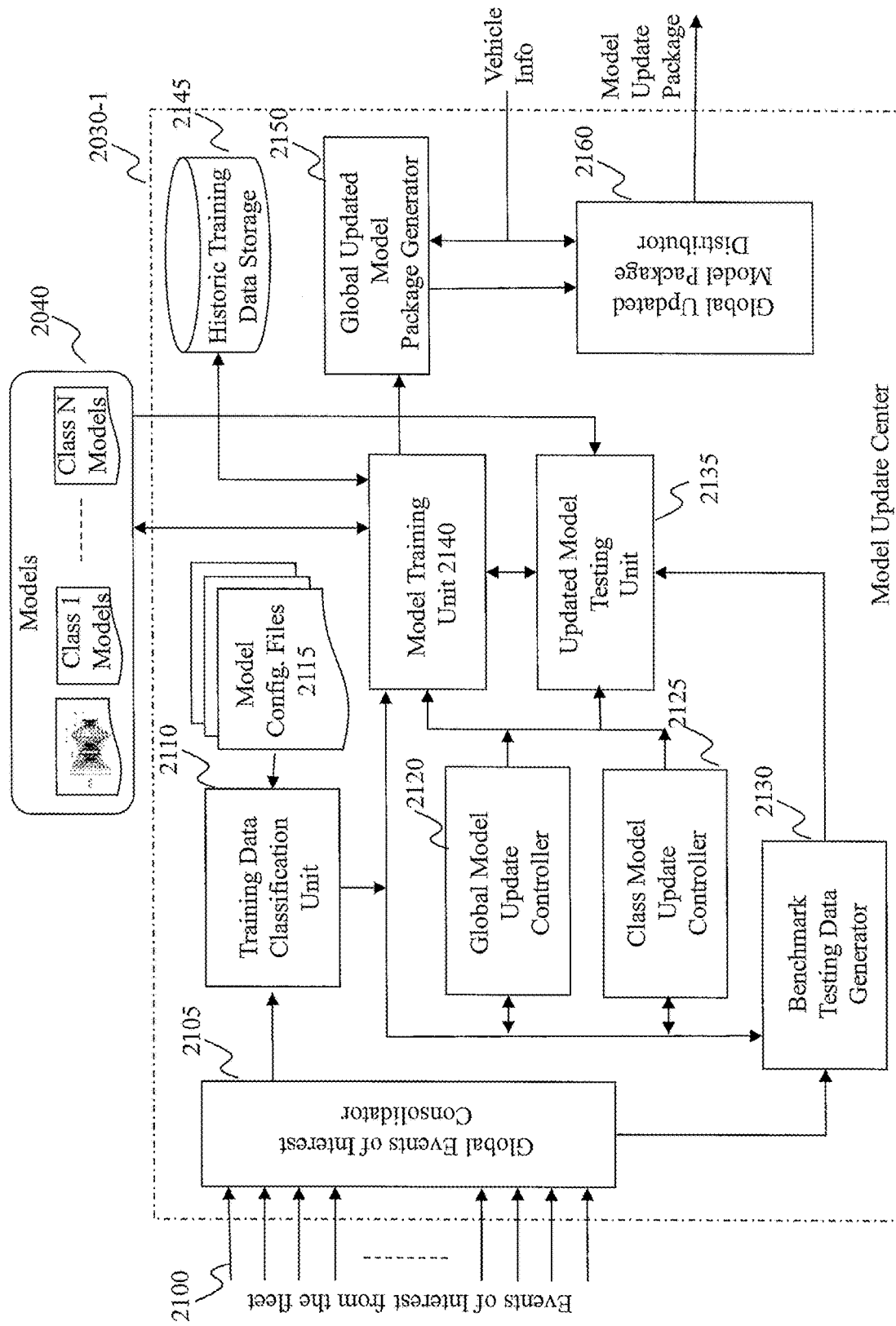
FIG. 21 depicts an exemplary high level system diagram of a model update center, according to an embodiment of the present teaching.

FIG. 21 depicts an exemplary high level system diagram of a model update center, according to an embodiment of the present teaching. In this illustrated embodiment, the model update center 2030-1 comprises a global events of interest consolidator 2105, a training data classification unit 2110, a global model update controller 2120, a class model update controller 2125, a benchmark testing data generator 2130, a model training unit 2140, a global model update testing unit 2135, a global updated model package generator 2150, and a global updated model distributor 2160. In this embodiment, the model update center 2030-1 is configured to be able to generating both updated global models and updated class models. In some embodiments, depending on the role of a model update center, a model update center may be configured to generate a designated group of updated models.

In operation, the events of interest from the model update controller 2070 (which may correspond to a subset of fleet data) are received by the global events of interest consolidator 2105. Correspondingly, information about vehicles that provided the received events of interest may also be received by the model update center, i.e., by the global updated model package generator 2150 in order to generate appropriate updated model packages. When a vehicle's in situ perception system sends its events of interest to the global model update cloud 160, it indicates that the in situ perception system desires to receive updated models. As such, when events of interest from this in situ perception system are received at the global model update cloud, the model update center that is scheduled to update some models may be informed of the vehicles which are to receive updated models generated by the model update center.

Based on the consolidated events of interest, the training data classification unit 2110 may classify the training data based on their labels and the corresponding models to be updated. For instance, some of the training data may be labeled as discrepant data and some may be reinforcement data and depending on such labels, the training data may be applied differently to generate updated models. In addition, some data may be labeled as related to detection results from raining days so that such data may also be used to update class models for raining weather conditions, besides being used for adapting the global models. Some of such classified training data may be appropriately sent to the model training unit 2140 for re-training the models and some may be sent to the benchmark testing data generator 2130, where some of the labeled data are identified to be used as benchmark testing data. Such benchmark testing data may be used to test the re-trained models to ensure performance. As such, benchmark testing data may be generated individually for each of the models that are scheduled to be updated.

Depending on the models to be updated, either the global model update controller 2120 or the class model update controller 2125 or both are activated to initiate the global model update. The global model update controller 2120 controls the model training unit 2140 to carry out the re-training of the global version of the global models based on the labeled training data. The model update process may be iterative and the models being updated are optimized against the training data during the update process. During the re-training, the updated global models may be sent from the model training unit 2140 to the updated model testing unit 2135 to test the updated global models using the benchmark testing data generated by the benchmark testing data generator 2130. The optimization may continue until the benchmark testing satisfies certain conditions.

The class model update controller 2125 initiates the process of class model update process and may follow similar flow for the update process except the model training unit 2140 applies the training data appropriate for each of the class models being updated during the process and such updated class models are tested based on benchmark testing data designated for each of the class model being tested. Each class model may be updated separately. The entire process of global model update may take some time to complete.

The re-training or adaptive training is carried out by the model training unit 2140. In some embodiments, the re-training may be performed based on both newly received labeled events of interest and the historic training data stored in historic data storage 2145. In this way, the models can be trained on all data so far collected. In some embodiments, the update may be performed using partial set of all data (historic and newly received), e.g., only data from a specified more recent period (last month or year).

When the global model update process is completed, i.e., the models are optimized against the training data, the global updated model package generator 2150 is activated to generate appropriate updated model packages for a set of vehicles, based on the vehicle information received from the model update controller 2070. Such vehicle information may identify which vehicle is to receive which updated model(s). Based on the globally updated models as well as the vehicle information from the model update controller 2070, the global updated model package generator 2150 generates, for each of the vehicles specified in the vehicle information, an updated model package. Such generated updated model packages are then sent to the global updated model package distributor 2160. Up on receiving the updated model packages, the global updated model package distributor 2160 transmits each package to appropriate vehicle in accordance with the vehicle information received from the model update controller 2070.

Figure 24:
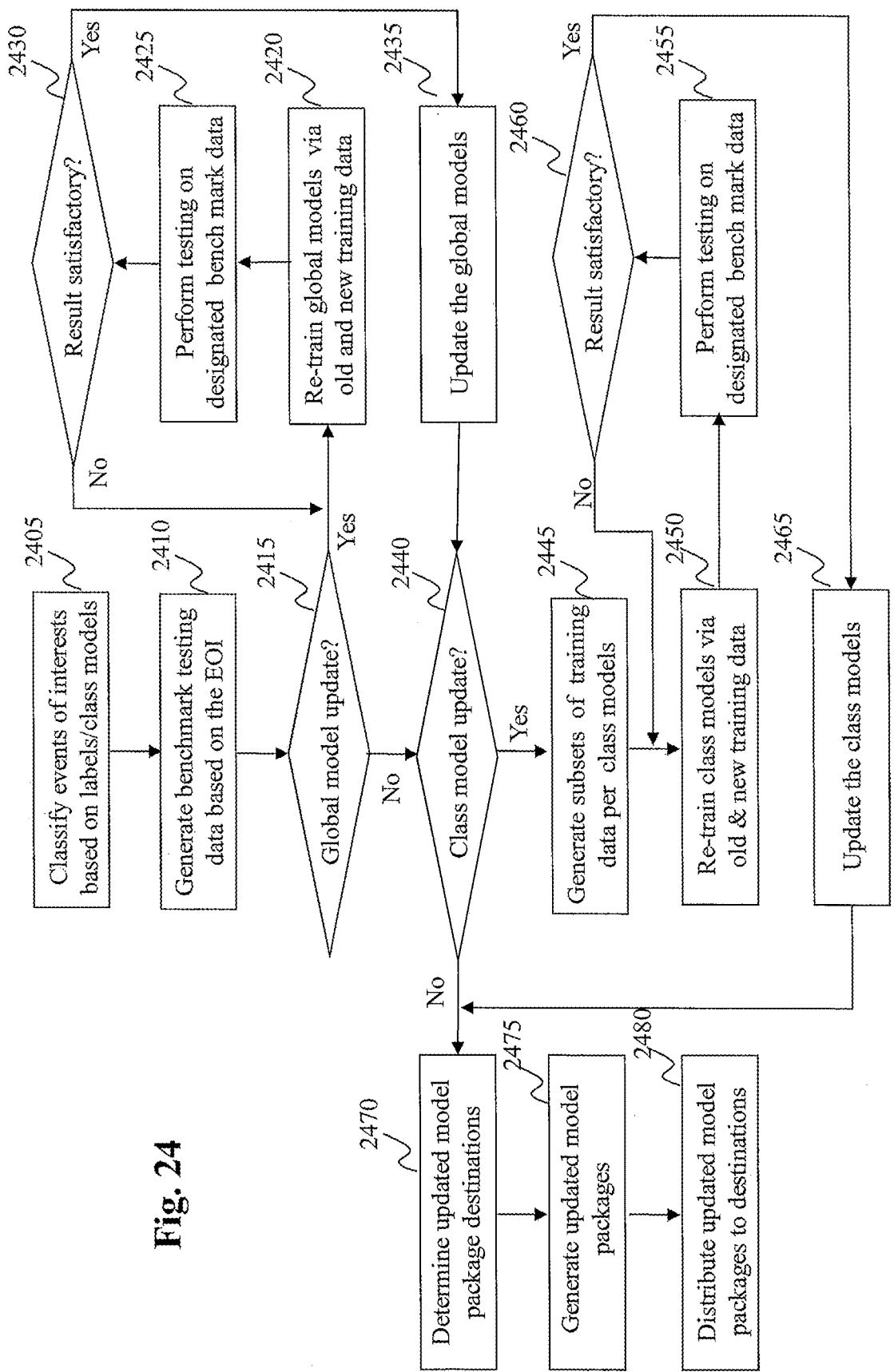
FIG. 24 is a flowchart of an exemplary process for a model update center, according to an embodiment of the present teaching.

FIG. 24 is a flowchart of an exemplary process for a model update center, according to an embodiment of the present teaching. Labeled events of interest received by the model update center are first classified at 2405. Based on such classified labeled training data, the benchmark testing data generator 2130 generates, at 2410, benchmark testing data to be used for testing for each of the models to be updated. To proceed with the update process, it is determined, at 2415, whether the model to be updated involves the global models (corresponding to global models 410). If the global models are to be updated, appropriate labeled training data, including both historic training data and the newly received training data, are used to re-train, at 2420, the global models. The re-trained global models are then tested, at 2425, using benchmark testing data selected for testing the global models. If the testing result is satisfactory, determined at 2430, the global models are updated at 2435. If the testing result is not satisfactory, the processing goes back to 2420 to re-train (e.g., iteratively) the global models.

If no global model update is involved or when the global models have been satisfactorily updated, the step at 2440 determines whether any class model is to be updated. If any class model update is to be updated, the model update center proceeds to re-train, at 2450, the class models schedule to be updated based on both historic and newly received training data. During the re-training process, the re-trained class models are tested, at 2455. If the testing result is not satisfactory, determined at 2460, the processing goes back to 2455 to continue the re-training (e.g., iteratively) of the class models. If the testing result on the re-trained class models is satisfactory, the process proceeds to update the class models at 2465 based on the re-trained result.

If no class model update is involved or when the class models have been satisfactorily updated, the process proceeds to 2470 to determine which vehicles are to receive which updated models or destinations. Different vehicles may be configured to receive different sets of updated models. Accordingly, at 2475, updated model packages for different vehicles are generate and are distributed, at 2480, to designated destination vehicles.

Figure 25:
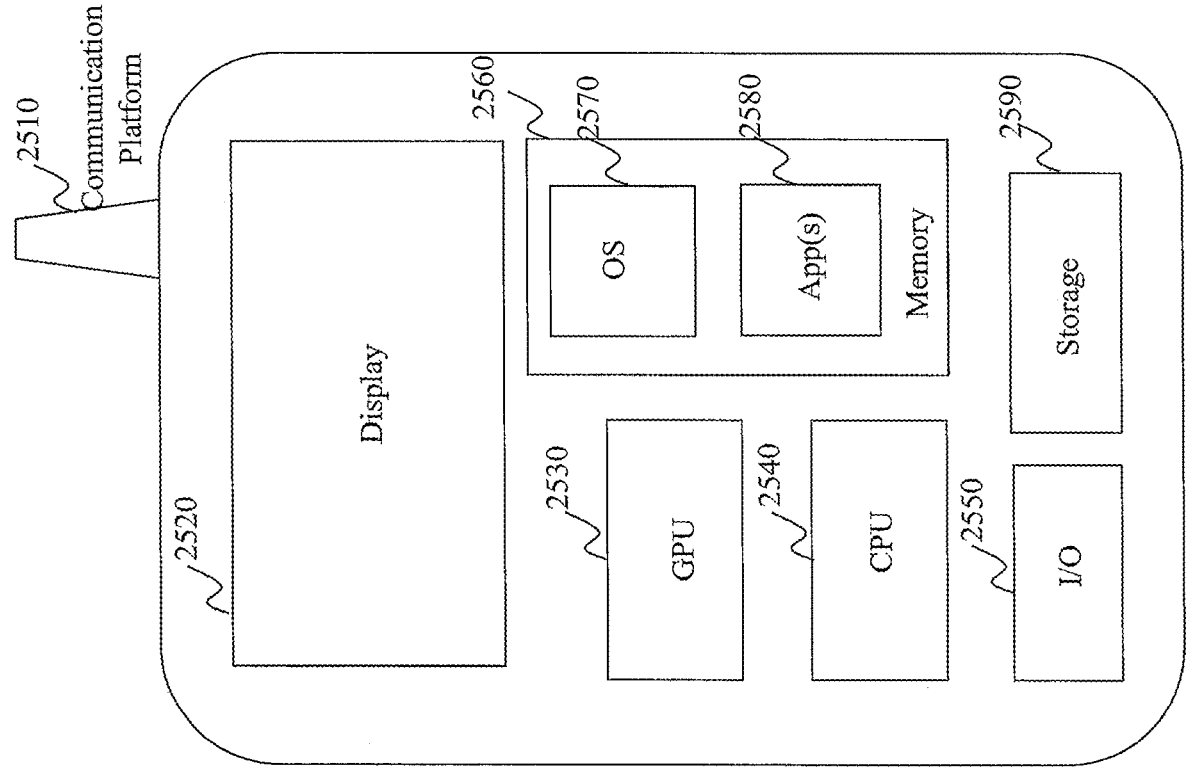
FIG. 25 depicts the architecture of a mobile device which can be used to implement a specialized system incorporating the present teaching.

FIG. 25 depicts the architecture of a mobile device which can be used to realize a specialized system implementing the present teaching. This mobile device 2500 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2500 in this example includes one or more central processing units (CPUs) 2540, one or more graphic processing units (GPUs) 2530, a display 2520, a memory 2560, a communication platform 2510, such as a wireless communication module, storage 2590, and one or more input/output (I/O) devices 2550. Any other suitable component, including but not limited to a system bus or a controller (not shown), may also be included in the mobile device 2500. As shown in FIG. 25, a mobile operating system 2570, e.g., iOS, Android, Windows Phone, etc., and one or more applications 2580 may be loaded into the memory 2560 from the storage 2590 in order to be executed by the CPU 2540.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 26:
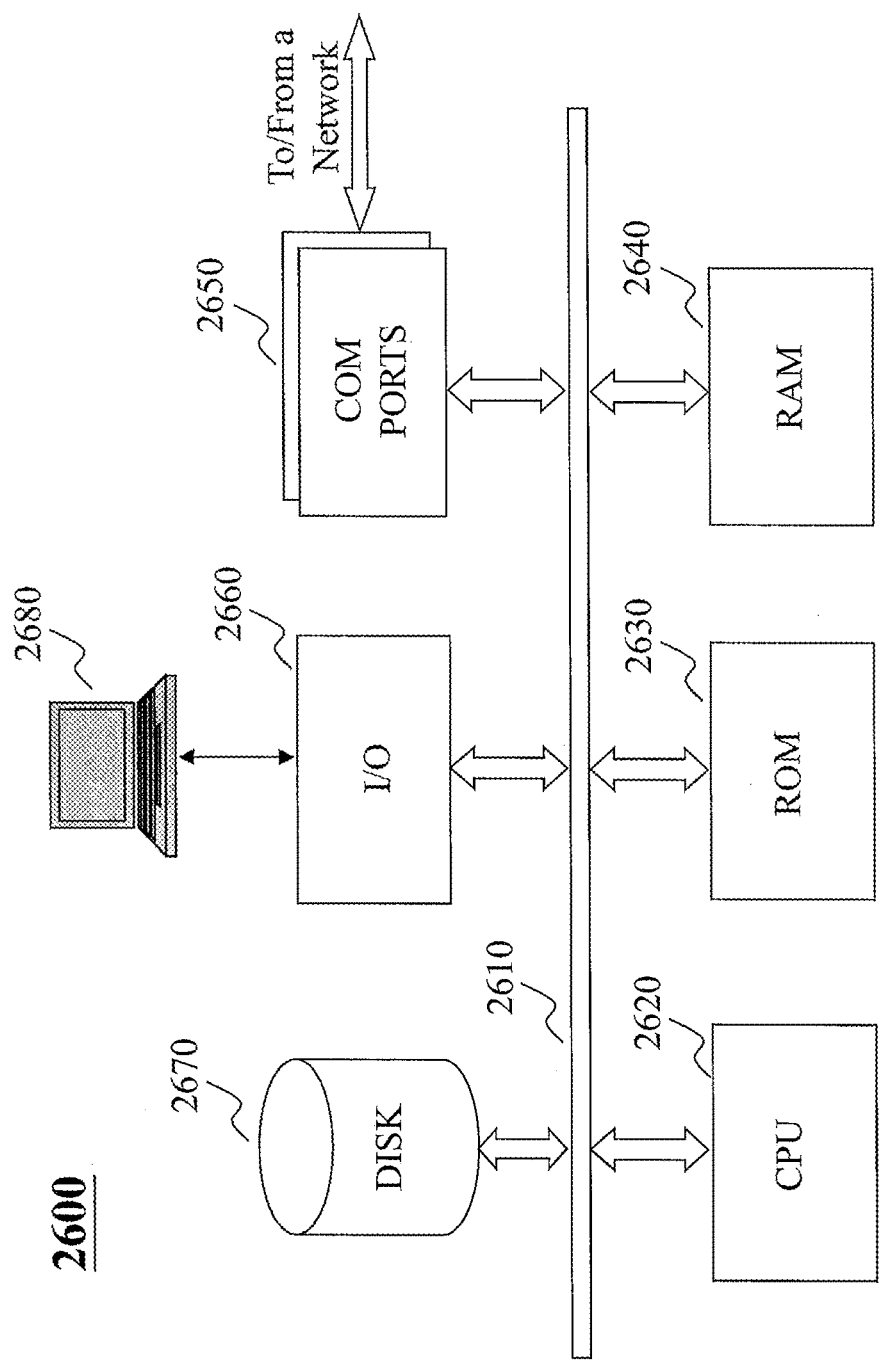
FIG. 26 depicts the architecture of a computer which can be used to implement a specialized system incorporating the present teaching.

FIG. 26 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2600 may be used to implement any component of the present teachings, as described herein. Although only one such computer is shown, for convenience, the computer functions relating to the present teachings as described herein may be implemented in a distributed fashion on a number of similar platforms, to distribute the processing load.

The computer 2600, for example, includes COM ports 2650 connected to and from a network connected thereto to facilitate data communications. The computer 2600 also includes a central processing unit (CPU) 2620, in the form of one or more processors, for executing program instructions. The exemplary computer platform includes an internal communication bus 2610, program storage and data storage of different forms, e.g., disk 2670, read only memory (ROM) 2630, or random access memory (RAM) 2640, for various data files to be processed and/or communicated by the computer, as well as possibly program instructions to be executed by the CPU. The computer 2600 also includes an I/O component 2660, supporting input/output flows between the computer and other components therein such as user interface element. The computer 2600 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform for processing image data in an autonomous driving vehicle, comprising:

receiving, continuously, sensor data acquired by one or more types of sensors deployed on the autonomous driving vehicle, wherein the sensor data provide different information about surrounding of the autonomous driving vehicle;

acquiring a first data set and a second data set of a first type of information respectively from a first sensor and a second sensor of a first type of the one or more types of sensors at a specific time, the first sensor and the second sensor providing the first type of information about surrounding of the autonomous driving vehicle in different perspectives; and performing object centric stereo to estimate depth information of objects present in the surrounding by:

detecting an obstacle object and a location of the obstacle object based on the first data set in accordance with at least one object detection model and not based on the second data set, estimating a corresponding location of the obstacle object in the second data set based on the location of the obstacle object in the first data set by warping the location of the obstacle object in the first data set to the corresponding location of the obstacle object in the second data set based on a disparity between the first sensor and the second sensor, and estimating depth information of the obstacle object as a whole based on at least one point sampled from the obstacle object at the location in the first data set and at least one point sampled from the obstacle object at the corresponding location in the second data set.

2. The method of claim 1, wherein the depth information characterizes the obstacle object via at least one of:

one or more measures, each measure of the one or more measures being indicative of a distance between the obstacle object and the autonomous driving vehicle;

an array of measures associated with different points on the obstacle object, representing a depth map wherein each measure in the array is indicative of a distance between a corresponding point on the obstacle object and the autonomous driving vehicle; or a combination thereof.

3. The method of claim 2, wherein the one or more measures include at least one of:
- a first measure indicative of a distance between the autonomous driving vehicle and a point on the obstacle object that is closest to the autonomous driving vehicle;
- a second measure indicative of an average distance between the autonomous driving vehicle and the obstacle object;
- a third measure indicative of a variation of distance measures at different points of the obstacle object with respect to the autonomous driving vehicle; or
- a combination thereof.

4. The method of claim 1, further comprising:
obtaining a third data set acquired by a third sensor of a second type of the one or more types of sensors at the specific time, the third data set providing a second type of information about the surrounding of the autonomous driving vehicle; and
enhancing the depth information of the obstacle object estimated based on the first data set and the second data set, the depth information being enhanced in accordance with the second type of information provided by the third data set to generate enhanced depth information of the obstacle object.

5. The method of claim 4, wherein the obstacle object is archived with a time stamp determined based on the specific time, and with at least one of the depth information or the enhanced depth information.

6. The method of claim 1, further comprising:
detecting additional one or more objects from the first data set at the specific time;
estimating, based on the object centric stereo, additional depth information of each of the additional one or more objects based on the second data set acquired at the specific time;
tracking, based on the continuously received sensor data acquired by the first sensor and the second sensor, at least one of the obstacle object or the additional one or more objects; and
estimating the corresponding depth information of the tracked at least one of the obstacle object and the additional one or more objects.

7. A machine readable non-transitory medium having data recorded thereon for processing image data in an autonomous driving vehicle, wherein the data, when read by the machine, cause the machine to perform the following:
receiving, continuously, sensor data acquired by one or more types of sensors deployed on the autonomous driving vehicle, wherein the sensor data provide different information about surrounding of the autonomous driving vehicle;
acquiring a first data set and a second data set of a first type of information respectively from a first sensor and a second sensor of a first type of the one or more types of sensors at a specific time, wherein the first sensor and the second sensor provide the first type of information about surrounding of the autonomous driving vehicle in different perspectives;
performing object centric stereo to estimate depth information of objects present in the surrounding by:
detecting an obstacle object and a location of the obstacle object based on the first data set in accordance with at least one object detection model and not based on the second data set,
estimating a corresponding location of the obstacle object in the second data set based on the location of the obstacle object in the first data set by warping the location of the obstacle object in the first data set to the corresponding location of the obstacle object in the second data set based on a disparity between the first sensor and the second sensor, and
estimating depth information of the obstacle object as a whole based on at least one point sampled from the obstacle object at the location in the first data set and at least one point sampled from the obstacle object at the corresponding location in the second data set.

8. The machine readable non-transitory medium of claim 7, wherein the depth information characterizes the obstacle object via at least one of:
- one or more measures, each measure of the one or more measures being indicative of a distance between the obstacle object and the autonomous driving vehicle;
- an array of measures associated with different points on the obstacle object, representing a depth map wherein each measure in the array is indicative of a distance between a corresponding point on the obstacle object and the autonomous driving vehicle; or
- a combination thereof.

9. The machine readable non-transitory medium of claim 8, wherein the one or more measures include at least one of:
- a first measure indicative of a distance between the autonomous driving vehicle and a point on the obstacle object that is closest to the autonomous driving vehicle;
- a second measure indicative of an average distance between the autonomous driving vehicle and the obstacle object;
- a third measure indicative of a variation of distance measures at different points of the obstacle object with respect to the autonomous driving vehicle; or
- a combination thereof.

10. The machine readable non-transitory medium of claim 7, wherein the data, when read by the machine, further cause the machine to perform:
obtaining a third data set acquired by a third sensor of a second type of the one or more types of sensors at the specific time, the third data set providing a second type of information about the surrounding of the autonomous driving vehicle; and
enhancing the depth information of the obstacle object estimated based on the first data set and the second data set, the depth information being enhanced in accordance with the second type of information provided by the third data set to generate enhanced depth information of the obstacle object.

11. The machine readable non-transitory medium of claim 10, wherein the obstacle object is archived with a time stamp determined based on the specific time, and with at least one of the depth information or the enhanced depth information.

12. The machine readable non-transitory medium of claim 7, wherein the data, when read by the machine, further cause the machine to perform:
detecting additional one or more objects from the first data set at the specific time;
estimating, based on the object centric stereo, additional depth information of each of the additional one or more objects based on the second data set acquired at the specific time;
tracking, based on the continuously received sensor data acquired by the first sensor and the second sensor, at least one of the obstacle object or the additional one or more objects; and estimating the corresponding depth information of the tracked at least one of the obstacle object and the additional one or more objects.

13. A system for processing image data in an autonomous driving vehicle, comprising:
- one or more data processing units implemented by a processor and configured for receiving, continuously, sensor data acquired by one or more types of sensors deployed on the autonomous driving vehicle, wherein the sensor data provide different information about surrounding of the autonomous driving vehicle;
- a first sensor and a second sensor of a first type of the one or more types of sensors for acquiring a first data set and a second data set, respectively, of a first type of information about surrounding of the autonomous driving vehicle in different perspectives at a specific time;
- an object detector implemented by the processor and configured for detecting an obstacle object and a location of the obstacle object based on the first data set in accordance with at least one object detection model and not based on the second data set; and
- an object centric stereo unit implemented by the processor and configured for estimating depth information of the object by:
  - estimating a corresponding location of the obstacle object in the second data set based on the location of the obstacle object in the first data set by warping the location of the obstacle object in the first data set to the corresponding location of the obstacle object in the second data set based on a disparity between the first sensor and the second sensor, and
  - estimating depth information of the obstacle object as a whole based on at least one point sampled from the obstacle object at the location in the first data set and at least one point sampled from the obstacle object at the corresponding location in the second data set.

14. The system of claim 13, wherein the depth information characterizes the obstacle object via at least one of:
- one or more measures, each being indicative of a distance between the obstacle object and the autonomous driving vehicle;
- an array of measures associated with different points on the obstacle object, representing a depth map wherein each measure in the array is indicative of a distance between a corresponding point on the obstacle object and the autonomous driving vehicle; or
- a combination thereof.

15. The system of claim 14, wherein the one or more measures include at least one of:
- a first measure indicative of a distance between the autonomous driving vehicle and a point on the obstacle object that is closest to the autonomous driving vehicle;
- a second measure indicative of an average distance between the autonomous driving vehicle and the obstacle object;
- a third measure indicative of a variation of distance measures at different points of the obstacle object with respect to the autonomous driving vehicle; or
- a combination thereof.

16. The system of claim 13, further comprising:
- an active sensor data collector implemented by the processor and configured for obtaining a third data set acquired by a third sensor of a second type of the one or more types of sensors at the specific time, the third data set providing a second type of information about the surrounding of the autonomous driving vehicle; and
- a depth estimate enhancer configured for enhancing the depth information of the obstacle object estimated based on the first data set and the second data set, the depth information being enhanced in accordance with the second type of information provided by the third data set to generate enhanced depth information of the obstacle object.

17. The system of claim 16, wherein the obstacle object is archived in a time-stamped object database with a time stamp determined based on the specific time, and with at least one of the depth information or the enhanced depth information.

* * * * *